Nov. 23, 1954

R. W. JONES 2,695,335

MULTIEXCHANGE RELAY AUTOMATIC TELEPHONE SYSTEM

Filed Aug. 16, 1950

17 Sheets-Sheet 1

INVENTOR.
ROY W. JONES

BY

ATTORNEY

Nov. 23, 1954 R. W. JONES 2,695,335

MULTIEXCHANGE RELAY AUTOMATIC TELEPHONE SYSTEM

Filed Aug. 16, 1950 17 Sheets-Sheet 2

INVENTOR.
ROY W. JONES

BY [signature]

ATTORNEY

INVENTOR.
ROY W. JONES
BY
ATTORNEY

Nov. 23, 1954 R. W. JONES 2,695,335

MULTIEXCHANGE RELAY AUTOMATIC TELEPHONE SYSTEM

Filed Aug. 16, 1950 17 Sheets-Sheet 4

INVENTOR.
ROY W. JONES
BY
[signature]
ATTORNEY

MULTIEXCHANGE RELAY AUTOMATIC TELEPHONE SYSTEM

Filed Aug. 16, 1950

INVENTOR.
ROY. W. JONES
BY
[signature]
ATTORNEY

INVENTOR.
ROY W. JONES

BY

ATTORNEY

Nov. 23, 1954 R. W. JONES 2,695,335

MULTIEXCHANGE RELAY AUTOMATIC TELEPHONE SYSTEM

Filed Aug. 16, 1950 17 Sheets-Sheet 7

REP 1585-1

INVENTOR.
ROY W. JONES

BY *Chas. ... Candy*

ATTORNEY

Nov. 23, 1954 R. W. JONES 2,695,335

MULTIEXCHANGE RELAY AUTOMATIC TELEPHONE SYSTEM

Filed Aug. 16, 1950 17 Sheets-Sheet 8

INVENTOR.
ROY W. JONES

BY [signature]

ATTORNEY

Nov. 23, 1954 R. W. JONES 2,695,335

MULTIEXCHANGE RELAY AUTOMATIC TELEPHONE SYSTEM

Filed Aug. 16, 1950

17 Sheets-Sheet 9

INVENTOR.
ROY W. JONES

BY [signature]

ATTORNEY

REP. 1590-I

INVENTOR.
ROY W. JONES
BY
Chas. W. Cady
ATTORNEY

INVENTOR.
ROY W. JONES
BY
ATTORNEY

Nov. 23, 1954 R. W. JONES 2,695,335

MULTIEXCHANGE RELAY AUTOMATIC TELEPHONE SYSTEM

Filed Aug. 16, 1950

17 Sheets-Sheet 12

INVENTOR.
ROY W. JONES

BY [signature]

ATTORNEY

Nov. 23, 1954 R. W. JONES 2,695,335

MULTIEXCHANGE RELAY AUTOMATIC TELEPHONE SYSTEM

Filed Aug. 16, 1950 17 Sheets-Sheet 13

INVENTOR.
ROY W. JONES

BY

ATTORNEY

Nov. 23, 1954 R. W. JONES 2,695,335

MULTIEXCHANGE RELAY AUTOMATIC TELEPHONE SYSTEM

Filed Aug. 16, 1950

17 Sheets-Sheet 14

INVENTOR.
ROY W. JONES

BY

ATTORNEY

INVENTOR.
ROY W. JONES
BY
ATTORNEY

Nov. 23, 1954 R. W. JONES 2,695,335

MULTIEXCHANGE RELAY AUTOMATIC TELEPHONE SYSTEM

Filed Aug. 16, 1950 17 Sheets-Sheet 16

INVENTOR.
ROY W. JONES

BY Chas. W. Cauley

ATTORNEY

INVENTOR.
ROY. W. JONES
BY
[signature]
ATTORNEY

United States Patent Office 2,695,335

Patented Nov. 23, 1954

2,695,335

MULTIEXCHANGE RELAY AUTOMATIC TELEPHONE SYSTEM

Roy W. Jones, Rochester, N. Y., assignor to Automatic Electric Laboratories, Inc., Chicago, Ill., a corporation of Delaware Application August 16, 1950, Serial No. 179,843

6 Claims. (Cl. 179—18)

This invention relates in general to automatic telephone systems, and particularly to improvements in switching and trunking equipment for such systems. These improvements are particularly applicable to a network of small automatic and manual exchanges connected in tandem, wherein the automatic subscribers are permitted to complete their own calls to adjacent automatic exchanges, but are obliged to call a more remote exchange through an operator located at some central point in the network.

The main object of the invention is the provision of new and improved switching arrangements whereby a universal numbering scheme may be employed in such a system, with direct dialling, without the use of directors.

Another object of the invention is the provision of new and improved switching arrangements for reducing the amount of switching equipment and trunks required in such a system.

A feature of the invention is the provision of new and improved two-way repeaters arranged for switching certain types of inter-office calls directly through an intermediate exchange, without any additional dialling.

Another feature of the invention is the use of two multi-purpose repeaters at the intermediate exchange for switching said special inter-office calls, out of a group of such repeaters, and the automatic busying of corresponding repeaters responsive to the seizure of any one of them, together with the automatic preselection of the next free repeater pair.

Another feature of the invention is the manner of forwarding special markings from repeater to repeater, to insure the proper routing of calls.

Another feature of the invention is the provision of different types of such automatic switch-through repeaters, one for use in automatic offices and one for use in manual offices.

Other objects and features of the invention will be apparent from the specification and claims which follow, when considered in conjunction with the appended drawings comprising the Figures 1 to 16 inclusive, which show one embodiment of the invention as applied to a network of four small exchanges in which universal numbering is employed.

With reference to the drawings, Figures 15 and 16 show the general layout of the system with its four exchanges, designated A, B, C, and D, while Figure 17 shows the manner in which the Figures 1 to 14 inclusive are to be arranged with relation to one another to trace the operation. The Figures 1 to 14 show in circuit diagram form, sufficient of the equipment at the exchanges B and C, which are at the center of the system, to enable the invention to be properly described. It will be understood that various re-arrangements of the system may be made without change in the basic features.

With further reference to the drawings, Figure 15 shows the general layout of the exchanges A and B. Exchange A is a satellite of Exchange B, which is an all-relay selector exchange with special switching repeaters for extending operator calls between the exchanges A and C. Figure 16, which goes to the right of Figure 15, shows the general layout of the exchanges C and D. Exchange D is a satellite of Exchange C, which is a manual toll exchange with special switching repeaters for extending automatic calls between the Exchanges B and D. The equipment at the Exchanges A and D is not shown in detail. It may be assumed, however, to be generally similar to that of Exchange B, except for the use of only a single type of repeater.

Figure 5:
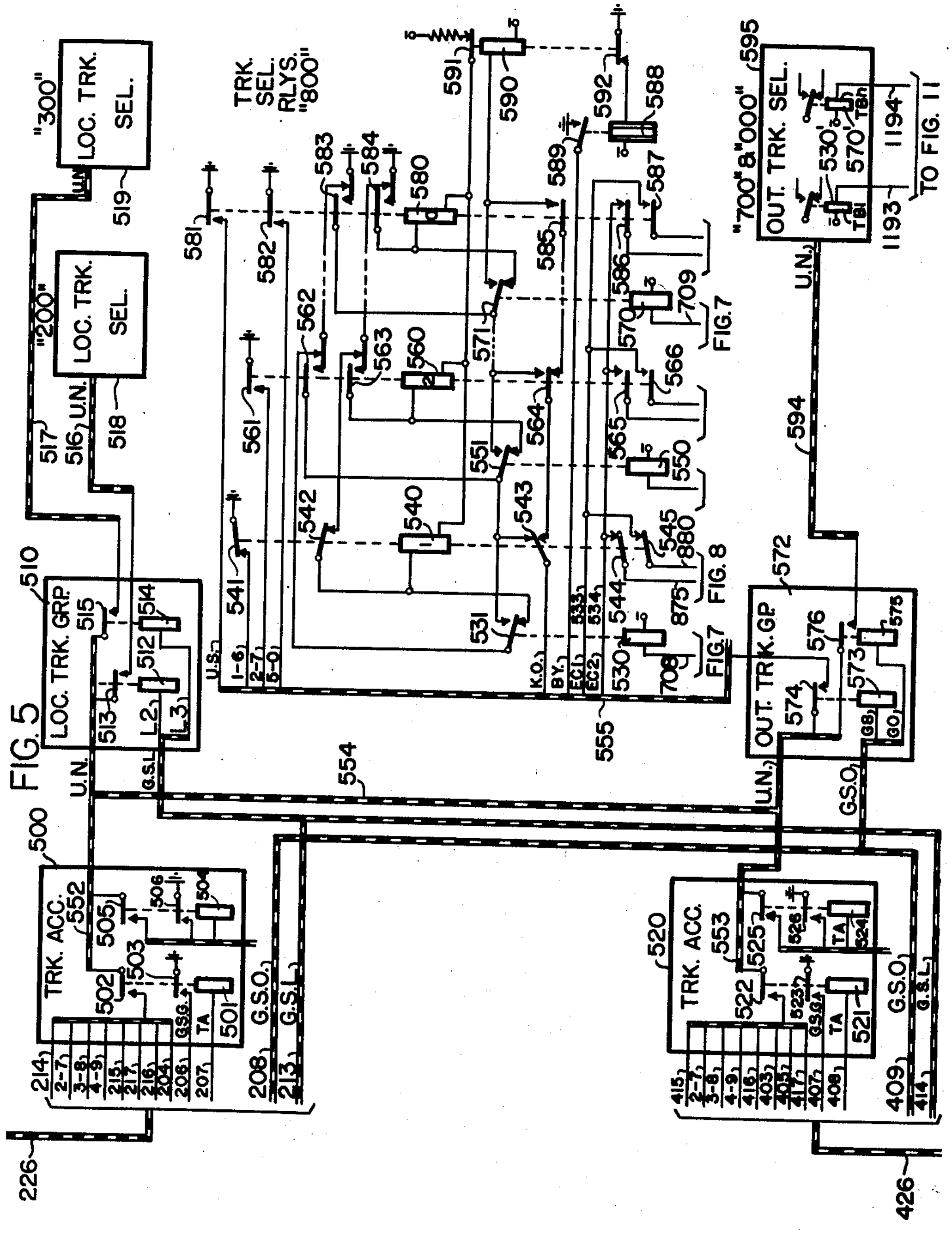

Figure 5 shows a portion of the trunk selecting equipment, which operates with the foregoing selectors to preselect the next idle connector or trunk, in a manner similar to that shown and described in Patent No. 2,535,764 issued to John H. Voss and Roy W. Jones on December 26, 1950.

Figure 6:
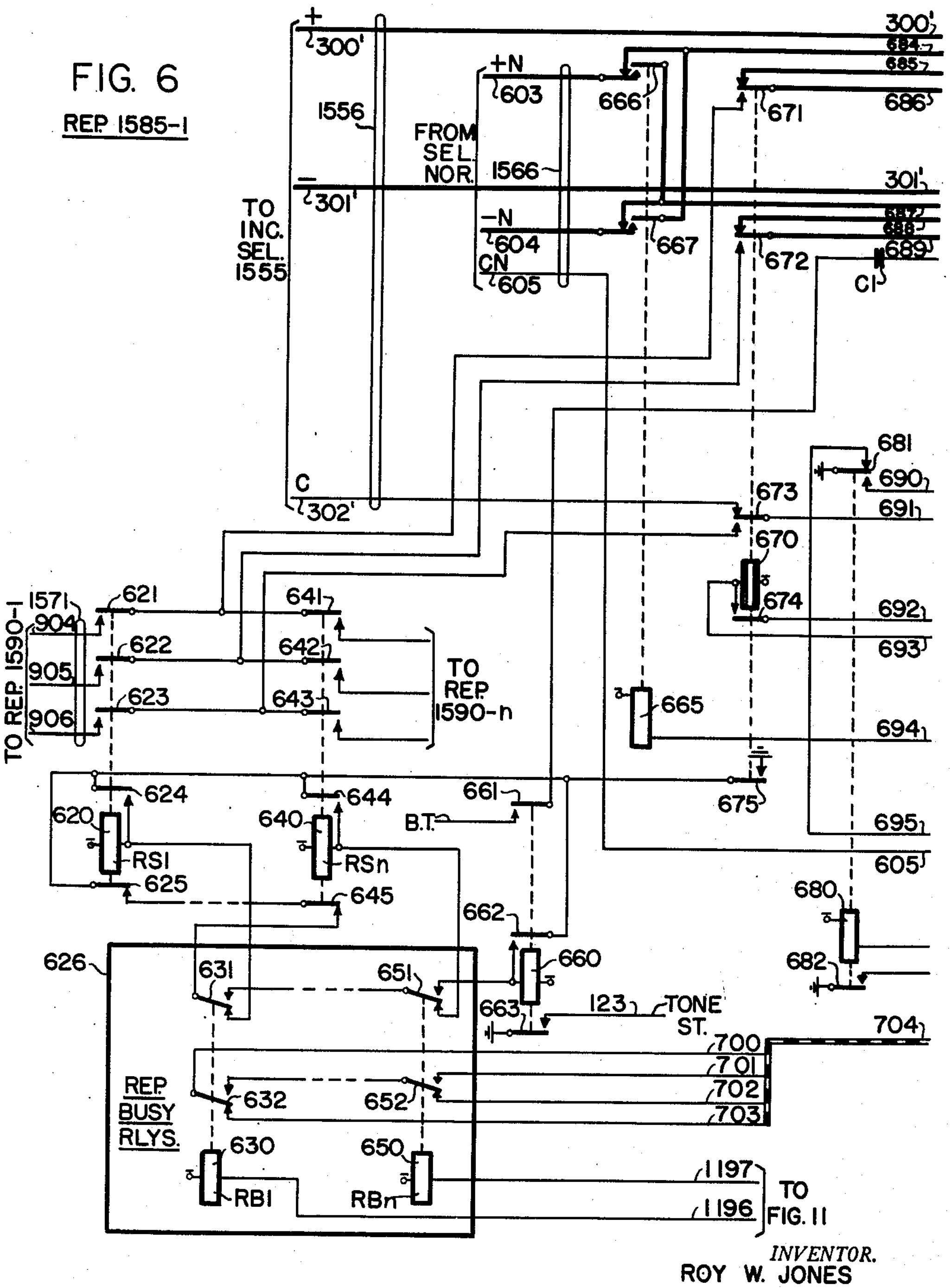
Figure 7:
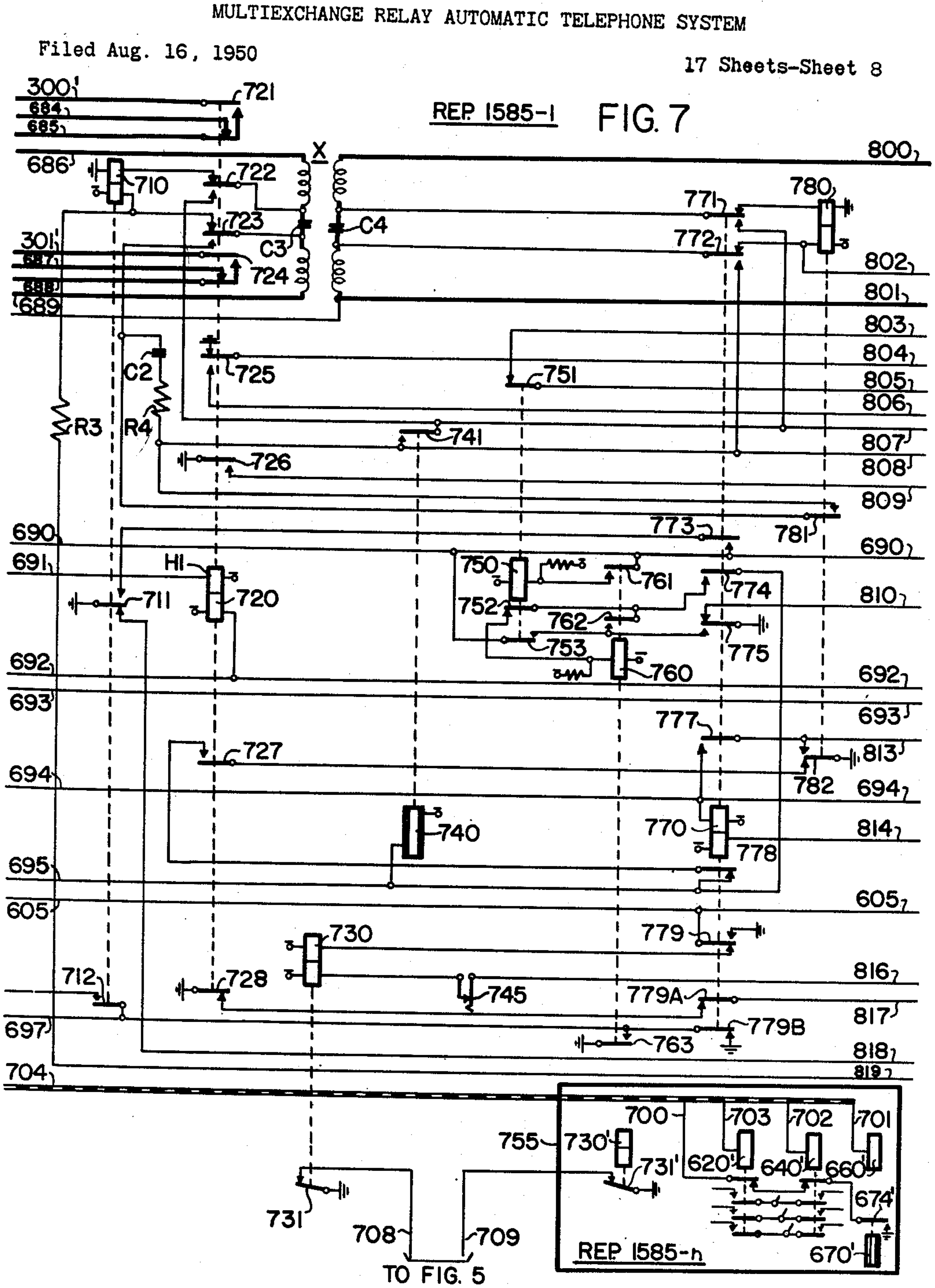
Figure 8:
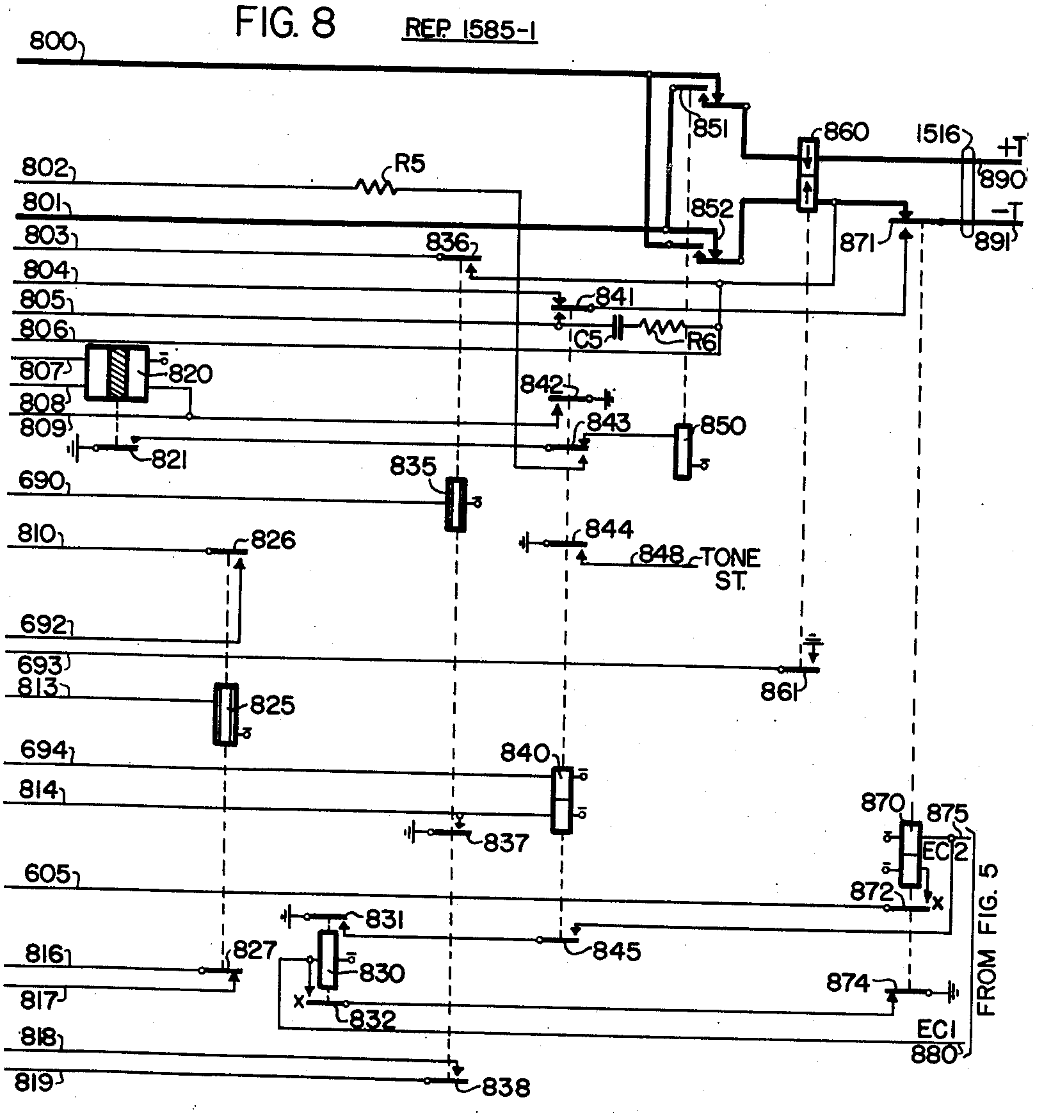
Figure 15:
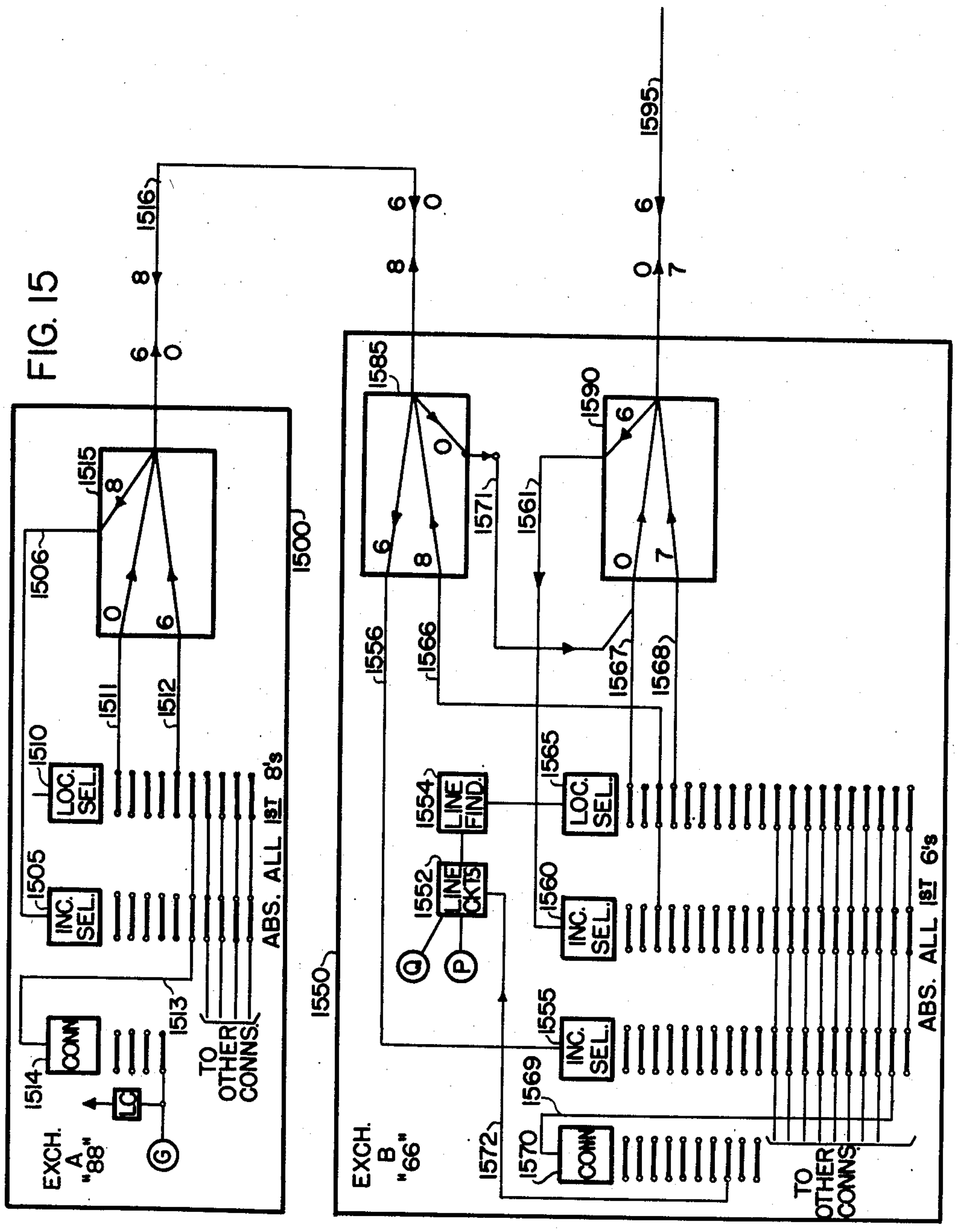

Figures 6, 7 and 8 show one of the switching repeaters at the Exchange B, such as the repeater 1585 of Figure 15, leading to Exchange A, and a portion of another similar repeater.

Figure 9:
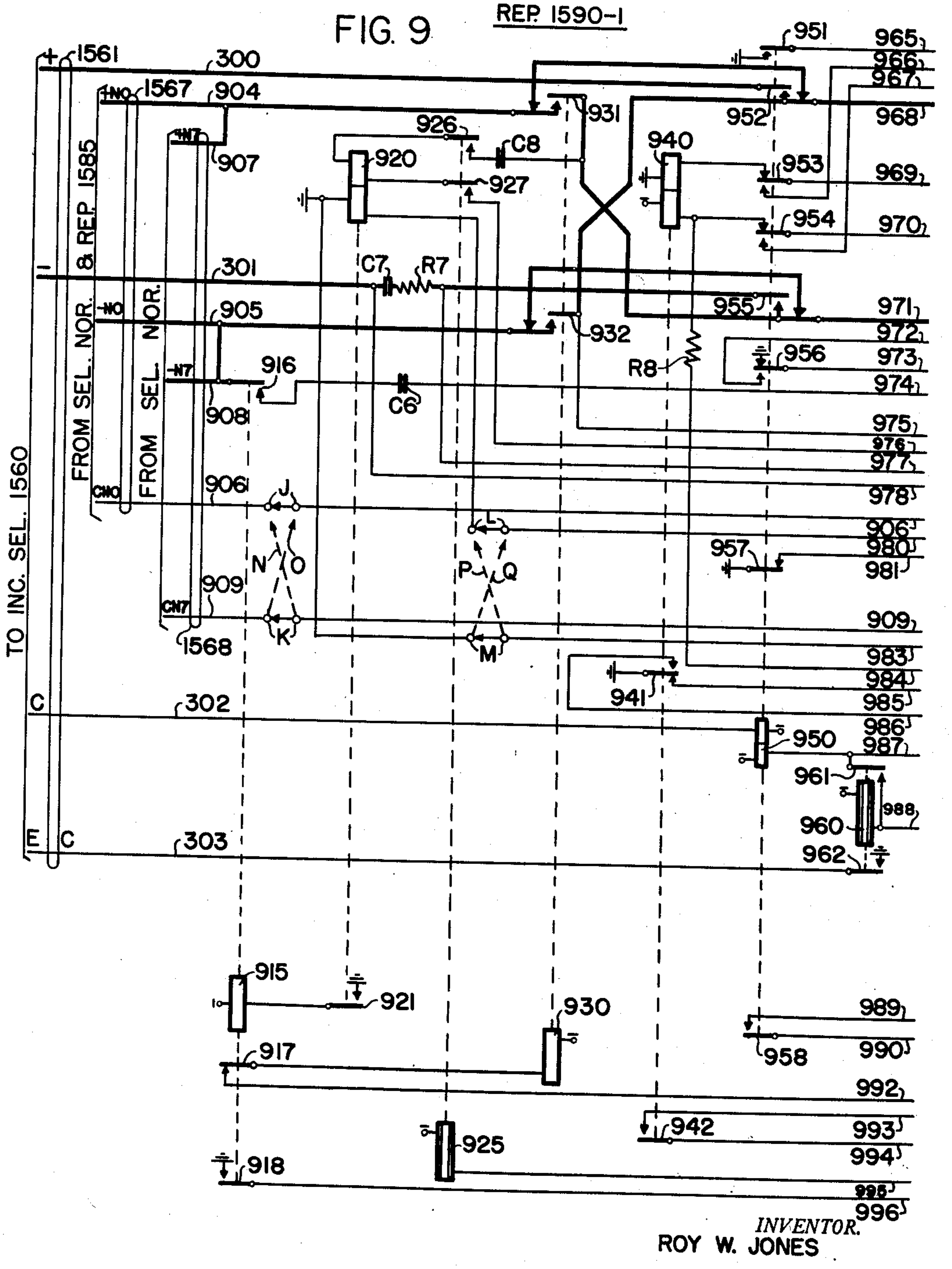
Figure 10:
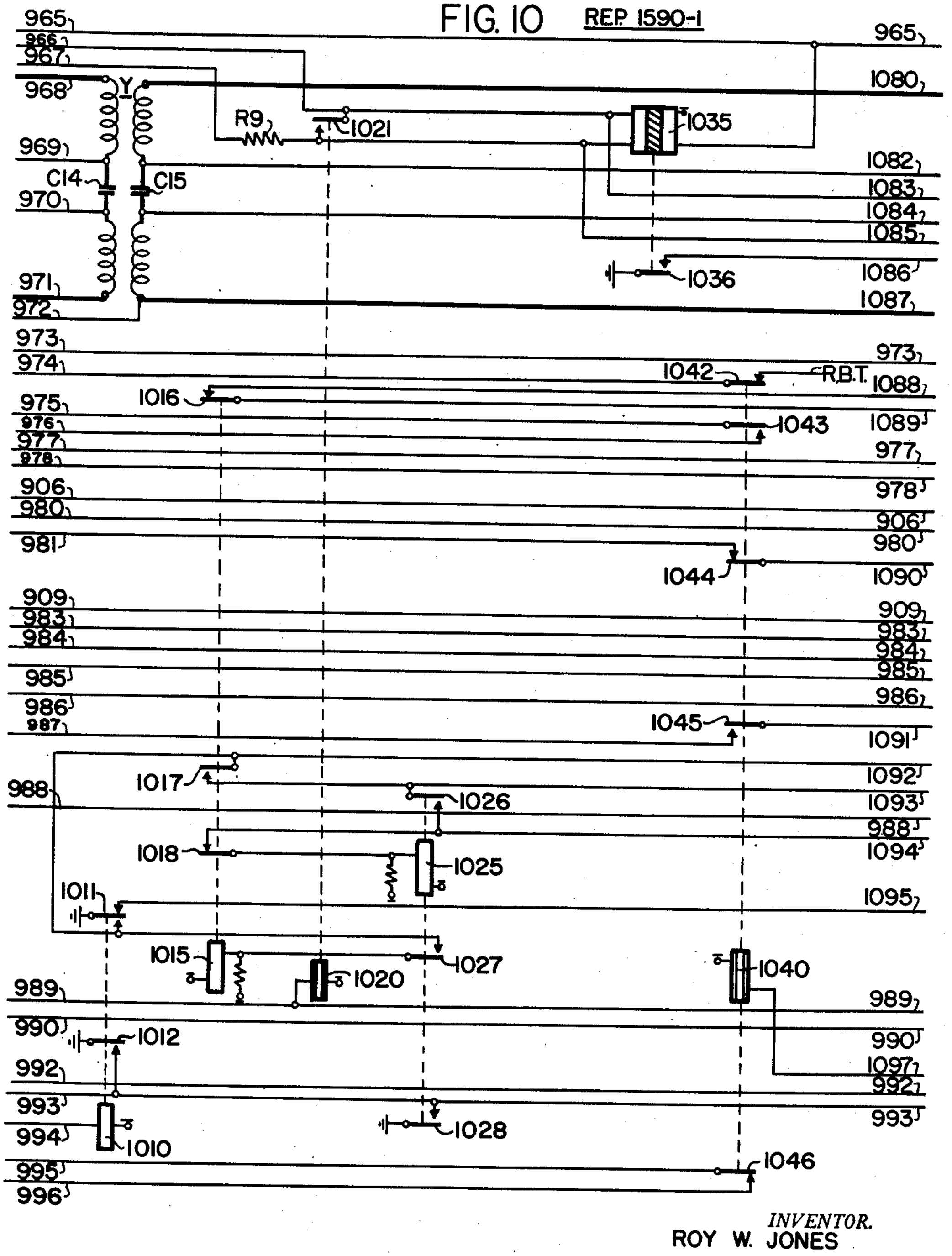
Figure 11:
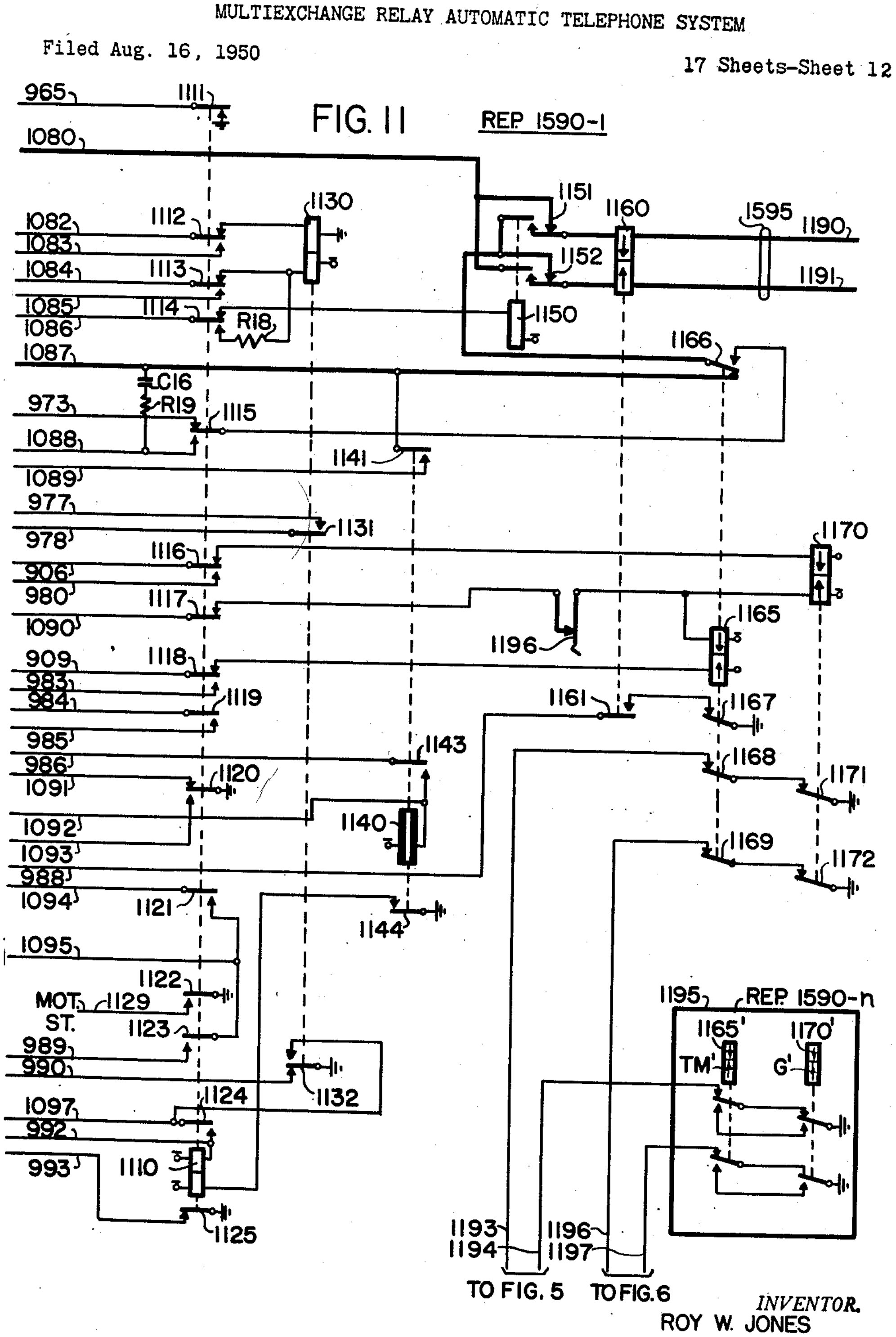

Figures 9, 10 and 11 represent a different type of repeater at the Exchange B, such as the repeater 1590 of Figure 15, leading to Exchange C, and a portion of another similar repeater.

Figure 12:
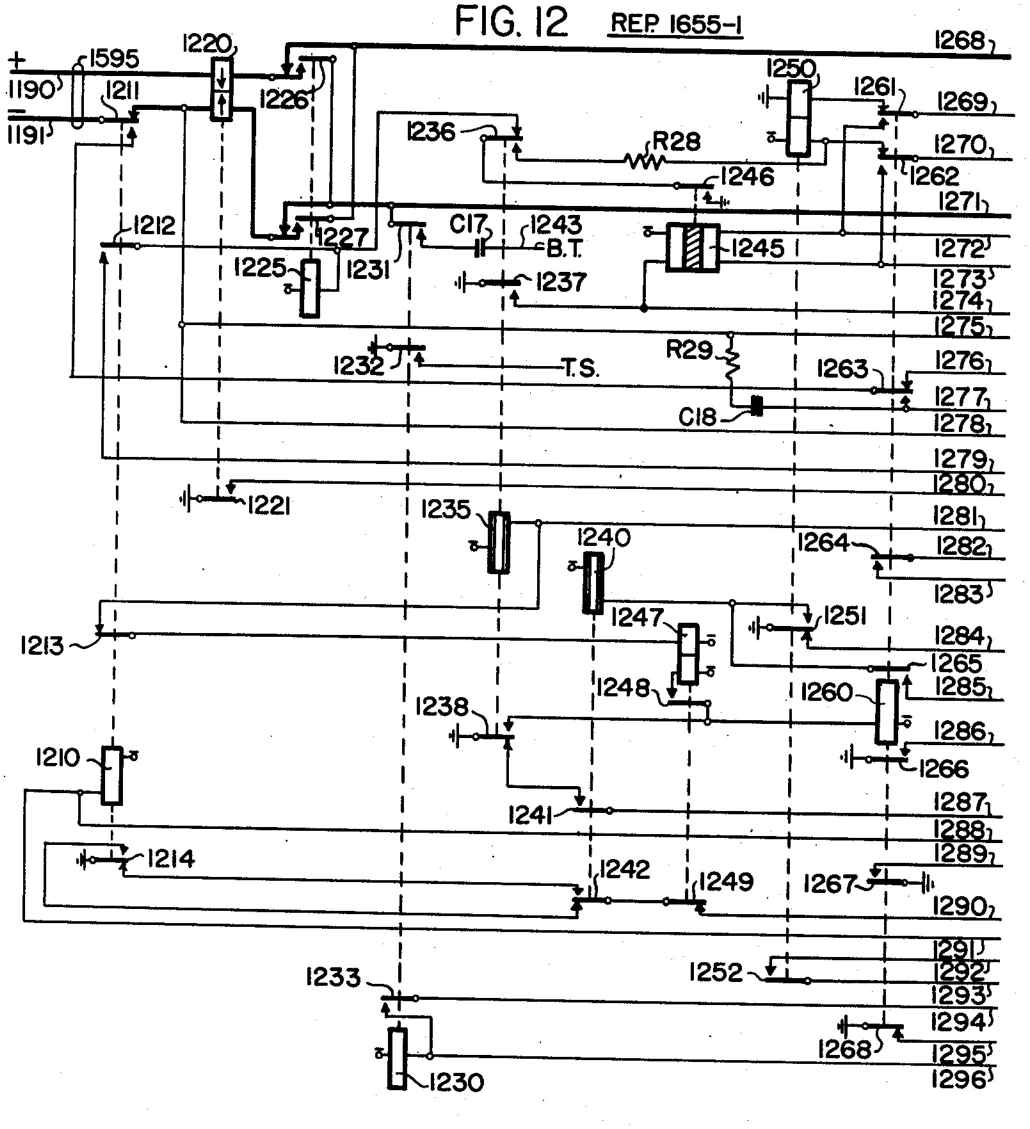
Figure 13:
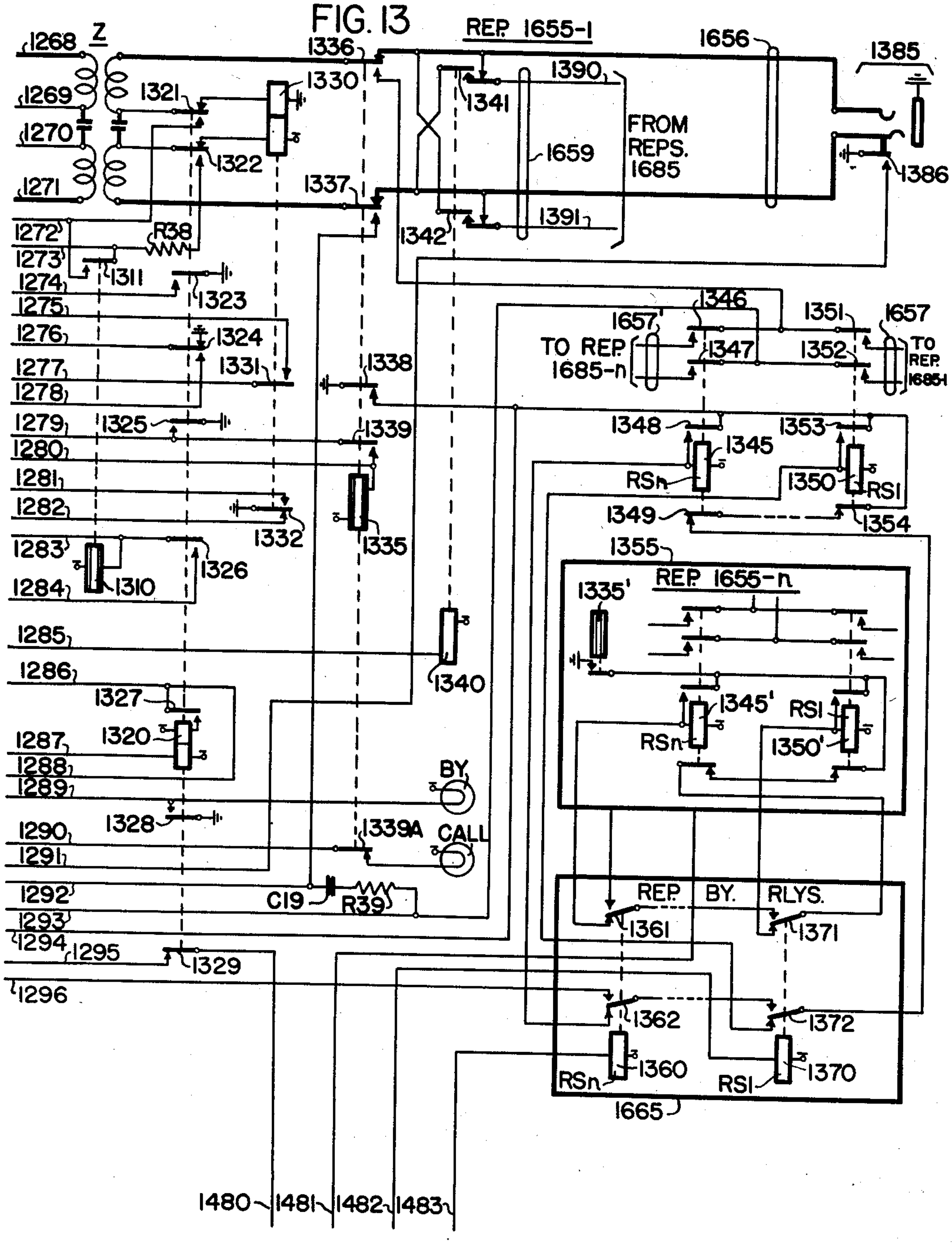
Figures 16, 17:
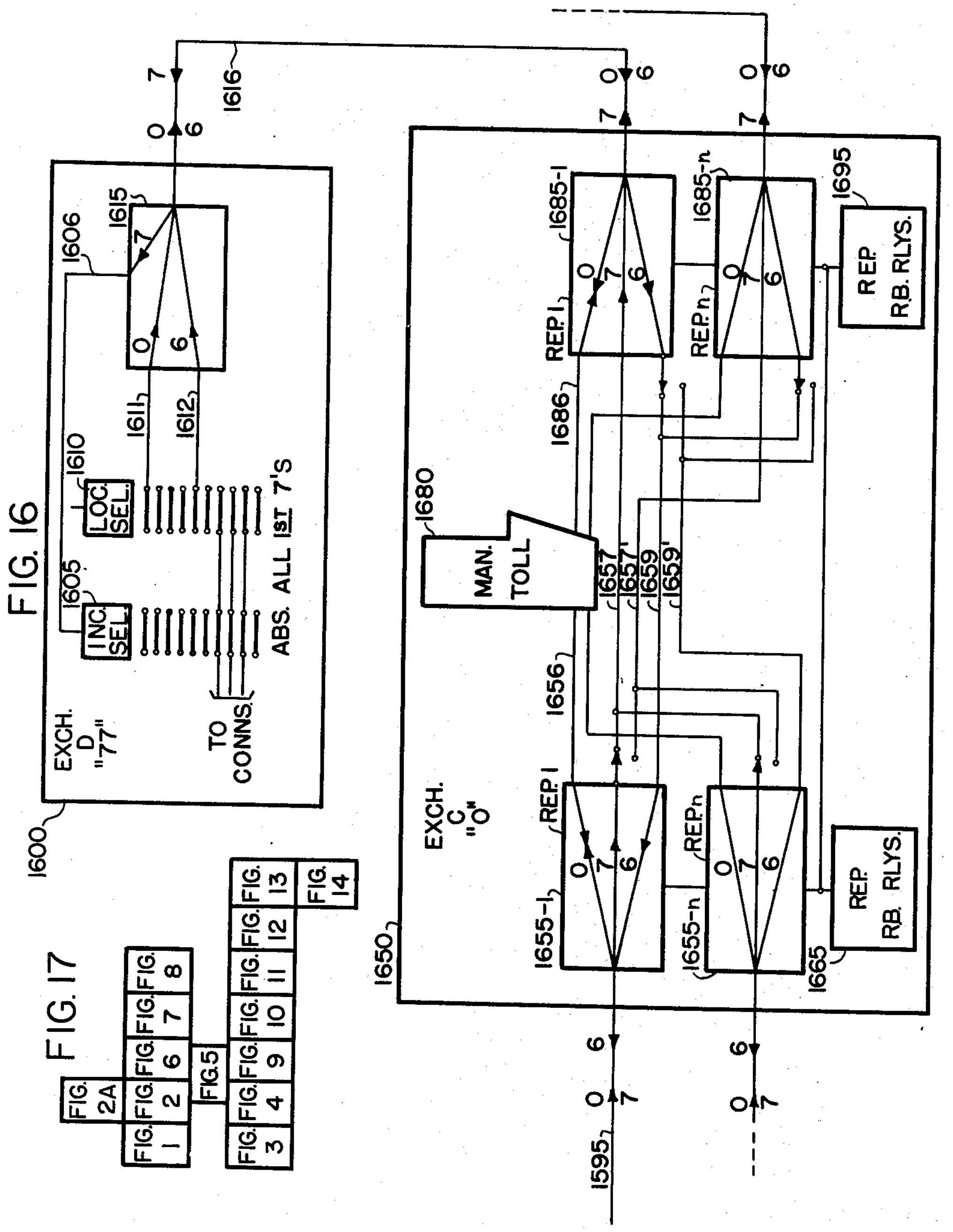

Figures 12 and 13 represent one of the switching repeaters required at the Exchange C, such as the repeater 1655–1 of Figure 16, leading to Exchange B, together with a portion of another repeater of the same group.

Figure 14:
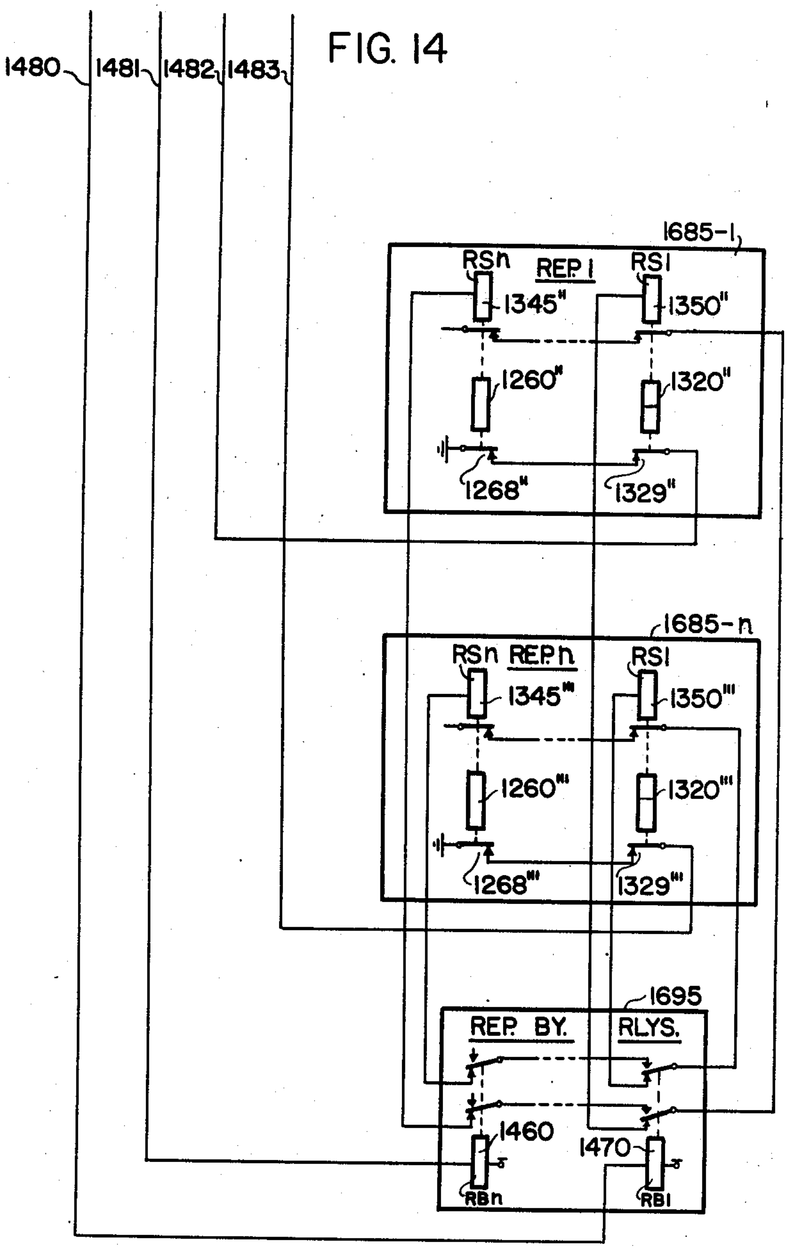

Figure 14 shows a portion of two other switching repeaters in the Exchange C, from the 1685 group of repeaters of Figure 16, connecting to Exchange D.

Figure 1:
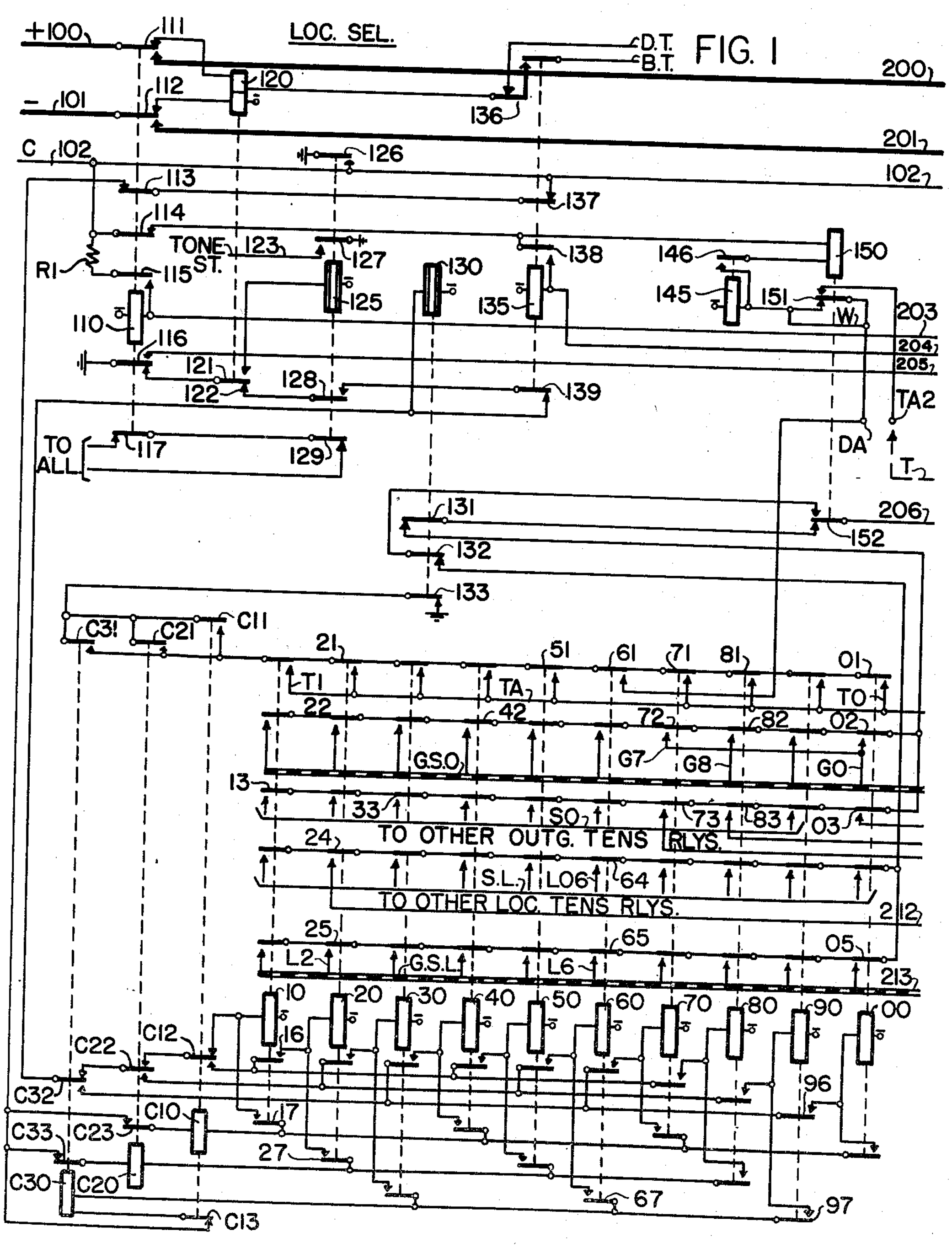
Figures 1 and 2 and 2A show one of the local selectors at the Exchange B, such for example, as selector 1565 of Figure 15.

With reference to the drawings in more detail, Figure 1 shows the miscellaneous control relays of the local selector 1565, in the upper portion, and in the lower portion, the register relays which count the dial pulses received by the selector. The conductors 100, 101 and 102 at the upper left are the speech and control conductors coming from an associated linefinder, such as the linefinder 1554 of Figure 15.

Figure 2:
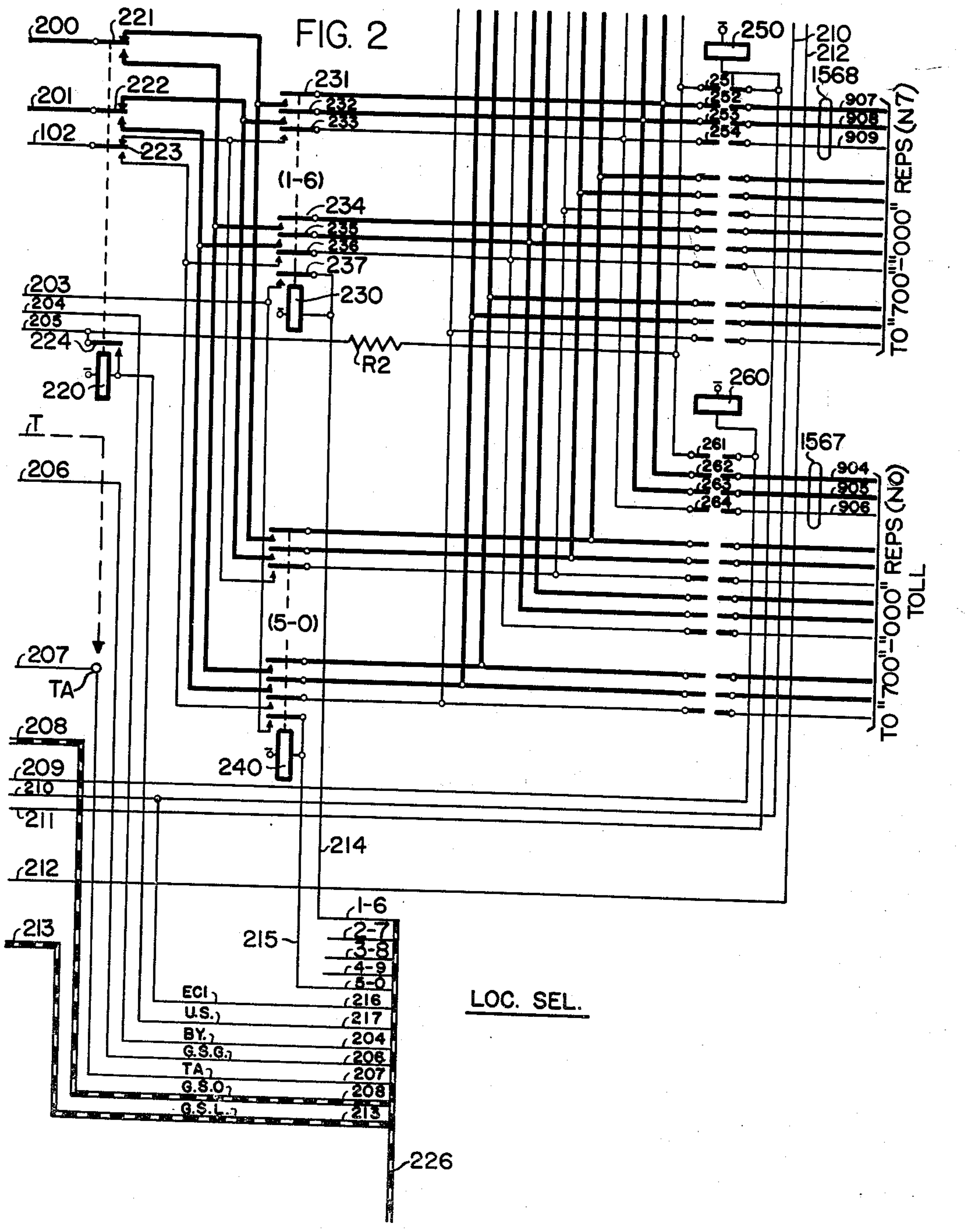
Figure 2A:
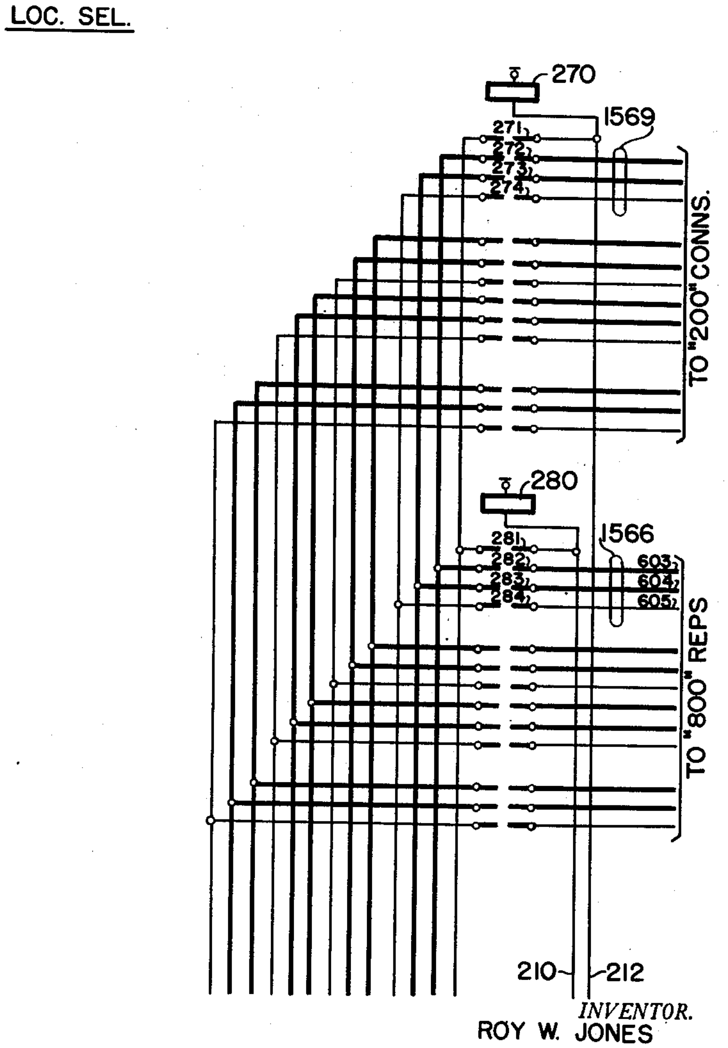

Figures 2 and 2A show a portion of the tens and units relays of the local selector. Since this is a two hundred line selector with one-digit absorption, a total of eighteen "tens," or "group" relays, are or may be required, half of which would be available for local calls and the rest reserved for trunk calls. Only four tens relays are illustrated however. In Figure 2A, tens relay 270 operates responsive to a digit "2" following an initial digit "6" to prepare the seizure of a connector 1570, over a cable 1569, for extending a local call, while tens relay 280 operates responsive to a first digit "8" to prepare the seizure of a repeater 1585 for extending a call to Exchange A. Likewise, in Figure 2 tens relay 250 operates responsive to a first digit "7" to prepare the seizure of a repeater 1590 over a cable 1568, for extending a call to Exchange D, while tens relay 260 is operative in response to a first digit "0" to prepare the seizure of a repeater 1590 over a cable 1567. for extending a call to the Exchange C. A total of five "units" relays is also required in each selector, although only two are shown. These are the 1–6 units relay 230 and the 5–0 units relay 240. Each units relay is arranged to select one of two trunks, dependent on whether or not a units switching relay 220 is operated. The tens relays are operated from the selector register, and the units relays are operated from the trunk selecting equipment of Figure 5.

Figure 3:
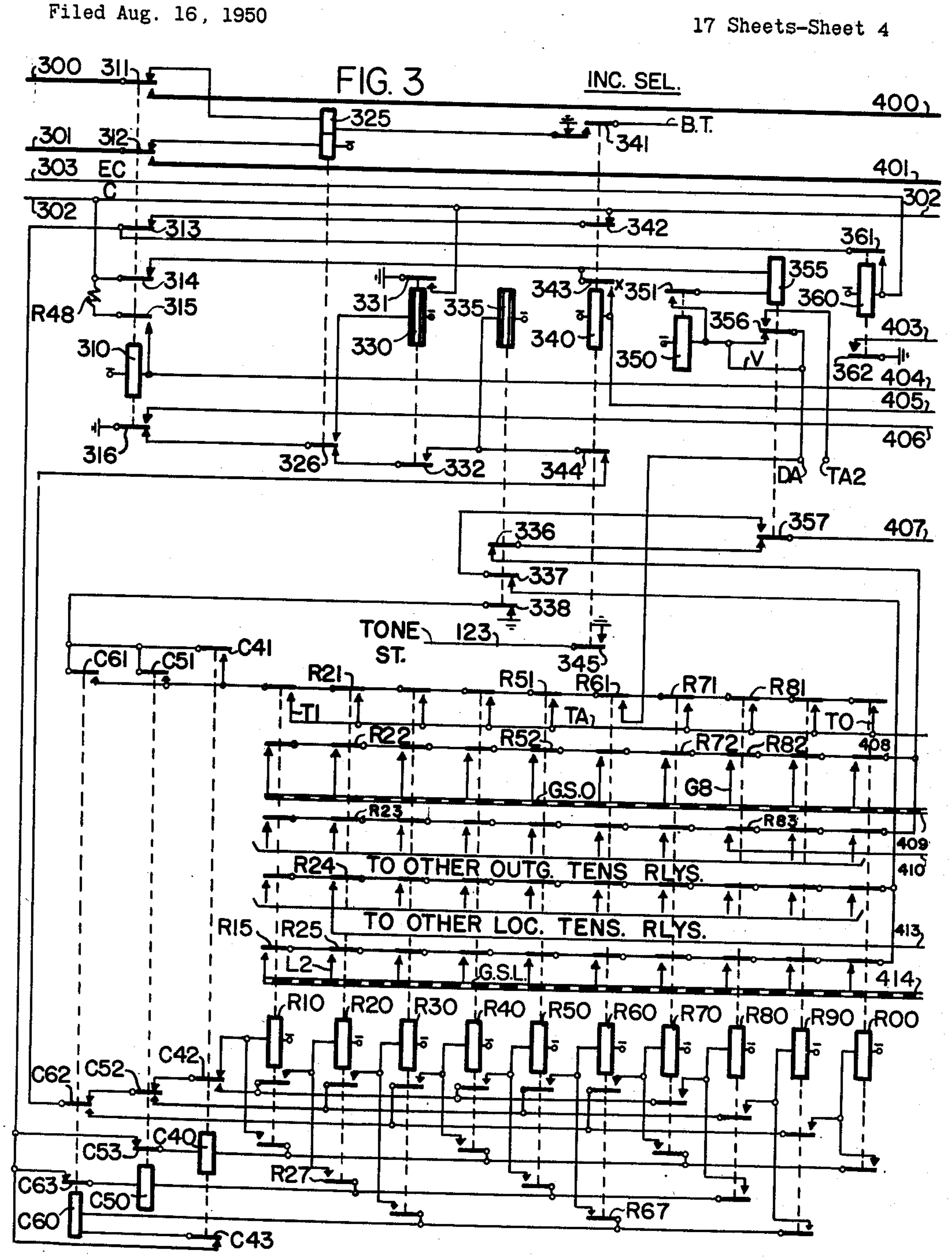
Figures 3 and 4 show one of the incoming selectors at the Exchange B, such as selector 1560 of Figure 15.

Figure 3 shows the miscellaneous control relays for the incoming selector 1560, in the upper portion, and the pulse counting register relays in the lower portion. The conductors 300, 301, 302, 303 at the upper left are the speech and control conductors incoming from an associated repeater such as the repeater 1590.

Figure 4:
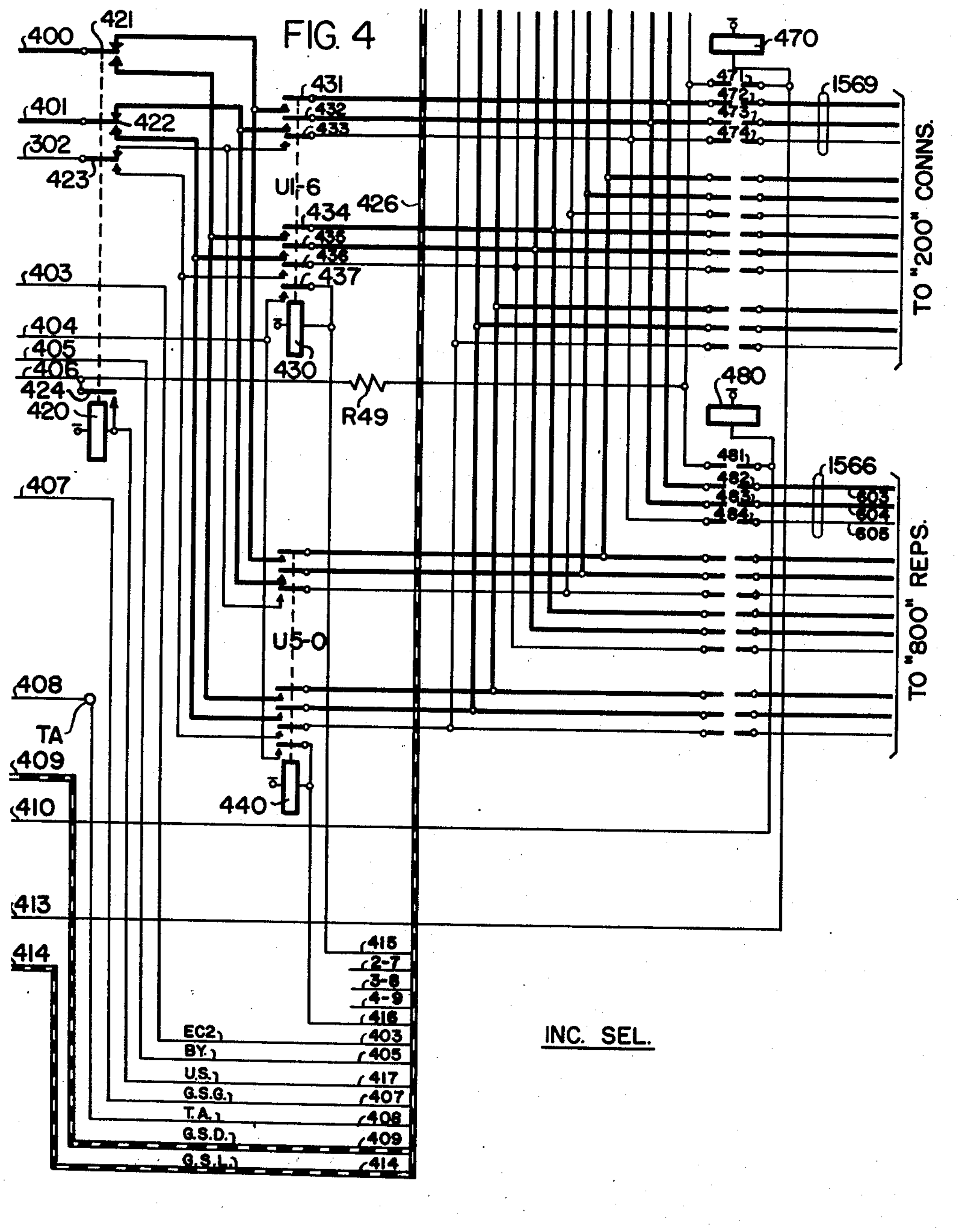

Figure 4 shows a portion of the tens and units relays of the incoming selector, relay 420 being the units switching relay, the relays 430 and 440 being the 1–6 and 5–0 units relays respectively, and relays 470 and 480 being "local" and "outgoing" tens relays respectively. Relay 470, which corresponds to relay 270 in Figure 2A, has access to local connectors, and relay 480 which corresponds to relay 280 in Figure 2A has access to the repeaters 1585 leading to Exchange A.

Figure 5 shows a portion of the trunk selecting equipment associated with the selectors of Exchange B. This equipment is outside of, and common to, the selectors, and is connected to a calling selector only very briefly, during the establishment of a connection, in response to the first usable digit received by such selector. At the left in Figure 5 are two groups of "trunk access" relays 500 and 520 the upper group being accessible from the local selectors and the lower group from the incoming selectors. An "access" relay such as 501, 521 is provided therein for each selector in the associated group and on operation extends the units and control conductors from the associated selector to groups of local and outgoing "trunk group" relays 510 and 572. A group relay such as 512, 573, is provided therein for each trunk group, and are operated from the seizing selector in accordance with the value of the trunk digits dialled, to further extend the selector units and control conductors to the proper group of trunk select relays, such as the local or outgoing "trunk select" relays 518, 519 or 595 shown in block diagram form at the upper and lower right, or the outgoing trunk select relays shown in circuit diagram form in the right central portion of this figure. These trunk select relays, which are all similar, thereupon control the selector units relays to extend the call to a preselected idle trunk in the associated group. The operated units relay in turn releases the trunk selecting equipment, whereupon the trunk select relays involved preselect the next idle trunk in readiness for the next call.

Figure 6 shows, in the center, a portion of the miscellaneous control relays of the first of the repeaters 1585 leading to Exchange A, and at the lower left, in the rectangle 626 a part of the common "repeater busy" relays which preselect or assign the repeaters 1590 for use in switching toll calls from Exchange A through Exchange B. These relays are controlled from the repeaters 1590 and in turn control the "repeater select" relays 620 and 640, to extend the call to the selected repeater 1590 over a cable such as 1571. The conductors 300′, 301′, 302′ at the upper left serve to extend an incoming call from Exchange A to Exchange B over a cable such as 1556 to an incoming selector such as 1555. Also, the conductors 603, 604, 605 at the upper left, extend to the repeater from certain of the selector normals such as from tens relay 280 in Figure 2A, over a cable such as 1566, for extending calls to Exchange A.

Figure 7 shows in the upper part, a repeating coil and some additional control relays for the repeater 1585–1, and in the lower part, enclosed in the rectangle 755, a portion of the relays and circuits for the last repeater of the group, designated 1585–N. The illustrated relay 730′ for example, corresponds to the repeater "guard" relay 730 in Figure 7, the relays 620′, 640′ correspond to the "repeater select" relays 620, 640 in Figure 6, and the relay 660′ corresponds to the "all-trunks-busy" relay 660 in Figure 6.

Figure 8 includes the rest of the control relays for the repeater 1585–1. At the upper right, the conductors 890 and 891 represent the cable 1516 leading to Exchange A, and at the lower right the conductors 875 and 880 represent "extra-control" leads coming from the bottom springs of the "trunk select" relay 540 in Figure 5, for controlling the seizure of the distant repeater 1515 in Exchange A.

Figure 9 shows a portion of the miscellaneous control relays of the first of the repeaters 1590, leading to the Exchanges C and D. The conductors 300, 301, 302, 303 at the upper left, extend over a cable such as 1561 to an incoming selector such as 1560, for completing incoming calls from Exchanges C or D, while the conductors 907, 908, 909 extend to the repeater from local selector normals, such as from tens relay 250 in Figure 2, over a cable such as 1568, for extending calls to Exchange D. The conductors 904, 905, 906 on the other hand, may come from two different sources: first, from local selector normals such as from tens relay 260 in Figure 2, over a cable such as 1567, for extending calls from Exchange B to Exchange C; and second, from a repeater 1585, over a cable such as 1571, in Figure 15, for extending switch-through calls from Exchange A to Exchange C. In connection with the test-normal conductors 906, 909, and the associated "guard" conductors 980, 983, it should be noted that these may be "connected straight" by use of the solid jumpers J, K, L, M, or they may be "connected reversed," by omitting the solid jumpers and connecting up the dotted jumpers, for the control of battery reversals, in a manner to be explained subsequently.

Figure 10 shows a repeating coil and some additional control relays for the repeater 1590–1.

Figure 11 includes the remainder of the control relays for the repeater 1590–1. The conductors 1190 and 1191 at the upper right, comprise the cable 1595 leading to Exchange C. In the lower right hand corner, the rectangle 1195 represents the last repeater of the 1590 group, and is designated **1590–*n*. The two relays 1165′, 1170′, shown therein, correspond to the repeater "guard" relays 1165 and 1170** in Figure 11.

Figure 12 shows a portion of the miscellaneous control relays of the first of the switching repeaters 1655 in Exchange C. The conductors 1190 and 1191 at the upper left serve to extend calls from and to Exchange B over a cable such as 1595 and a distant repeater 1590.

Figure 13 shows a repeating coil and the remainder of the control relays of the repeater 1655–1. At the upper right are shown: a cable 1656 leading to a jack 1385 in the manual switchboard 1680 for extending calls in either direction between the manual board and Exchange B; a cable 1659 leading from the repeaters 1685 in Exchange C for extending calls from Exchange D to Exchange B; and a cable 1657 leading to the repeater 1685–1 for extending calls from Exchange B to Exchange D. At the lower right, enclosed in the rectangle 1355 is a portion of the relays and circuits for the last repeater of the group 1655, designated **1655–*n*. The illustrated relay 1335′ therein corresponds to the "switch-through" relay 1335 in Figure 13, and the relays 1345′ and 1350′ correspond to the "repeater select" relays 1345 and 1350. At the extreme lower right in Figure 13, enclosed by the rectangle 1655, is shown a portion of the "repeater busy" relays for the 1655 group of repeaters, which preselect or assign the repeaters 1685 for use in switching through calls from Exchange B to Exchange D, by their control of the repeater-select relays in the repeaters 1655**.

Figure 14 shows in block and circuit diagram form, a portion of the relays and circuits of the first and last of the repeaters 1685, which are identical with the repeaters 1655. The relays 1260″, 1320″, 1260‴ and 1320‴ correspond to the "hold" relays 1260 and 1320 of Figures 12 and 13, while the relays 1345″, 1350″, 1345‴ and 1350‴ correspond to the "repeater-select" relays 1345 and 1350 of Figure 13. In the lower part of Figure 14, enclosed in the rectangle 1695, is shown the last and first of the "repeater busy" relays for the 1685 group of repeaters. These relays preselect or assign the repeaters 1655 for use in switching through calls from Exchange D to Exchange B, by their control of the repeater select relays in the repeaters 1685.

The general operation of the system may be described briefly, with reference to Figures 15 and 16, as follows. Each automatic subscriber is assigned a six digit number, of which the first two are the office digits, the next three the line digits, and the last the ringing digit, the automatic exchanges being assumed to be less than 1000 lines, in the interests of simplicity. A subscriber in Exchange A can call any other automatic subscriber in either of the Exchanges A or B by direct dialling of the proper six digit number, but can call Exchange D only through an operator in Exchange C, who will assess a toll charge. A subscriber in Exchange B can call any subscriber in any one of the Exchanges A, B or D by direct dialling of the required six digit number. A subscriber in Exchange D can call any automatic subscriber in either of the Exchanges D or B by dialling the required six digit number, but can call Exchange A only through an operator at Exchange C. An operator at the Exchange C on the other hand, can call any automatic subscriber in the Exchanges A, B or D by dialling the required six digit number. Any automatic subscriber in the Exchanges A, B or D can extend a call to Exchange C by simply dialling a single digit call number such as "0."

The selectors in Exchange A are arranged to absorb all first digits "8," those in Exchange B to absorb all first digits "6," and those in Exchange D to absorb all first digits "7." On a local call therefore, the selectors release after each of the office digits, which, as indicated, are "88" for Exchange A, "66" for Exchange B, and "77" for Exchange D. In response to the next digit, the call is extended to a connector in the proper hundreds group, which responds to the final three digits to select and signal the wanted called line.

If a subscriber in Exchange A wishes to call a subscriber in Exchange B, the first two digits of the call number will be "66." Upon receipt of the first digit "6" the local selector will seize a repeater 1515, which in turn will seize a repeater 1585 in Exchange B over an interoffice trunk such as 1516. The repeater 1585 in turn seizes an incoming selector such as 1555, which will absorb the second digit "6." Upon receipt of the third digit, which may be any digit other than "6," the incoming selector will extend the call to a connector such as 1570, which responds to the final three digits in the usual manner.

If a subscriber in Exchange A wishes to call a subscriber in either of the Exchanges C or D, he will dial the single digit "0." In response to this digit, the selector again seizes a repeater 1515, but over a different point of access. The repeater 1515 thereupon unbalances the trunk 1516 to the associated distant repeater 1585 in Exchange B. This causes the repeater 1585 to switch-through to a repeater 1590 in the same exchange. The repeater 1590 in turn seizes a distant repeater 1655 in Exchange C, but without unbalancing the trunk. Repeater 1655 thereupon extends the call to an operator in Exchange C, who completes the connection.

If a subscriber in Exchange B wishes to call a subscriber in Exchange A, the first two digits will be "88." In response to the first digit "8" the local selector, such as 1565, will seize a repeater 1585, which in turn seizes the associated repeater 1515 in Exchange A. The repeater 1515 then seizes the associated incoming selector such as 1505, which absorbs the second digit "8." Upon receipt of the third digit, which may be any digit except "8," the incoming selector extends the call to a connector such as 1514 which responds to the final three digits to complete the connection.

If a subscriber in Exchange B wishes to call a subscriber in the manual Exchange C he will dial the digit "0." The local selector in response to this digit will seize an idle repeater 1590. The repeater 1590 in turn will seize an associated repeater 1655 in Exchange C, without unbalancing the trunk, and the latter repeater extends the call to an operator, as before.

If a subscriber in Exchange B desires to call a subscriber in Exchange D, the first two digits of the call number will be "77." In response to the first digit "7" the local selector will again seize an idle repeater 1590, but over a different point of access. The repeater 1590 thereupon unbalances the trunk 1595 to the distant repeater 1655 in Exchange C. This causes the repeater 1655 to switch-through to a repeater 1685 which thereupon seizes a distant repeater 1615 in the Exchange D, which in turn seizes an incoming selector such as 1605. The selector 1605 will absorb the second digit "7," and in response to the third digit, which may be any digit other than "7," will seize a connector, not shown, which will complete the call in response to the final three digits.

If an operator in Exchange C wishes to extend a call to Exchange A she seizes a repeater 1655 over a cable 1656, by plugging in to a free trunk jack. The repeater 1655 thereupon unbalances the trunk 1595 to the associated distant repeater 1590 in Exchange B. The repeater 1590 in turn seizes an associated incoming selector 1560. The incoming selector 1560 in response to the first digit "8" seizes an idle repeater 1585, which in turn seizes the associated distant repeater 1515 in Exchange A. The repeater 1515 then seizes the associated incoming selector 1505 which absorbs the second digit "8." The incoming selector 1505 in response to the third digit seizes a connector such as 1514 in the desired hundreds group, which then responds to the last three digits to complete the connection.

To call a subscriber in Exchange B, the operator again seizes a repeater 1655 as in the preceding paragraph, whereupon the connection is extended as before by way of a repeater 1590 to an incoming selector 1560 in Exchange B, which absorbs the first two digits "66." In response to the third digit the selector seizes an idle connector such as 1570 in the desired hundreds group, which completes the connection in response to the last three digits.

To call a subscriber in Exchange D the operator seizes a repeater 1685 over a cable 1686. The repeater 1685 in turn seizes an associated distant repeater 1615 in Exchange D over a cable 1616, and the repeater 1615 seizes an associated incoming selector 1605. The incoming selector 1605 absorbs the first two digits "77," and in response to the third digit seizes a free connector which completes the connection in response to the last three digits of the call number.

If a subscriber in Exchange D wishes to call a subscriber in either of the Exchanges A or C, he will dial the single digit "0." The local selector will thereupon seize a repeater 1615 over a cable 1611. The repeater 1615 will thereupon seize an associated distant repeater 1685 in the Exchange C, which extends the call automatically to an operator in the manual exchange, who will complete the call as required.

If a subscriber in Exchange D wishes to call a subscriber in Exchange B, the first digit "6" will again cause the involved local selector such as 1610 to seize a repeater 1615, but over a different point of access, such as the cable 1612. The repeater 1615 thereupon unbalances the trunk 1616 to the associated distant repeater 1685 in Exchange C. The repeater 1685 thereupon switches the call through to a repeater 1655 in the same exchange. The repeater 1655 thereupon seizes a repeater 1590 in Exchange B which in turn seizes an incoming selector 1560. The selector 1560 absorbs the second digit "6," and in response to the third digit sezies a connector. The connector then responds to the final digits to complete the connection in the usual manner.

The description of the drawings and the general method of operation having been completed, a detailed description of the operation will now be given, by tracing a number of calls such as outlined in the foregoing paragraphs, through the circuits illustrated in the Figures 1 to 14 of the drawings.

*Local call—Exchange B*

Let is be assumed that a subscribed P in Exchange B of Figure 15 wishes to call a subscriber Q in the same exchange, whose call number will be assumed as "662311."

When the calling subscriber P removes his handset to initiate the call, his line circuit in the rectangle 1552, which represents a group of line circuits including those of subscribers P and Q, marks his line busy to the connectors, and causes an idle linefinder, such as that indicated by the rectangle 1554, to find the calling line, and extend it to the associated local selector 1565. The line and linefinder circuits are not shown in detail, but may be assumed similar in construction and operation to those shown and described in the previously mentioned patent 2,535,764.

Assuming further, that the seized selector is the selector of Figures 1, 2 and 2A, the extension of the calling line loop to this selector will cause the operation of the selector line relay 120 over the speech conductors 100 and 101 in known manner. This circuit may be traced from ground, through a dial tone coil not shown, over conductor DT, contacts 136, upper winding of relay 120, contacts 111, conductor 100, the finder to the calling telephone, back over the other side of the line through the finder to conductor 101, contacts 112, and the lower winding of relay 120 to negative battery. Relay 120 at contacts 121 operates release relay 125, from ground through back contacts 116. Release relay 125 upon operating, at contacts 129 opens the guard circuit to mark the link busy to the link allotter, not shown, at contacts 128 prepares the pulsing circuit, at contacts 127 grounds the tone start conductor, and at contacts 126 passes back ground over test conductor 102, to clear the calling line of attachments in known manner. At the same time, dial tone is passed back to the calling party over the line loop, from the dial tone lead DT in Figure 1.

The calling party, upon hearing the dial tone in his receiver, proceeds to dial the first digit "6." The selector line relay 120 thereupon releases and re-operates six times, in step with the dial pulses. Upon each release of relay 120, a pulse is passed to the register relays and the circuit of release relay 125 is opened momentarily. The latter relay is slow to release however and remains operated. The pulsing circuit may be traced from ground at contacts 116, through contacts 122, 128, 139, C32, C22 and C12. Counting relay 10 operates on the first pulse, and at contacts 16 and 17 prepares circuits for relays 20 and C10. Upon the re-operation of relay 120, control relay C10 operates in series with relay 10 and at contacts C12 transfers the pulsing circuit to counting relay 20. The circuit for relay C10, which becomes effective only upon the removal of the pulse, is from ground at contacts 126, through contacts 137, 113, C23, winding of relay C10, contacts 17, and winding of relay 10 to battery. Counting relay 20 operates on the second pulse, and upon removal of the pulse ground, control relay C20 operates in series with relay 20 from ground through contacts C33, winding of relay C20, contacts 27 and winding of relay 20 to battery. Relay C20 at contacts C22 transfers the pulsing circuit to counting relay 30 and at contacts C23 releases relays 10 and C10. The succeeding pulses act similarly, with relays 30 and C30 operating on the third pulse, 40 and C10 on the fourth, 50 and C20 on the fifth, and 60 and C30 on the sixth, with the previously operated register relays releasing at each step. Transfer relay 130 operates in the pulsing circuit on the first impulse, and being slow to release, remains operated during the pulsing, and releases after the last pulse, after a slight delay.

Upon the release of transfer relay 130, shortly after the last impulse, ground through break contacts 133 causes the operation of the digit absorption relay 145, by way of contacts C31 and 61, the terminal DA, the jumper W and break contacts 151 in parallel, to battery through relay 145. Relay 145 at contacts 146 extends this same ground through relay 150 to the operated register relays, by way of contacts 114, 137 and 113. The resultant change of voltage in this circuit is sufficient to cause the release of the operated register relays C30 and 60. Register relays C30 and 60 upon restoring, at contacts C31 and 61 open the operate circuit to relay 145. The local-switching relay 150 thereupon operates in series with relay 145 and locks the latter operated, from ground at contacts 126, through contacts 114, winding of relay 150, contacts 146, and winding of relay 145 to battery.

The second digit "6" again operates register relays 60 and C30, with transfer relay 130 operating as always on the first pulse and releasing shortly after the last pulse. When relay 130 restores, ground from contacts 133 again passes through contacts C31 and 61 and the jumper W to relay 145. Relay 145 is held but the relays 150, C30 and 60 are restored by this ground passing through contacts 146. The release of the register relays again opens the operate circuit to relay 145, whereupon relay 150 re-operates from ground at contacts 126, in series with relay 145, and at make contacts 152 prepares the local switching circuits.

Upon receipt of the third digit "2," the counting relays count off two steps, leaving the relays 20 and C20 operated and the other register relays normal. Upon the release of transfer relay 130, following the last pulse, ground from contacts 133 passes through contacts C21 and 21 to conductor 207 and the TA terminal, and thence by way of cable 226 to the trunk access relays 500, corresponding to this group of selectors, and operates a trunk access relay 501 therein, corresponding to the calling selector in that group.

Access relay 501 upon operating, at contacts not shown, disables the other access relays of the group momentarily, to prevent their seizure by another selector, and at other contacts, only one of which is shown, at 502, extends the selector units and other control conductors over the cables 552 and 554 to the group select relays 510 and 572. Access relay 501 also, at its contacts 503 passes ground back to the selector over conductor 206 and cable 226, thereby causing the operation of tens relay 270 in the selector, and the local-group-select relay 512 in Figure 5. The circuit for tens relay 270 is from conductor 206, through make contacts 152, break contacts 132, make contacts 24, conductor 212, and the winding of relay 270 to battery. The circuit for local-group-select relay 512 is also through contacts 152 and 132, and thence through make contacts 25, conductor L2 through cable 213, winding of relay 512 and a chain circuit not shown, to battery.

The selector tens relay 270 upon operating, at contacts 271 prepares its own locking circuit and at its other contacts prepares circuits to the connectors of the "200" group. The local-trunk-group-select relay 512 upon operating, at contacts not shown momentarily disables the other group select relays, in the rectangle 510, to prevent their seizure from a different selector group, and at other contacts, only one of which is shown, at 513, further extends the selector units and busy conductors over the cable 516 to the local-trunk-select relay group 518. Thereupon, assuming that all connectors of this group are idle, and that the first select relay, corresponding to relay 540 is operated, ground from contacts corresponding to contacts 541 is passed back over the 1–6 units conductor through the cables 516, 552 and 226 and the contacts of relays 512 and 501 to conductor 214 in the selector, and thence through the selector 1–6 units relay 230 to battery.

Units relay 230 upon operating, prepares circuits for the first and sixth connectors, the latter circuit being open at this time however, at make contacts of the units switching relay 220 which is still normal. Units relay 230 also at contacts 237 extends its own operate ground by way of conductor 203 to switch-through relay 110 which thereupon operates.

Switch-through relay 110 upon operating, at contacts 115 locks itself and units relay 230 operated to ground from contacts 126 through resistor R1, and at make contacts 116 locks tens relay 270 operated over conductor 205, resistor R2, and contacts 271. Relay 110 further, at back contacts 116 opens the circuit to release relay 125, at contacts 114 opens the locking circuit of relays 145 and 150, at contacts 113 unlocks the register relays and at back contacts 111 and 112 opens the circuit to line relay 120. Relay 110 finally, at make contacts 111 and 112 extends the calling line to the selected connector in the 200 group of connectors, such for example as the connector 1570 in Figure 15, by way of conductors 200 and 201, back contacts 221 and 222, contacts 231 and 232, contacts 272 and 273, and the cable 1569.

The connector line relay, not shown, now operates over the calling line loop, and prepares the connector to receive the final digits. In the selector, the relays 120, 145, 150, C20 and 20 restore immediately, upon the opening of their circuits, and relays 20 and C20 in turn cause the release of the operated access and group select relays 501 and 512. Release relay 125 in the selector also restores, after a slight delay, and opens its contacts 126. In the meantime, however, the seized connector has returned ground over contacts 274, 233 and 223 to test conductor 102, to hold the connection independently of relay 125. The connector also, upon seizure, causes release of an associated trunk busy relay in the trunk select relays 518 corresponding to relay 530. This relay upon releasing, causes the operation of the next select relay, corresponding for example to relay 560. The latter relay thereupon prepares the selection of the next connector in the "200" group of connectors, and releases the previously operated select relay, in a manner to be explained more in detail in the next section.

Connector 1570 now responds to the last three digits "311" to select and ring the called station Q over the cable 1572 in known manner, and when the called party answers, the connector switches through and completes the connection. Other local calls are made in similar manner.

*Trunk call—Exchange B to Exchange A*

Let subscriber P in Exchange B now initiate a call to a subscriber G in Exchange A, whose call number will be assumed to be "885721." Upon removal of the handset, an idle linefinder again finds the calling line and extends it to an associated local selector such as 1565 in Figure 15, as before. The line and release relays 120 and 125 in this selector thereupon operate, just as for a local call, and return dial tone to the calling line.

The calling subscriber now dials the first digit "8." Line relay 120 thereupon releases and re-operates eight times and passes eight pulses to the register, over contacts 116, 122, 128 and 139. The register relays thereupon count off eight steps, leaving relays 80 and C20 operated and the other register relays normal. Transfer relay 130 again operates on the first step, and restores after the last step, after the usual slight delay.

When transfer relay 130 restores following the last pulse, contacts 133 again cause the operation of access relay 501, by way of contacts C21 and 81 and conductor 207 through the cable 226. Relay 501 at contacts not shown disables the other access relays momentarily, at other contacts such as 502 extends the selector units and other control conductors to the group select relays, and at contacts 503 grounds conductor 206 back to the selector, as before. Now however, the ground on conductor 206 passes through break contacts 152 to break contacts 131, and causes the simultaneous operation of the selector tens relay 280 and the outgoing-group-select relay 573 in Figure 5. The circuit for relay 280 is from contacts 131, through contacts 83, conductor 210, and winding of relay 280 to battery. The circuit for relay 573 is from contacts 131, through contacts 82, conductor G8 through cables 208 and 226, the winding of relay 573 and a chain circuit not shown, to battery.

The selector tens relay 280 upon operating, at contacts 281 prepares its own locking circuit, and at its other contacts prepares circuits to the repeaters of the "800" group leading to Exchange A. Outgoing-group-select relay 573 upon operating, at contacts not shown momentarily disables the other group select relays such as 575 in the rectangle 572, to prevent their seizure from another selector group, and at other contacts, only one of which is shown at 574, extends the selector units and other control conductors over the cable 555 to the "800" group of outgoing-trunk-select relays in the center of Figure 5. Thereupon, assuming all repeaters of this group to be idle, and the first select relay 540 operated as illustrated, ground from contacts 541 is passed back over the 1–6 units conductor, through cables 555, 554, 552 and 226 and the contacts of relays 573 and 501, to conductor 214 in the selector, and thence to the 1–6 units relay 230. At the same time, ground from contacts 83 and conductor 210 in the selector is passed forward to the trunk select relays over the EC1 control conductor 216, cables 226, 552, 554 and 555, conductor 533, contacts 545, and conductor 889 to the selected first repeater of the "800" group. Assuming this repeater to be the repeater 1585–1 illustrated in Figures 6, 7 and 8, the circuit extends to the lower right hand corner of Figure 8, and energizes the extra-control pickup relay 830 therein.

Relays 230 and 830 operate at approximately the same time over these circuits. Relay 830 thereupon at its preliminary make contacts 832 locks to break contacts 874, and at contacts 831 prepares a circuit for operating the extra control relay 870. Units relay 230 upon operating, extends the selector talking and test conductors 200, 201 and 102 through contacts 282, 283 and 284 to the same repeater, over conductors 603, 604 and 605 in the cable 1566. Units relay 230 also, at contacts 237 passes its own operate ground over conductor 203 to switch-through relay 110, which operates.

Upon the extension of the test conductor 102 to the repeater, ground from contacts 126 causes the energization of the upper winding of the repeater guard relay 730, by way of conductor 102, contacts 223, 233, 284, conductor 605 to Figure 6, break contacts 779, and relay 730. This is without effect at the moment however, as relay 730 is normally held operated over its lower winding by way of busy key 745, conductor 816, contacts 827, conductor 817, and contacts 779A and 728 to ground.

Upon the operation of switch-through relay 110, contacts 117 thereof open another point in the link busy circuit, make contacts 116 lock up tens relay 280 over lead 205 and contacts 281, make contacts 115 lock up relays 110 and 230 to test conductor 102, while break contacts 111, 112, 113, 114, 116 open the circuits of the operated relays 120, 125, C20 and 80 in the selector. Switch-through relay 110 further, at make contacts 111, 112 extends the calling line to the selected repeater. The outward line relay 710 of this repeater is thereupon operated over the calling line loop, by way of conductors 100, 101, contacts 111, 112, conductors 200, 201, contacts 221, 222, 231, 232, 282, 283, conductors 603, 604, contacts 666, 667, conductors 684, 687, contacts 721, 724, conductors 685, 688, contacts 671, 672, conductors 686, 689, left windings of repeating coil X, contacts 722, 723, and the windings of relay 710 to ground and battery. The selector relays 120, C20 and 80 restore immediately upon the opening of their circuits, and C20 and 80 release the operated access and group select relays 501 and 573. Release relay 125 also restores, but only after a slight delay, sufficient to give the repeater time to return ground over the test conductor to hold the connection.

In the repeater 1585, line relay 710 upon operating, at contacts 712 operates pulsing relay 680, from ground at contacts 779B. Relay 680 in turn, at its contacts 682 locks itself operated, and at make contacts 681 operates the outward release relay 835 over lead 690.

Release relay 835 thereupon, at contacts 836 closes a point in the outward pulsing loop, at contacts 838 prepares a priming circuit for line relay 710, and at contacts 837 operates the outward hold relays 840 and 770 in multiple, over their lower windings.

Hold relay 840 upon operating, at break contacts 841 disconnects ground from contacts 725 from make contact 871, at make contacts 841 closes another point in the trunk pulsing loop, at contacts 842 energizes the polarizing winding of the supervisory relay 820, at contacts 843 disconnects battery reversing relay 850 and prepares a circuit to relay 780, at contacts 844 grounds the tone start lead 848, and at contacts 845 operates extra-control relay 870. Relay 870 in turn at its make first contacts 872 locks to the test conductor, at contacts 874 unlocks relay 830, and at contacts 871 further prepares the outward pulsing loops.

Hold relay 770 upon operating, at contacts 771 and 772 disconnects both windings of incoming line relay 780 from the trunk, and transfers the trunk line to the control winding of supervisory relay 820. It being remembered that both ends of the trunk are connected similarly to the respective incoming line relays of the repeaters 1585 and 1515, it is evident that a loop energizing circuit is thereby completed for the distant line relay, as follows: ground through the upper winding of the distant line relay to the positive trunk conductor 890, upper winding of the differential series control relay 860, contacts 851, conductor 800, right upper winding of the repeating coil, contacts 771, left winding of supervisory relay 820, contacts 772, right lower winding of the repeating coil, conductor 801, contacts 852, lower winding of series control relay 860, contacts 836, conductor 803, contacts 751, conductor 805, contacts 841 and 871, negative trunk conductor 891, and the lower winding of the distant line relay to battery. The distant line relay is accordingly operated over this circuit and is held subject to the control of pulsing contacts 751. The relays 820 and 860 do not operate in this circuit at this time, as their windings are energized in opposition.

Hold relay 770, in addition to the foregoing operation, also at contacts 779B opens the original circuit for pulsing relay 680 now held from its own contacts 682, at contacts 773 closes another circuit to release relay 835 from ground at make contacts 711, at contacts 774 and 775 prepares the impulse repeating circuit, at contacts 777 prepares a locking circuit for itself, at make contacts 779 locks up the operated extra-control relay 870 and grounds the test conductor 605 back to the selector to hold the connection following the restoration of the selector release relay 125 as previously explained, and at break contacts 779 and 779A disconnects both windings of guard relay 730.

Guard relay 730 accordingly restores and at contacts 731 disconnects ground from conductor 708, and thereby releases trunk busy relay 530. Relay 530 thereupon at its contacts 531 closes a circuit to the next select relay such as 560 which thereupon operates from ground through back contacts 583, 562, 531, make contacts 551 and relay 560 to resistance battery at contacts 591. Select relay 560 upon operating, at contacts 561 marks the 2–7 units conductor preparatory to directing the next call for Exchange A to the second trunk, and at contacts 563 locks itself operated and opens the locking circuit to relay 540 which restores and removes the marking from the 1–6 units conductor. When the next repeater is taken into use, trunk busy relay 550 will restore and cause the operation of the next select relay in similar manner, until the next to the last repeater is seized, when select relay 580 will operate and lock. If more than five trunks to Exchange A are provided, the sixth to tenth calls will find ground on the US conductor, from contacts such as 581, and this ground will operate units-switching relay 220 in the selector over conductor 217 to select the higher numbered trunks.

When the last repeater in the group, such as the repeater shown in part only in the rectangle 755 in Figure 7 is seized, the guard relay 730′ thereof is restored, in the manner already explained for relay 730. Contacts 731′ thereupon remove ground from conductor 709 to restore the trunk busy relay 570 in Figure 5. Relay 570 upon restoring, at back contacts 571 operates reset relay 590 from ground through make contacts 583. Relay 590, at contacts 591 removes battery from all of the select relays, causing relay 580 to restore, and at contacts 592 opens the circuit of the all-trunks-busy relay 588. Relay 588 is made slow to release however, as by the use of a copper sleeve over the core, and holds its armature for an instant. The release of relay 580 causes the release of reset relay 590, which re-closes the circuit of relay 588 before the latter can release, and replaces negative battery on the select relays. If the first repeater is again free at this time and relay 530 again operated, select relay 540 re-operates from back contacts 583, to again pre-select the first trunk.

If all of the trunks of the group are still engaged however, at this time, reset relay 590 does not release upon the release of select relay 580, but holds from back contacts 583, by way of contacts 562, 531, 551 and 571 and similar contacts on the other relays not shown. Relay 588 accordingly restores after an interval and grounds the busy conductor BY. Upon the next outgoing call to this trunk therefore, if all trunks are still busy, this ground is passed back over the cables 555, 554, 552 and 226 to conductor 204 and busy relay 135 in the calling local selector. Busy relay 135 accordingly operates, and at make contacts 136 connects busy tone from the BT conductor to the calling line through the winding of line relay 120. Busy relay 135 also, at contacts 139 opens the register pulsing circuit, at contacts 138 locks to the test conductor, and at contacts 137 releases the register, which in turn releases the operated access and trunk group relays in Figure 5. Since no units relay has operated in the selector, relay 110 also remains normal, and the selector does not switch through. The calling party on hearing the busy tone hangs up, and as soon as a trunk becomes free its associated trunk busy relay such as 530 operates, releases reset relay 590, which re-operates the associated select relay such as 540, and also relay 588.

Meanwhile, the distant repeater 1515 has extended the connection to an associated incoming selector such as 1505, which is thus prepared to receive the second digit "8" of the call number, which follows immediately. The repeater line relay 710 responds to this digit and releases and re-operates eight times. At each release of relay 710, make contacts 711 open one of the circuits to release relay 835, while break contacts 711 close a priming circuit to the lower winding of relay 710 by way of conductors 818 and 819, contacts 838, and resistor R3, to prepare relay 710 to re-operate quickly. Relay 710 at the same time, opens its make contacts 712 to release pulsing relay 680.

Pulsing relay 680 upon restoring, at contacts 682 disconnects its own holding ground, at make contacts 681 removes its ground from conductor 690 and releases relay 835, and at break contacts 681 closes a circuit to relays 740 and 760 in parallel as follows: ground at back contacts 681, conductor 695, winding of transfer relay 740, contacts 774, 752, and winding of pulse control relay 760. Relays 740 and 760 operate quickly over this circuit. Transfer relay 740 thereupon, at contacts 741 shunts the left winding of relay 820 to improve the pulsing on the trunk. Pulse control relay 760, at contacts 761 and 762 prepares the operation of pulse repeating relay 750, and at contacts 763 prepares the re-operation of pulsing relay 680.

Upon the re-operation of line relay 710, break contacts 711 thereof open the priming circuit to the lower winding of 710, now held over the calling line loop, make contacts 711 re-energize release relay 835 to hold the latter operated, and close a circuit for the operation of pulse repeating relay 750 by way of contacts 773 and 761, while make contacts 712 re-operate pulsing relay 680, from ground at contacts 763. Pulse repeating relay 750 thereupon, at contacts 751 opens the trunk loop to the distant repeater, at contacts 752 opens the circuit to relay 760 and at contacts 753 locks to ground at contacts 775. Pulsing relay 680 at the same time, at contacts 682 locks itself operated as before, at make contacts 681 closes the secondary circuit to the release relay 835, and at break contacts 681 opens the original operating circuit to relays 740 and 760. Relay 740 being made slow to release, as by the use of a copper sleeve over its core, remains operated between impulses, but relay 760 restores and releases relay 750. Relay 750 thereupon re-closes the trunk loop, and again prepares the circuit for relay 760.

The relays 680, 760 and 750 operate similarly on the succeeding restorations and re-operations of line relay 710, so that the impulsing contacts 751 are caused to repeat eight impulses to the distant repeater over the trunk. The incoming line relay of the distant repeater in turn, repeats these impulses to the associated incoming selector, such as selector 1505 in Exchange A. The selectors of Exchange A being arranged to absorb all first digits "8," the selector 1505 thereupon releases its register in a manner similar to the operation already described for a local call in Exchange B, and prepares the local trunk selecting circuits. Transfer relay 740 restores shortly after the last pulse of the series and removes the shunt from the control winding of supervisory relay 820.

Upon receipt of the third digit "5" of the call number, the distant incoming selector is caused to select an idle connector in the "500" group, such as 1514, which is thereupon made ready to receive the final digits "721" which cause the seized connector to extend the call to line "72" in the "500" group, and to signal the wanted subscriber.

When the distant called station answers, the ringing signal from the distant connector is cut off in known manner, and the connector reverses battery to the repeater 1515, which in turn reverses battery over the trunk 1516 to the calling repeater. This reverses the direction of the trunk current in the control winding of supervisory relay 820, so that both windings are poled in the same direction. Relay 820 thereupon operates, and closes a circuit from ground at its contacts 821 through make contacts 843, resistor R5 and lead 802 to the lower winding of relay 780 which operates. Relay 780 thereupon closes its contacts 781, but without effect at this time, and at make contacts 782 operates battery reversing relay 665, over contacts 777 and conductor 694. Relay 665 thereupon at its contacts 666 and 667 reverses battery to the calling local selector, for operating a call meter, not shown. Contacts 782 of relay 780 also cause the operation of the inward release relay 825, and energize the upper windings of relays 770 and 840. The operation of relay 825 is without effect however at this time, due to the open break contacts 775 and 779A. The energization of the upper windings of relays 770 and 840 is also without effect, as these relays are already operated and remain held over their lower windings.

The talking circuit is now complete, with talking battery fed to the calling party from line relay 710 of the repeater 1585, and to the distant called party from the connector 1514. The left winding of relay 820 shunts the condenser C4 of the repeating coil X as to direct current from the distant repeater's incoming line relay, and the condenser C4 shunts the control winding of relay 820 as to speech currents, in known manner. Release of the connection is under the control of the calling party. If the distant party hangs up first, nothing happens beyond the reversal of battery, through the release of relays 820, 780, and 665.

*Trunk call—Exchange B to Exchange C—toll*

If subscriber P in Exchange B wishes to make a toll call through the toll board 1680 in Exchange C, he has only to remove his handset and dial "0." Upon removal of the handset, an idle finder such as 1554 in Exchange B finds the calling line and extends it to the associated local selector 1565, similar to that shown in Figures 1, 2 and 2A. The line and release relays 120 and 125 of this selector thereupon operate, and return dial tone to the calling line.

The calling subscriber, upon hearing the dial tone, dials the single digit "0." The selector line relay 120 thereupon restores and re-operates ten times, and passes ten pulses to the register, over contacts 122, 128 and 139. The register relays in response count off the ten steps, leaving relays C10 and 00 operated. Relay 130 operates on the first pulse and releases after the last pulse, as usual.

When relay 130 restores, after the tenth impulse, contacts 133 operate access relay 501, over contacts C11 and 01, conductor 207, and cable 226. Access relay 501, at contacts not shown, disables the other access relays of the group, at other contacts such as 502 extends the selector units and other control conductors to the springs of the group select relays such as shown in the rectangles 510 and 572, and at contacts 503 operates tens relay 260 and group select relay 575 simultaneously. Tens relay 260 operates over conductor 206, back contacts 152 and 131, contacts 03 and conductor 209. Relay 575 operates over the same back contacts 152 and 131 and thence over contacts 02 and conductor G0 to relay 575 through cables 208 and 226.

Tens relay 260 upon operating, at contacts 261 prepares its locking circuit, and at its other contacts prepares circuits to the repeaters of the "700–000" group leading to Exchanges C and D. Outgoing-group-select relay 575 upon operating, at chain contacts not shown disables the other group select relays such as 573, and at other contacts such as 576 extends the selector units and other control conductors over cable 594 to the "700–000" outgoing trunk select relays 595. Thereupon, assuming the first repeater to be idle and the first select relay, not shown, corresponding to relay 540, to be operated, ground from contacts such as 541 passes back over the 1–6 units conductor through cables 594, 554, 552, 226 and conductor 214 to operate the selector units relay 230.

Units relay 230 thereupon extends the selector talking and test conductors 200, 201, 102 to the selected first repeater such as 1590, shown in detail in Figures 9, 10 and 11, by way of conductors 904, 905 and 906 in the cable 1567. Units relay 230 also at its contacts 237 passes its own operate ground over conductor 203 to switch-through relay 110 which operates.

Upon the extension of test conductor 102 to the repeater, ground from contacts 126 is extended through contacts 223, 233 and 264 to conductor 906, and thence across Figures 9 and 10 and through contacts 1116 to battery through the upper winding of guard relay 1170. Guard relay 1170 being a differential relay normally operated over its lower winding, from ground through contacts 957, 1044, 1117 and 1196, is thereby energized in opposition and releases, opening its contacts 1171 and 1172. Contacts 1171 thereupon remove ground from conductor 1193 leading to the normally operated trunk busy relay 530′ corresponding to this repeater, in the trunk select relays 595 in Figure 5. The trunk select relays not shown, in the rectangle 595, accordingly advance in the manner already explained, to preselect the next repeater of the "700–000" group for further outgoing calls from Exchange B subscribers to Exchanges C or D. Contacts 1172 at the same time remove ground from conductor 1196 leading to the repeater busy relay 630 in the rectangle 626 in Figure 6. Relay 630 accordingly restores and disconnects the select relays 620 in all of the "800" repeaters 1585 associated with the repeaters 1590, in order to prevent one of said repeaters 1585 from seizing the engaged first repeater 1590–1 of the "700–000" group, on a switch-through call from Exchange A. The trunk select relays "800," in the center of Figure 5, are not affected, as any of the repeaters 1585 of the "800" group may still be used for calls to or from Exchange A.

The selector switch-through relay 110 upon operating, at make contacts 116 locks up tens relay 260 over conductor 205 and resistor R2, at make contacts 115 locks itself and units relay 230 through resistor R1 to the test lead 102, and at break contacts 111, 112, 113, 114, and 116 opens the circuits of the operated relays 120, 125, C10 and 00 in the selector. Switch-through relay 110 further, at make contacts 111 and 112 extends the calling line through to the selected repeater. The outward line relay 940 of the repeater is thereby operated over the calling line loop, by way of the talking conductors 100, 101, contacts 111, 112, conductors 200, 201, contacts 221, 222, 231, 232, 262, 263, conductors 904, 905 to Figure 9, back contacts 931, 932, 952, 955, left windings of repeating coil Y, contacts 953, 954, and the windings of relay 940 to ground and battery. In the selector, line relay 120 and register relays C10 and 00 release at once upon the opening of their circuits by the switch-through relay 110, and relays C10 and 00 release the access and group select relays 501 and 575. Release relay 125 holds its armature for an instant however before releasing, in order to give the repeater time to return holding ground to test conductor 102.

Repeater line relay 940 upon operating over the calling line loop, at its contacts 941 prepares a locking circuit for release relay 1140, and at contacts 942 closes a circuit to pulsing relay 1010 over conductors 994 and 993 from ground at contacts 1125. Pulsing relay 1010 operates, locks itself operated at its contacts 1012, and at contacts 1011 closes a circuit to release relay 1140 via conductor 1092. Release relay 1140 now operates, at contacts 1141 prepares an outward loop circuit, at contacts 1143 closes a secondary circuit for itself, from ground at make contacts 941, and at contacts 1144 operates hold relay 1110 over its lower winding.

Hold relay 1110 upon operating, at contacts 1122 starts the ringing and tone equipment, not shown, over conductor 1129, at contacts 1124 prepares a locking circuit for itself, at contacts 1125 opens the original operate circuit to pulsing relay 1010, now held from its own contacts 1012, at break contacts 1115 disconnects ground from make contacts 1166 preparatory to the release of guard relay 1165, to prevent unbalancing the trunk, at break contacts 1116, 1117, 1118 disconnects all windings of guard relays 1165 and 1170 thereby causing relay 1165 to release, and at make contacts 1116 passes ground from the lower winding of tone relay 920 and conductor 980 back over the CN test conductor 906 to the selector, to hold the connection over the selector test conductor 102. Tone relay 920 operates over this circuit and operates tone slave relay 915. Relay 915 thereupon, at contacts 916 connects simulated ring back tone from the RBT conductor in Figure 10 through contacts 1042, conductor 974, condenser C6 and conductor 905 to the calling line, at contacts 917 disconnects battery reversing relay 930, since no metering is desired on a call to a toll operator, and at contacts 918 operates paystation tone relay 925, over conductors 996 and 995, and contacts 1046. Relay 925 in turn at contacts 926 and 927 prepares circuits for passing paystation tone to the toll operator, in case the call is from a paystation.

Hold relay 1110 in addition to the foregoing, at break contacts 1114 disconnects battery reversing relay 1150, at make contacts 1111 energizes the polarizing winding of supervisory relay 1035, at break contacts 1112 and 1113 disconnects line relay 1130 from the trunk, and at make contacts 1112, 1113 and 1115 closes a loop circuit out over the trunk 1595 to the associated repeater 1655 in Exchange C, shown in detail in Figures 12 and 13.

The distant line relay 1250 in the repeater 1655 is accordingly operated over the trunk, over a circuit which may be traced as follows: ground through the upper winding of relay 1250, contacts 1261, left upper winding of repeating coil Z, conductor 1268, contacts 1226, upper winding of series control relay 1220, positive trunk conductor 1190, upper winding series control relay 1160, contacts 1151, conductor 1080, right upper winding of repeating coil Y, conductor 1082, make contacts 1112, conductor 1083, control winding of supervisory relay 1035, conductor 1085, make contacts 1113, conductor 1084, right lower winding of repeating coil Y, conductor 1087, contacts 1141, conductor 1089, contacts 1016, conductor 1088, make contacts 1115, back contacts 1166 and 1152, lower winding of series control relay 1160, negative trunk conductor 1191, contacts 1211, lower winding of series control relay 1220, contacts 1227, conductor 1271, left lower winding of repeating coil Z, contacts 1262, and the lower winding of the inward line relay 1250 to negative battery.

Line relay 1250 upon operating, closes its contacts 1251 and 1252. Contacts 1252 have no function in this call, but contacts 1251 close an obvious circuit to release relay 1240. Relay 1240 operates, and at contacts 1242 lights the trunk call lamp "CALL" in the switchboard, from ground at back contacts 1214, through contacts 1242 and 1249, conductor 1290 and contacts 1339A. Release relay 1240 also, at contacts 1241 operates the inward hold relay 1320 over conductor 1287, from ground at back contacts 1238.

Hold relay 1320 upon operating, at contacts 1329 opens the circuit of the repeater busy relay 1470 in Figure 14 corresponding to repeater 1655–1. The relay 1470 is normally held operated from ground at contacts 1268, over lead 1295, contacts 1329, lead 1480, and the winding of relay 1470 to battery. Relay 1470 restores, upon the opening of its circuit and advances the chain circuit through its contacts to disconect the first select relays such as 1350″ and 1350‴, and preselect the next select relays such as 1345″ and 1345‴, in all of the repeaters 1685. This prevents the possible seizure of the repeater 1655–1 from any repeater of the other group, in case of a switch-through call from Exchange D, as long as repeater 1655–1 is engaged. On a toll call to or from Exchange D, the repeater involved, such as the repeater 1685–1 in Figure 14 for example, will at contacts such as contacts 1268″ or 1329″ release repeater busy relay 1370 in Figure 13 to similarly prevent possible seizure of the repeater 1685–1 from any repeater 1655 on a subsequent switch-through call from Exchange B.

Hold relay 1320 also, at contacts 1328 lights the repeater busy lamp BY in the switchboard, at contacts 1327 prepares a locking circuit for itself, at contacts 1326 prepares a tentative circuit for transfer relay 1310, at contacts 1325 prepares a circuit for battery reversing relay 1225, at make contacts 1324 prepares a shunt around break contacts 1211, in anticipation of the operation of the operator answer relay 1210. Hold relay 1320 further, at contacts 1323 energizes the polarizing winding of supervisory relay 1245, and at contacts 1321 and 1322 disconnects the outward line relay 1330 from the operator's trunk 1656, and connects the control winding of supervisory relay 1245 thereto in its place.

When the operator answers by inserting a plug not shown, into the jack 1385 corresponding to the lighted signal lamps, jack springs 1386 close and operate answer relay 1210 over conductor 1291, and at the same time lock up hold relay 1320, over conductor 1288. Answer relay 1210 upon operating, at break contacts 1214 extinguishes the CALL lamp, operates contacts 1211 without effect due to the shunt at make contacts 1324, at contacts 1212 operates the battery reversing relay 1225, from ground at contacts 1325 over conductor 1279, and at contacts 1213 disconnects the operating winding of relay 1247.

Battery reversing relay 1225 upon operating, at contacts 1226, 1227 reverses the battery feed over the trunk to the distant repeater 1590 in Exchange B. This causes reversal of the current flow in the left or control winding of the distant supervisory relay 1035, thereby energizing this winding in a direction to operate the relay. Supervisory relay 1035 in turn at its contacts 1036 closes a circuit over conductor 1086, contacts 1114 and resistor R18, to the lower winding of the inward line relay 1130.

Line relay 1130 thereupon operates, and at make contacts 1132 locks up hold relay 1110, and at the same time operates the inward release relay 1040 over conductor 1097. Relay 1130 also, at contacts 1131 shunts the condenser C7 and the resistor R7, but this is without significance in the present call. Release relay 1040 upon operating, operates contacts 1044 and 1045 without effect, due to the open break contacts 1117 and 1120 on the hold relay, at contacts 1042 disconnects ringback tone from the calling line, and at contacts 1043 completes a circuit for passing paystation tone to the toll operator. If the calling station is a paystation, the line equipment associated therewith in Exchange B places paystation tone on the test conductor of this line in known manner, which tone passes over test conductor 906, make contacts 1116, conductor 980, and the lower winding of paystation tone relay 920 to ground. This tone is thereupon passed into the upper winding by induction and thence to the repeating coil Y by way of contacts 926, condenser C8, conductor 971, both left windings of the repeating coil in series, conductors 968 and 975, contacts 1043, conductor 976, and contacts 927. The tone is now passed through the repeating coil by induction, out over the trunk and through repeating coil Z in repeater 1655–1 to the operator. This tone is only on the trunk for a brief interval, since release relay 1040 also, at its contacts 1046 opens the circuit of the slow to release paystation tone control relay 925, which restores after a short delay, and disconnects the induced tone at contacts 926 and 927. The operator can cause the tone to be repeated however, by removing the plug from the jack momentarily, and then re-inserting it, to re-operate relay 925.

The talking circuit between the calling station and the operator is now complete, and may be traced briefly as follows: calling telephone to conductors 100 and 101 in Figure 1, make contacts 111 and 112, through the selector to conductors 904 and 905, back contacts 931, 932, 952, 955, left windings of the repeating coil Y and condenser C14 in series; right windings of repeating coil Y and the condenser C15 in series, conductor 1080; conductor 1087, contacts 1141, 1016, 1115, 1166; back contacts 1151 and 1152, relay 1160, trunk conductors 1190 and 1191, contacts 1211, 1263, 1324, relay 1220, make contacts 1226 and 1227, conductors 1268 and 1271, left windings of repeating coil Z and left condenser in series; right winding of repeating coil Z and right condenser in series, back contacts 1336 and 1337, jack 1385 and the operator's cord circuit not shown to the operator's telephone. The various battery feed and supervisory relays bridged across this circuit do not interfere seriously with the voice currents, due to their inductive nature. The operator, upon ascertaining the destination of the call, extends the connection and assesses the proper charges, in any suitable manner.

*Trunk call—Exchange B to Exchange D*

Let it now be assumed that subscriber P in Exchange B wishes to make a call to a subscriber in Exchange D in Figure 16, whose call number will be taken as "774321." Upon removal of the handset at station P, an idle linefinder such as 1554 again finds the calling line and extends it to an associated local selector such as 1565, shown in Figures 1, 2 and 2A. The line and release relays 120 and 125 therein thereupon operate, and return dial tone to the calling line.

The calling subscriber upon hearing the dial tone, proceeds to dial the first digit "7." The selector line relay 120 thereupon restores and re-operates seven times, and passes seven pulses to the register via contacts 122, 128 and 139. The register relays accordingly count off seven steps, leaving relays 70 and C10 operated. Relay 130 operates as usual upon the first pulse and holds during the remaining pulses.

When transfer relay 130 restores shortly after the seventh pulse, contacts 133 thereof again operate access relay 501, by way of contacts C11 and 71, conductor 207, and cable 226. Relay 501 thereupon, at contacts not shown disables the other access relays momentarily, at contacts 502 and similar contacts not shown extends the units and other control conductors to springs of the group select relays in the rectangles 510 and 572, and at contacts 503 operates tens relay 250 and group select relay 575 in multiple, over lead 206. The circuit for relay 250 is by way of back contacts 152 and 131, contacts 73 and conductor 211. The circuit for relay 575 is also through back contacts 152 and 131 and thence by way of contacts 72, conductor G7, conductor G0 through the cables 208 and 226, and the winding of relay 575 to battery through chain circuits not shown.

The selector tens relay 250 upon operating, at contacts 251 prepares its own locking circuit, and at its other contacts prepares circuits to the repeaters of the "700–000" group leading to Exchanges C and D. Outgoing-group-select relay 575 upon operating, at chain contacts not shown momentarily disables the other group select relays such as 573, and at other contacts only one of which is shown at 576 extends the selector units and other control conductors over the cable 594 to the "700–000" outgoing-trunk-select relays 595. Thereupon, assuming that all repeaters of this group are idle, and that the first select relay, corresponding to relay 540, is operated, ground from contacts corresponding to contacts 541 is passed back over the 1–6 units lead, not shown, through the cables 594, 554, 552, 226, to conductor 214 in the selector and thus to the selector 1–6 units relay 230, which operates.

Units relay 230 upon operating, extends the selector talking and test conductors 200, 201 and 102 through contacts 252, 253 and 254, to the selected first repeater of the "700–000" group such as 1590–1, shown in detail in Figures 9, 10 and 11, over the conductors 907, 908 and 909. Units relay 230 further, at its contacts 237 extends its own operate ground to conductor 203 and switch-through relay 110, which operates.

Upon the extension of the test conductor 102 to the repeater, ground from contacts 126 of the selector is extended to conductor 909, across Figures 9 and 10, through contacts 1118 to the lower winding of guard relay 1165 and battery. Guard relay 1165 however, is a differential relay normally energized over its upper winding from ground through contacts 957, 1044, 1117, and the busying key 1196, in parallel with guard relay 1170. Guard relay 1165 therefore, now having both of its windings energized in opposition, accordingly restores, and opens its make contacts 1166, 1167, 1168, 1169, and closes its break contacts 1166. Relay 1170 is not affected.

Make contacts 1166 upon opening, disconnect the lower winding of the inward line relay 1130 to prevent its operation at this time, while back contacts 1166 pass ground from back contacts 956 to the negative conductor 1191 of the trunk 1595, to prepare the distant repeater, such as the repeater 1655–1 of Figure 16, shown in detail in Figures 12 and 13, to switch the call through Exchange C. Control relay 1160 accordingly operates, in series with the control and line relays 1220 and 1250 of the distant repeater, over the following circuit: ground at contacts 956, conductor 973, contacts 1115, 1166 and 1152, lower winding of relay 1160, trunk conductor 1191, contacts 1211, lower winding of relay 1220, contacts 1227, conductor 1271, lower left winding of repeating coil Z, conductor 1270, contacts 1262, and the lower winding of relay 1250 to battery. The operation of the control relay 1160 is now without effect however, due to the open contacts 1167.

Guard relay 1165 also at its contacts 1168 and 1169 removes ground from the conductors 1193 and 1196 leading to Figures 5 and 6 respectively. Removal of ground from conductor 1193 releases the normally operated trunk busy relay 530′ corresponding to the first repeater 1590, in the trunk select relays 595, to make this trunk busy to the selectors. The associated select relays, not shown, accordingly advance in the manner already explained for calls to Exchange A and preselect the next idle repeater 1590. Removal of ground from conductor 1196 at the same time causes the release of the repeater busy relay 630 for the corresponding first repeater 1585 of the "800" group, in the rectangle 626 in Figure 6, which relay is normally held operated over lead 1196. Relay 630 upon restoring, at its various break-make contacts, of which only the first and last are shown, disconnects the select relays 620 in the "800" repeaters, to prevent seizure of the engaged "700–000" repeater therefrom on a switch-through call from Exchange A, to be described subsequently.

Meanwhile, in the selector, switch-through relay 110 upon operating from the operated units relay 230 as previously described, at make contacts 116 locks up tens relay 250 over conductor 205, at contacts 115 locks itself and units relay 230 to test conductor 102, and at break contacts 111, 112, 113, 114, 116 opens the circuits of the operated selector line, release and register relays 120, 125, C10 and 70. Relays 120, C10 and 70 release at once, with the latter in turn releasing access and group select relays 501 and 575, but release relay 125 being slow to release holds its armature long enough to allow the repeater time to return holding ground to test conductor 102 to hold the connection.

Switch-through relay 110, in addition to the foregoing, also at its make contacts 111 and 112 extends the calling line through to the selected repeater. The outward line relay 940 of this repeater is thereupon operated over the calling line loop, over conductors 100 and 101, contacts 111 and 112, conductors 200 and 201, contacts 221, 222, 231, 232, 252, 253, conductors 907 and 908 to Figure 9, back contacts 931, 932, 952, 955, conductors 968, 971, left windings of repeating coil Y, conductors 969, 970, contacts 953, 954, and the windings of relay 940 to ground and battery.

The outward line relay 940 upon operating, at contacts 941 prepares a secondary circuit to the outward release relay 1140, and at contacts 942 operates pulsing relay 1010, from ground at contacts 1125, over conductors 993 and 994. Pulsing relay 1010 in turn, at contacts 1012 locks itself operated, and at make contacts 1011 operates the outward release relay 1140, over conductor 1092. Release relay 1140 upon operating, at contacts 1141 prepares the outward pulsing circuit, at contacts 1143 closes an alternative circuit for itself to ground at make contacts 941, and at contacts 1144 closes an obvious circuit to the lower winding of hold relay 1110, which operates.

Hold relay 1110 upon operating, at contacts 1122 grounds the ringing and tone machine start conductor 1129, at contacts 1125 opens the original operate circuit to pulsing relay 1010 now held from contacts 1012, at contacts 1120, 1121 and 1123 prepares the pulse repeating circuit, at contacts 1119 prepares a priming circuit for line relay 940, and at make contacts 1118 connects direct ground from conductor 983 to test conductor 909 and thence to test conductor 102 in the selector to hold the connection following the release of relay 125. Relay 1110 further, at break contacts 1116, 1117, 1118 opens all windings of guard relays 1165 and 1170 thereby causing the release of guard relay 1170, at break contacts 1115 removes the trunk unbalancing ground from contacts 956 from the lower trunk conductor 1191, at contacts 1111 energizes the polarizing winding of supervisory relay 1035, at break contacts 1112 and 1113 disconnects the inward line relay 1130 from the trunk, and at make contacts 1112, 1113 and 1115 completes an outward pulsing loop to the distant repeater.

In the distant repeater 1655, it will be recalled, control relay 1220 and incoming line relay 1250 had previously operated over their lower windings, in series with relay 1160 of repeater 1590, upon the release of guard relay 1165 in the latter repeater. Line relay 1250 thereupon, at contacts 1252 closes a point in the outgoing loop, and at contacts 1251 operates the inward release relay 1240, while control relay 1220 at contacts 1221 operates switch-through relay 1335.

Switch-through relay 1335 upon operating, at contacts 1339A disconnects the CALL lamp, at contacts 1339 prepares a locking circuit for itself, and at break contacts 1336 and 1337 disconnects the cables 1656 and 1659 extending from the toll board and the other repeater group respectively to the inward side of this repeater. Relay 1335 further, at make contacts 1336 and 1337 prepares a pulsing loop, and at make contacts 1338 closes a circuit to the first repeater-select relay 1350 as follows: ground at contacts 1338, contacts 1354 and 1349 and similar contacts in series on the other select relays not shown, make contacts 1372 of the first repeater-busy-relay, and the winding of relay 1350 to battery. Select relay 1350 thereupon operates, at contacts 1353 locks direct to contacts 1338, at contacts 1354 opens its own operate circuit and that of the other select relays of this repeater, such as 1345, and at contacts 1351 and 1352 prepares the seizure of the first repeater 1685 in the other group of repeaters.

The inward release relay 1240 upon operating, operates contacts 1242 without effect, due to the open contacts 1339A, and at contacts 1241 closes a circuit from ground at back contacts 1238 over conductor 1287 to the lower winding of the inward hold relay 1320. Hold relay 1320 thereupon operates, and at contacts 1329 releases the normally operated repeater busy relay 1470 corresponding to the repeater 1655–1, so as to guard the latter against seizure by switch-through calls from Exchange D, in the manner already explained for a call to the toll board. If a switch-through call comes in from Exchange D to one of the repeaters 1685 before the present call is terminated, the repeater busy relays 1695 in Figure 14 will cause the next trunk select relay in such repeater to operate, to switch the call to the next free repeater 1655.

Hold relay 1320 further, at contacts 1328 lights the trunk busy lamp BY in the switchboard, at contacts 1326 prepares a circuit to transfer relay 1310, at contacts 1325 closes a locking circuit for switch-through relay 1335, operates contacts 1324 without effect, at contacts 1323 energizes the polarizing winding of supervisory relay 1245, and at back contacts 1321 and 1322 disconnects the outward line relay 1330. Finally, hold relay 1320 at make contacts 1321 and 1322 closes a pulsing loop to the outward line relay of the repeater 1685–1, which is identical with the repeater 1655–1 of Figures 12 and 13, as previously indicated, over a circuit which may be traced as follows: ground through the upper winding of the outward line relay corresponding to relay 1330, in the repeater 1685–1, back contacts corresponding to contacts 1336 and 1341, a conductor corresponding to conductor 1390 but in the cable 1657, make contacts 1351, 1336 in Figure 13, right upper winding of repeating coil Z, contacts 1321, control winding of supervisory relay 1245, compensating resistor R38, contacts 1322, right lower winding of repeating coil Z, make contacts 1337, conductor 1292, pulsing contacts 1252, conductor 1293, contacts 1352, a conductor corresponding to conductor 1391 in the cable 1657, back contacts in repeater 1685–1 corresponding to contacts 1342 and 1337, and the lower winding of the outward line relay in said repeater 1685–1 to battery. The outward line relay 1330″, not shown, in the repeater 1685–1 operates over this circuit, and seizes an associated repeater 1615 in the Exchange D, over the cable 1616, and the repeater 1615 in turn seizes an associated incoming selector 1605, which is thus made ready to receive the second digit of the call number. The outward hold relay 1260″ also operates in the repeater 1685-1 of Figure 14, and at contacts 1268″ releases repeater busy relay 1370, to guard repeater 1685-1 against switch through calls from any other repeater 1655.

Upon the dialling of the second digit "7" by the calling subscriber P, the line relay 940 in the repeater 1590 responds by releasing and re-operating seven times. At each release of relay 940, contacts 941 open one of the circuits to the release relay 1140 and close a priming circuit to the lower winding of relay 940, by way of contacts 1119 and resistor R8, while contacts 942 open to release the pulsing relay 1010. Pulsing relay 1010 thereupon, at its contacts 1012 further opens its own circuit, at its back contacts 1011 operates pulse control relay 1025, by way of conductor 1095, contacts 1121, conductor 1094, and contacts 1018, and at its make contacts 1011 opens the other circuit to release relay 1140, which holds however, between impulses. Transfer relay 1020 also operates, in multiple with relay 1025 from the ground pulse on conductor 1095 passing by way of contacts 1123 and conductor 989. Relay 1020 being also slow to release remains operated between pulses, and releases only after the last pulse of the digit. While it is operated, its contacts 1021 maintain a shunt around the control winding of the coil 1035 to improve the pulsing circuit. Pulse control relay 1025, at contacts 1026 locks itself operated, at contacts 1027 prepares a circuit to pulse repeating relay 1015, and at contacts 1028 prepares the re-operation of pulsing relay 1010.

At each re-operation of line relay 940, break contacts 941 open the priming circuit to speed the next release, while make contacts 941 and 942 operate pulse repeating relay 1015 and re-operate pulsing relay 1010 respectively. The circuit for relay 1015 is from ground at make contacts 941, over conductor 986, the still closed contacts 1143, conductor 1092, contacts 1027, and relay 1015 to battery. Release relay 1140 is of course re-energized in multiple with this circuit. The circuit for relay 1010 is from ground at contacts 1028, over conductors 993 and 994, and contacts 942. The pulse repeating relay 1015 upon operating, at contacts 1016 opens the trunk loop to the distant repeater 1655, at contacts 1017 locks momentarily to ground on conductor 1093 from contacts 1120, and at contacts 1018 opens the circuit to pulse control relay 1025. Pulsing relay 1010 upon re-operating, at contacts 1012 again locks itself operated through contacts 942, at break contacts 1011 opens the pulsing circuit to relays 1020 and 1025, and at make contacts 1011 recloses the main circuit to the outward release relay 1140, and a hold and re-operate circuit for pulse repeating relay 1015. Pulse control relay 1025 restores, following the opening of contacts 1018, and in turn releases relay 1015, at contacts 1027. Pulse repeating relay 1015 upon restoring re-closes the trunk loop and at contacts 1018 again prepares the circuit to pulse control relay 1025.

In the distant repeater 1655, the inward line relay 1250 also releases and re-operates seven times, in response to the interruption of the trunk loop thereto at the pulse repeating contacts 1016. At each restoration of relay 1250, make contacts 1251 thereof momentarily open the circuit of release relay 1240, which remains operated however, while break contacts 1251 momentarily close a circuit to transfer relay 1310 by way of conductor 1284 and contacts 1326. Relay 1310 accordingly operates at the first impulse and holds until shortly after the last pulse of the series, and at contacts 1311 shunts the control winding of supervisory relay 1245. Line relay 1250 also, at make contacts 1252 opens the loop over the cable 1657 to the repeater 1685 at each restoration, and recloses it at each re-operation.

The outward line relay in the repeater 1685 accordingly releases and re-operates seven times, and repeats seven impulses in turn over the trunk 1616 to the repeater 1615 in Exchange D. The incoming line relay in the repeater 1615 in turn repeats these impulses to the associated incoming selector 1605. The selectors of Exchange D being arranged to absorb all first digits "7," the selector 1605 releases its register following the seventh pulse and prepares the local trunk selecting circuits, in the same manner as already described for a local call in Exchange B.

Upon receipt of the third digit "4" of the call number, the incoming selector 1605 is caused to select an idle connector, not shown, in the "400" group of connectors, which is thereupon made ready to receive the final digits "321." The seized connector in response to these digits, extends the call to line "432," and rings the wanted subscriber, in known manner.

When the called subscriber answers, the ringing signal is stopped, and the distant connector reverses battery to the repeater 1615 in known manner. Repeater 1615 in turn reverses battery over the trunk 1616 to repeater 1685, and this repeater in turn reverses battery over the cable 1657 to repeater 1655. In repeater 1655 therefore, the current through the control winding of supervisory relay 1245 is reversed, and flows in a direction to cause this relay to operate. Relay 1245 upon operating, at contacts 1246 closes a circuit through back contacts 1236 to battery reversing relay 1225 which likewise operates, and at contacts 1226 and 1227 reverses battery back to the repeater 1590 over the trunk 1595.

In the repeater 1590, current through the control winding of supervisory relay 1035 now flows likewise in a direction to cause this relay to operate. Relay 1035 thereupon, at its contacts 1036 closes a circuit over conductor 1086, contacts 114 and resistor R18 to the lower winding of the inward line relay 1130. Relay 1130 accordingly operates, closes contacts 1131 without effect, and at make contacts 1132 operates battery reversing relay 930 by way of contacts 1124, conductor 992, and contacts 917. Relay 1040 is also operated in multiple with this circuit but its operation is without effect at this time. Relay 930 however, at its contacts 931 and 932 reverses battery to the calling line P in Exchange B through the local switch train, for metering the call.

The talking circuit is now complete, through the four repeaters 1590, 1655, 1685 and 1615 and the repeating coils therein, and conversation proceeds. Talking battery is fed to the calling line from the repeater 1590, and to the called line from the engaged connector, in Exchange D.

Should all of the repeaters 1685 be engaged, at the time a switch-through call from Exchange B to Exchange D is attempted, all of the repeater busy relays in the rectangle 1665 of Figure 13 will be in the released position. When therefore, the switch-through relay 1335 is operated, ground through contacts 1338 thereof, instead of operating a repeater select relay 1345—1350, will be extended through break contacts 1372 and 1362 and similar contacts on the intervening repeater busy relays not shown, to conductor 1296 and battery through the winding of the all-trunks-busy relay 1230.

All-trunks-busy relay 1230 operates over this circuit and locks direct to the ground through contacts 1338, over conductor 1294. Relay 1230 also at contacts 1232 grounds the tone start conductor, and at contacts 1231 connects busy tone from conductor 1243 through condenser C17 to the trunk 1595, and so back through the repeater 1590 to the calling party in Exchange B. The calling station may hold on momentarily and if a repeater becomes free shortly, he will be switched through. If he holds on beyond a certain time however, and no repeater becomes available, a timer not shown, in the repeater 1590 will release the connection.

*Trunk call—Exchange A to Exchange B*

Let it now be assumed that a subscriber in Exchange A wishes to call subscriber Q in Exchange B, whose call number has been taken previously as "662311." Upon initiation of the call, the calling line is extended to an idle local selector such as 1510, in the same manner as previously described for calls originating in Exchange B. The selector 1510 thereupon returns dial tone, and the calling party dials the first digit "6." The selector 1510 thereupon extends the calling line to an idle repeater such as 1515 over cable 1512. The repeater 1515, which is like repeater 1590 of Figures 9, 10 and 11, excepting for reversal of the CN0 and CN7 test leads 906 and 909 to the guard relays 1165 and 1170 and to the paystation tone relay 920, at the terminals shown at J, K, L, M of Figure 9, is thereby seized over conductors 907, 908 and 909. Ground forwarded over test load 909 is thereby passed over jumper O to guard relay 1170 over back contacts 1116 of repeater 1515, whereupon relay 1170 restores, and marks the repeater busy. At the same time the outward line relay 940 operates, in repeater 1515, over the calling line loop, and operates pulsing relay 1010. Relay 1010 operates release relay 1140 which in turn operates hold relay 1110. Relay 1110 now prepares the outward pulsing loop, disconnects ground from make contact 1166 to prevent unbalancing the trunk, and disconnects guard relays 1165 and 1170, thereby releasing guard relay 1165 to complete the outward pulsing loop. Hold relay 1110 further at make contacts 1116 returns direct ground from the left side of relay 920 to the test normal conductor 909 over jumper Q to lead 980, through make contacts 1116, lead 906 and jumper O. Relay 920 accordingly does not operate in repeater 1515, and a pulsing loop is extended over trunk 1516 to the distant repeater 1585, which is shown in detail in Figures 6, 7 and 8, as previously indicated.

The inward line relay 780 in the repeater 1585-1 accordingly operates from the trunk 1516 over the following circuit: ground and battery through the upper and lower windings of relay 780, contacts 771, 772, right hand windings of repeating coil X, conductors 800, 801, contacts 851, 852, windings of control relay 860, contacts 871, and trunk conductors 890 and 891 to the outward pulsing loop of the distant repeater 1515. Control relay 860 is not affected by the current in this circuit since the trunk is in balance, and the current in both of in windings equal and opposing.

Line relay 780 upon operating, at contacts 781 prepares an inward pulsing loop, and at make contacts 782 operates the inward release relay 825 over conductor 813. Release relay 825 thereupon at contacts 826 operates the inward hold relay 720 over its lower winding from ground at contacts 775, by way of leads 810 and 692, and at contacts 827 disconnects ground from contacts 728 from the normally operated guard relay 730 which restores.

Upon the release of guard relay 730, contacts 731 thereof remove direct ground from lead 708 leading to the trunk busy relay 530 corresponding to this repeater, in Figure 5. Busy relay 530 accordingly restores, and advances the trunk select relays "800" in the manner previously described to pre-select the next repeater, and to make this repeater busy to the other selectors.

The inward hold relay 720 upon operating, at contacts 728 opens another point in the circuit to the lower winding of guard relay 730, at contacts 727 prepares a circuit for transfer relay 740, at contacts 726 energizes the polarizing winding of supervisory relay 820, operates contacts 725 without effect, and at contacts 721 and 724 prepares the seizure of the associated incoming selector in Exchange B. Hold relay 720 further, at break contacts 722 and 723 disconnects the outward line relay 710, and at make contacts 722 and 723 completes the seizure of the incoming selector 1555, which is identical with the incoming selector 1560 shown in Figures 3 and 4. The line relay 325 of this selector accordingly operates, over a pulsing loop which may be traced as follows: ground at back contacts 341 of selector 1555, upper winding of relay 325, contacts 311, positive talking conductor 300' thereof to Figure 6, make contacts 721, conductors 685 and 686, left upper winding of repeating coil X, make contacts 722, conductor 807, control winding of supervisory relay 820, conductor 808, pulsing contacts 781, make contacts 723, left lower winding of the repeating coil, conductors 689 and 688, make contacts 724, negative talking conductor 301', contacts 312 in selector 1555, and the lower winding of line relay 325 thereof to battery.

Line relay 325 upon opearting, at make contacts 326 operates release relay 330 from ground at contacts 316. Release relay 330 in turn, at contacts 331 grounds the test conductor 302' back to the upper winding of the repeater hold relay 720, and at contacts 332 prepares the register pulsing circuit.

When now the distant calling party in Exchange A dials the second digit "6," the distant repeater 1515 interrupts and re-closes the trunk loop to repeater 1585 six times. The inward line relay 780 in the repeater 1585 accordingly releases and re-operates the same number of times. At each release of relay 780 contacts 781 thereof momentarily open the loop circuit to the selector line relay 325, while make contacts 782 momentarily open the circuit to release relay 825, and break contacts 782 momentarily close a circuit to transfer relay 740, through contacts 727 and 778. Release relay 825 is not affected by the momentary interruptions of its circuit, and remains operated, while transfer relay 740 operates on the first pulse and being also slow to release remains operated until shortly after the sixth pulse when it again restores. During the time that relay 740 is thus operated, its contacts 741 maintain a shunt around the control winding of supervisory relay 820, to reduce the impedance of the pulse loop.

In the selector 1555, line relay 325 releases and re-operates six times, in response to the pulses, and at break contacts 326 passes six pulses to the register, from ground at contacts 316, by way of contacts 332, 344, C62, C52 and C42. Make contacts 326 momentarily open the circuit of release relay 330 at each release, but this relay is not affected thereby due to its slow release nature, and remains operated. Transfer relay 335 is operated on the first release in multiple with the pulse circuit to the register, and releases shortly after the last pulse. The register relays operate in sequence, in the same manner as described for the local selector, and count off six steps, leaving the relays C60 and R60 therein operated and locked to contacts 331, through contacts 342 and 313.

Upon the release of transfer relay 335, following the sixth pulse, ground from break contacts 338 thereof is passed to the digit absorption relay 350 by way of contacts C61, R61, 356, and the jumper V. Relay 350 accordingly operates and at its contacts 351 extend this same ground through relay 355 to the operated register relays, through contacts 314, 342 and 313. The resulting shunting effect of this resistance ground on the locking ground from contacts 331 is sufficient to shunt down the operated register relays C60 and R60. Relays C60 and R60 upon releasing, open the operate circuit of digit absorption relay 350, at contacts C61 and R61. This in turn removes a ground shunt from hundreds select relay 355, and the latter relay accordingly operates in series with relay 350, and locks the latter operated, from ground at contacts 331, over contacts 314. Relay 350 upon opearting, opens break contacts 356 without effect due to these contacts being shunted by the jumper V, and at contacts 357 prepares the local switching circuits.

Upon receipt of the third digit "2" of the call number, the counting relays count off two steps, leaving the relays C50 and R20 locked operated to contacts 331, and the other register relays normal. Upon the release of transfer relay 335, following the second pulse, ground from contacts 338 is passed through contacts C51 and R21 to the TA terminal and conductor 408, and thence over cable 426 to the trunk access relays 520 corresponding to this group of selectors, and operates a trunk access relay 521 therein corresponding to the operated selector.

Access relay 521 upon operating, at chain contacts not shown disables the other access relays of the group momentarily, and at other contacts, only one of which is shown at 522 extends the selector units and other control leads over the cables 553 and 554 to the group select relays 510 and 572. Access relay 521 in addition, at its contacts 523 grounds conductor 407 back to the selector, thereby operating tens relay 470 in the selector and the local-group-select relay 512 in Figure 5 simultaneously. The circuit for relay 470 is from the stated ground on lead 407, through make contacts 357, contacts 337 and R24, conductor 413, and winding of relay 470 to battery. The circuit for relay 512 is from the same ground through lead 407 and contacts 357 and 337, through contacts R25, lead L2 in the cables 414 and 426 and relay 512 to battery by way of a chain circuit not shown.

Tens relay 470 upon operating, at contacts 471 prepares its locking circuit, and at its other contacts only a portion of which are shown, prepares circuits to the various connectors of the "200" group. Group select relay 512 at its chain contacts not shown disables the associated relays such as 514, and at other contacts only one of which is shown at 513, further extends the selector units and other control leads over the cable 516 to the local trunk select relays 518. Thereupon, assuming all connectors of the group idle, ground from contacts corresponding to select relay contacts 541 is passed back from the select relays 518, over a 1-6 units conductor not shown, through cables 516, 554, 553, 426, and the contacts of relays 512 and 521, to the selector lead 415, and the winding of the 1-6 units relay 430 to battery.

Units relay 430 accordingly operates, and at its upper contacts prepares circuits for the first and sixth connectors, the latter circuit being now open however at make contacts 421, 422 and 423 of the units switching relay. Units relay 430 also, at contacts 437 passes its own operate ground over lead 404 to the switch-through relay 310, which operates.

Switch-through relay 310 upon operating, at contacts 315 locks itself and units relay 430 through resistor R48 to ground on test conductor 302, at make contacts 316 completes a locking circuit for tens relay 470 over lead 406, resistor R49, and contacts 471, at back contacts 316 opens the circuit to the release relay 330, at contacts 314 opens the locking circuit to relays 355 and 350, at contacts 313 opens the register locking circuit, and at break contacts 311 and 312 disconnects both windings of line relay 325. Switch-through relay 310 further, at make contacts 311 and 312 extends the repeater pulsing loop to the selected connector, by way of back contacts 421 and 422, contacts 431, 432, 472, 473 and cable 1569. The test conductor is extended to the same connector, upon the operation of units relay 430, over back contacts 423, and make contacts 433 and 474.

The connector line relay, not shown, accordingly operates over the pulsing loop controlled by the repeater pulsing contacts 781, prepares the connector to receive the final digits, and causes it to return ground over the test conductor to hold the connection. In the selector the relays 325, 350, 355, C50 and R20 release immediately, upon the opening of their circuits. The register relays C50 and R20 in turn, release the operated access and group select relays. Release relay 330 in the selector, being slow to release, remains operated for a brief interval following the opening of its circuit by relay 310, in order to give the connector time to return holding ground on over test conductor 302.

Seizure of the connector also causes the latter to open the circuit to and thereby release an associated trunk busy relay in the trunk select relays 518 corresponding to relay 530 in Figure 5. This trunk busy relay upon releasing advances the select relays to select the next free trunk, in the same manner as described under calls from Exchange B to Exchange A.

The last three digits "311" of the call number operate the repeater line relay 780 in similar manner, and contacts 781 thereof repeat these digits over the extended pulsing loop to the connector 1570. The connector is operated accordingly, to select and ring the called station Q over the cable 1572, and when the called party answers, the connector switches through, cuts off the ring, and completes the connection. The connector also reverses battery to the repeater 1585. This reverses the current flow in the control winding of supervisory relay 820, and this relay operates. Relay 820 in turn operates relay 850 which reverses battery to the trunk at contacts 851 and 852. A similar relay in the distant repeater 1515 operates in response to this reversal, and reverses battery to the calling line, to meter the call in known manner.

*Trunk call—Exchange A to Exchange C—toll*

To initiate a toll call, a subscriber such as G, in Exchange A has only to remove his handset and dial the single digit "0," just as for a subscriber in Exchange B. Upon removal of the handset, the calling line is extended through the usual line circuit and linefinder to an idle local selector, such as 1510. The selector returns dial tone, and the calling party then dials. The selector, in response to the dialled digit "0," extends the calling line to an idle repeater 1515, over a cable 1511. The repeater 1515, which as previously stated, is like the repeater 1590 except for the reversal of the test normal conductors 906 and 909, and of the ground leads 980 and 983, is thereby seized over its leads 904, 905, 906 and jumper N. Repeater 1515 accordingly releases its guard relay 1165 first, in order to unbalance the trunk, and then completes the loop over trunk 1516 to the repeater 1585 in Exchange B. Relay 920 in repeater 1515 now operates, from ground through its lower winding, jumper P to lead 983, make contacts 1118, lead 909, jumper N, and conductor 906 back to the calling line's line circuit. Relays 915 and 925 in repeater 1515 also operate, and the first disables the battery reversal and returns ring-back tone, while the latter prepares the paystation tone circuit, in the manner previously described.

In the repeater 1585, the unbalancing ground placed momentarily on the negative trunk conductor 891 by repeater 1515, causes control relay 860 and inward line relay 780 therein to operate over their lower windings in series, contacts 871 and 852, lead 801, right lower winding of repeating coil X, and back contacts 772.

The inward line relay 780 upon operating, at its contacts 781 prepares a pulse repeating loop, and at contacts 782 operates release relay 825, over lead 813. Relay 825 in turn, at contacts 826 operates hold relay 720 from ground at back contacts 775 over leads 810 and 692 and the lower winding of relay 720. Relay 825 also at contacts 827 opens the circuit to the normally energized lower winding of guard relay 730, which thereupon restores. Guard relay 730 upon restoring, at contacts 731 removes ground from conductor 708 to release the trunk busy relay 530 corresponding to this repeater, in Figure 5. Relay 530 upon releasing advances the trunk select relays in the usual way to pre-select the next free trunk of the group, and to make this repeater and trunk busy to the other selectors.

Control relay 860 upon operating, at contacts 861 operates switch-through relay 670 over lead 693. Relay 670 thereupon, at its contacts 674 locks to ground at contacts 775 over lead 692 and contacts 826, at break contacts 671, 672 and 673 disconnects the selectors, at make contacts 671, 672, 673 prepares the seizure of a repeater 1590 in the same exchange, and at contacts 675 operates the repeater select relay 620 over a circuit passing through contacts 625 and 645 and similar contacts on intervening select relays not shown, and make contacts 631. Relay 620 upon operating, at its contacts 625 opens the operate circuit to the other select relays of this repeater, preparatory to the release of relay 630, at contacts 624 locks direct to contacts 675, and at its contacts 621, 622, 623 prepares the seizure of the first "700–000" repeater.

Inward hold relay 720, which operates from release relay 825 at the same time that relay 620 operates from switch-through relay 670, at its contacts 728 opens another point in the circuit to the lower winding of guard relay 730, closes contacts 727 which are of no interest at this time since no further impulsing is required, at contacts 726 energizes the polarizing winding of supervisory relay 820, and operates contacts 721, 724, and 725 without effect. Hold relay 720 also, at break contacts 722 and 723 disconnects the outward line relay 710, and at make contacts 722 and 723 completes the extension of the connection to the first repeater of the "700–000" group, shown in Figures 9, 10 and 11.

The outward line relay 940 in the repeater 1590–1 accordingly operates, over the following circuit: ground through the upper winding of relay 940, back contacts 953, left upper winding of repeating coil Y, back contacts 952 and 931, conductor 904 in the cable 1571 to Figure 6, make contacts 621 and 671, left upper winding of repeating coil X, make contacts 722, conductor 807, control winding of supervisory relay 820, conductor 808, contacts 781, make contacts 723, left lower winding of repeating coil X, make contacts 672 and 622, conductor 905 in cable 1571 to Figure 9, back contacts 932 and 955, left lower winding of repeating coil Y, back contacts 954, and the lower winding of line relay 940 to battery. Line relay 940 upon operating, at contacts 942 operates pulsing relay 1010, which at contacts 1011 operates release relay 1140, which in turn at contacts 1144 operates hold relay 1110.

Hold relay 1110 upon operating, at break contacts 1115 disconnects ground from make contact 1166 preparatory to the release of relay 1165, to prevent unbalancing the trunk, at break contacts 1116, 1117, 1118 disconnects all windings of guard relays 1165 and 1170, causing both of these relays to release, at break contacts 1112, 1113 and 1114 disconnects relays 1130 and 1150, and at make contacts 1112, 1113 and 1115 prepares the outward loop circuit. Hold relay 1110 further, at make contacts 1116 passes ground through tone relay 920 back to the inward hold relay 720 in repeater 1585–1 over the following circuit: ground, lower winding of relay 920, conductor 980, this repeater being connected straight, contacts 1116, conductor 906 in the cable 1571, contacts 623 and 673, conductor 691, and the upper winding of relay 720 to battery. Hold relay 720 is held over this circuit, but tone relay 920 does not operate, due to the high resistance of the upper winding of hold relay 720. Relays 915 and 925 also remain normal, due to the non-operation of relay 920.

Guard relays 1165 and 1170 upon releasing, at contacts 1171 and 1168 remove ground from lead 1193 leading to the normally operated trunk busy relay 530' corresponding to repeater 1590–1 in the trunk select relays 595, and at contacts 1172 and 1169 remove ground from lead 1196 leading to the normally operated repeater busy relay 630, also corresponding to repeater 1590–1, in the repeater busy relays 626. Relay 530' accordingly restores, to preselect the next repeater 1590, and to make the repeater 1590–1 inaccessible to the selectors, in the manner already explained under calls from Exchange B to Exchange A. Relay 630 likewise restores, and makes the repeater 1590–1 busy to the other repeaters 1585, by disconnecting the select relays 620 in all of the repeaters 1585. Guard relay 1165 in addition, at contacts 1166 completes the outward loop over trunk 1595 to Exchange C, and the associated repeater 1655–1.

Line relay 1250 in the repeater 1655–1 accordingly operates over the following circuit: ground and battery through relay 1250, contacts 1261, 1262, left windings of repeating coil Z, conductors 1268, 1271, contacts 1226, 1227, windings of control relay 1220, trunk conductors 1190, 1191, windings of control relay 1160, contacts 1151, contacts 1152, 1166, 1115, 1016, 1141, conductors 1080, 1087, right windings of repeating coil Y, makes contacts 1112, 1113, and the left winding of supervisory relay 1035. Line relay 1250 thereupon, at contacts 1251 operates release relay 1240, and the latter relay, at its contacts 1242 lights the call lamp CALL, and at contacts 1241 operates the inward hold relay 1320.

Hold relay 1320 upon operating, at contacts 1328 lights the busy lamp BY, and at contacts 1329 releases the repeater busy relay 1470, in Figure 14, to make the repeater 1655–1 inaccessible to the repeaters 1685 for switch-through calls from Exchange D to Exchange B, by controlling the operation of the select relays 1345—1350 in the repeaters 1585, in the manner previously explained. Hold relay 1320 further, at contacts 1327 prepares a locking circuit, at contacts 1325 prepares a circuit to relay 1225, at contacts 1324 disconnects ground from make contact 1211 and prepares a shunt for break contacts 1211, at contacts 1323 energizes the polarizing winding of supervisory relay 1245, and at contacts 1321 and 1322 connects the control winding of relay 1245 to the operator's trunk, and disconnects the outward line relay 1330.

When the operator, in response to the signal, plugs into the jack 1385, ground from jack contacts 1386 operates answer relay 1210 over lead 1291, and locks up hold relay 1320 over lead 1288. Relay 1210 upon operating, at contacts 1214 extinguishes the call lamp, at contacts 1213 disconnects relay 1247, at contacts 1212 operates reversal relay 1225 from ground at contacts 1325, and at contacts 1211 switches the circuit for relays 1220 and 1250 through break contacts 1263 and make contacts 1324.

Battery reversing relay 1225 upon operating, at contacts 1226 and 1227 reverses the battery from line relay 1250 over the trunk 1595 to the repeater 1590. This reverses the current flow in the control winding of the supervisory relay 1035 in the latter repeater. Relay 1035 accordingly operates, and at contacts 1036 operates the inward line relay 1130 over its lower winding, through make contacts 1114 and resistor R18.

Line relay 1130 upon operating, at make contacts 1132 locks up the outward hold relay 1110, and at the same time operates inward release relay 1040 over lead 1097, and battery reversing relay 930 by way of contacts 1124, conductor 992, and contacts 917. The operation of relay 1040 is without effect in the present instance, but relay 930 at its contacts 931 and 932 reverses battery from line relay 940 back over the leads 904 and 905 and the cable 1571 to repeater 1585–1. The current flow in the control winding of the supervisory relay 820 in the latter repeater is thereby reversed and relay 820 is caused to operate. Relay 820 in turn operates battery reversing relay 850, and the latter, at its contacts 851 and 852 reverses battery from line relay 780 back over trunk 1516 to the repeater 1515 in Exchange A.

Reversal of battery in the trunk 1516 causes operation of a supervisory relay 1035 in repeater 1515. The supervisory relay 1035 in turn operates a line relay 1130, which operates a release relay 1040, but cannot operate battery reversing relay 930 due to open contacts 917, since relays 915, 920 and 925 are operated in repeater 1515, as previously explained. Release relay 1040 in the latter repeater however, at its contacts 1042 disconnects ringback tone from the calling line, at contacts 1043 closes the paystation-tone transmission circuit for the passage of paystation-tone to the operator, in case the call is from a paystation, and at contacts 1046 opens the circuit of paystation tone relay 925, which restores after an interval, to cut off the paystation tone. Since the repeater 1515 does not reverse battery to the calling line, the call is not recorded on that line's service meter, in accordance with usual toll practice.

The talking circuit between the calling and called stations is now complete, and extends through four repeaters namely 1515, 1585, 1590 and 1655, with talking battery fed to the calling line's transmitter from repeater 1515, and to the operator's, from repeater 1655 or from the cord circuit. The operator then completes the connection as requested by the calling party, in the usual way.

If a subscriber in Exchange A should attempt to make an unsupervised call to Exchange D by dialling through Exchange B, he will be unable to do so, since he has no way of unbalancing the trunk, on a call to the Exchange B selectors. The calling subscriber may attempt to reach Exchange D by dialing a first digit "6" to seize a selector in Exchange B and then dial a second digit "7" to seize a trunk to Exchange D. However the second digit will accomplish nothing, since the incoming selectors such as 1555 in Exchange B have no connections to Exchange C, as shown in Figure 15. And even if they did have such connections, the call, since the trunks are not unbalanced, would be extended to the toll board, instead of to Exchange D.

If all of the repeaters 1590 are engaged, at the time a switch-through call is initiated at Exchange A, the guard relays 1165—1170 in these repeaters will all be in the released position, as will all of the trunk busy relays 530′—570′ in the trunk select relays 595 in Figure 5, together with all of the repeater busy relays 630—650 in Figure 6. The trunk select relays 595 will accordingly guard the repeaters 1590 against seizure from any of the selectors in Exchange B, in the manner previously explained for trunk calls from Exchange B to Exchange A, while the repeater busy relays 626 will guard the repeaters 1590 against seizure from the repeaters 1585 in the following manner.

Upon the seizure of a repeater 1585 from Exchange A in response to the digit "0," the relays 860 and 780 therein operate as before, and cause relays 670, 825 and 720 to again operate. Relay 670 locks to contacts 775 and at its upper contacts prepares the switch through circuits as before, but at its contacts 675 now operates busy relay 660, by way of break contacts 625, 645, 631, 651 and similar series contacts not shown. Relay 660 upon operating, at its contacts 663 starts the tone machine, at its contacts 662 locks direct to contacts 675, and at its contacts 661 connects busy tone through condenser C1 to the right hand windings of the repeating coil X, and thence to the trunk 1516 and so to the calling subscriber in Exchange A. If a repeater 1590 becomes free immediately while the calling party is still on the line, relay 660 will restore and the call will switch through. Otherwise, if the calling party does not hang up, timing circuits, not shown, will release the connection.

*Trunk call—Exchange C to Exchange B*

To seize a trunk to Exchange B, the operator at Exchange C may plug into any available jack such as jack 1385, whose call and busy lamps are dark. Thereupon, jack springs 1386 close a circuit over lead 1291 to the answer relay 1210 in the repeater 1655–1, and this relay operates. Shortly thereafter, a circuit is completed to the outward line relay 1330 through the cord circuit, not shown, the tip and ring contacts of the jack, cable 1656, back contacts 1336 and 1337, right hand windings of repeating coil Z, back contacts 1321 and 1322, and the windings of relay 1330 to ground and battery. Relay 1330 thereupon also operates.

Trunk answer relay 1210 upon operating, at make contacts 1214 lights the call and supervisory lamp CALL, at contacts 1213 disconnects relay 1247, at break contacts 1211 disconnects the lower winding of relays 1220 and 1250, and at make contacts 1211 grounds the negative trunk conductor 1191 leading to the distant repeater 1590–1 in Exchange B, thereby to seize the said repeater and prepare it for through-dialling, which is not required however, in the present call.

Line relay 1330 upon operating, at its contacts 1331 prepares an outward pulsing loop, and at make contacts 1332 operates the outward release relay 1235. Relay 1235 in turn, at make contacts 1236 prepares a circuit to the lower winding of line relay 1250, at contacts 1237 energizes the polarizing winding of supervisory relay 1245, and at contacts 1238 operates the outward hold relay 1260. Relay 1260 thereupon, at break contacts 1261 and 1262 disconnects both windings of line relay 1250 from the trunk, at break contacts 1263 disconnects the trunk unbalancing ground from the negative trunk conductor, at make contacts 1261, 1262 and 1263 completes the outward pulsing loop, at contacts 1264 prepares a circuit to transfer relay 1310, at contacts 1266 closes a second circuit to relay 1210 over leads 1286 and 1288, at contacts 1267 lights the busy lamp, and at contacts 1268 removes ground from conductor 1480. Ground is thereby removed from the circuit over which the repeater busy relay 1470 is normally held operated, and the latter relay restores, to make the repeater 1655–1 busy to switch-through calls, and to preselect the next repeater in that group for the next switch-through call.

In the repeater 1590 in Exchange B, the control relay 1160 and the inward line relay 1130 operate over their lower windings in series, when the distant answer relay 1210 unbalances the trunk by grounding the negative trunk lead. The circuit for these relays is from ground at back contacts 1324, over conductor 1276, contacts 1263 and 1211, trunk conductor 1191, lower winding of relay 1160, back contacts 1152 and make contacts 1166, lead 1087, right lower winding of repeating coil Y, lead 1084, back contacts 1113, and the lower winding of relay 1130 to battery. Control relay 1160 upon operating, at its contacts 1161 operates the extra-control relay 960 over lead 988, from ground at make contacts 1167, and the latter relay in turn, at its contacts 962 grounds the EC conductor 303.

Line relay 1130 upon operating, at contacts 1131 prepares the inward pulsing loop, and at make contacts 1132 operates the inward release relay 1040, over lead 1097. Relay 1040 thereupon operates its contacts 1042 and 1046 without effect, at contacts 1045 locks up extra-control relay 960 and operates the inward hold relay 950 from ground at contacts 1120 over leads 1091 and 987, and at contacts 1044 releases the normally operated guard relays 1165 and 1170, by disconnecting ground from their upper and lower windings respectively.

The inward hold relay 950 upon operating, at contacts 958 prepares a circuit for transfer relay 1020, at contacts 957 further opens the circuit to the guard relays 1165 and 1170, at break contacts 956 removes ground from lead 973, at make contacts 956 prepares a shunt for make contacts 1166 in anticipation of the release of guard relay 1165, at make contacts 951 energizes the polarizing winding of supervisory relay 1035, at break contacts 952, 953, 954, 955 disconnects line relay 940 and the selector line normal conductors such as 904 and 905, and at make contacts 952, 953, 954, 955 completes an inward pulsing loop over the cable 1561 to the associated incoming selector 1560.

Guard relays 1165 and 1170 upon releasing, at contacts 1168, 1169, 1171, 1172 remove ground from leads 1193 and 1196 leading to the normally operated busy relays 530′ and 630 corresponding to this repeater in Figures 5 and 6 respectively. Busy relay 530′ thereupon restores to advance the select relays 595 and to make the repeater 1590–1 busy to the other selectors. Busy relay 630 also restores and disconnects the select relays 620 in the repeaters 1685, to make the repeater 1590–1 busy to switch-through calls from Exchange A to the toll board. Guard relay 1165 in addition, at contacts 1167 opens the operate circuit to relay 960, now locked to ground on lead 987, at make contacts 1166 opens the original operate circuit to the lower winding of line relay 1130 and at break contacts 1166 substitutes a new circuit therefor, extending through back contacts 1115, lead 973, make contacts 956, right lower winding of repeating coil Y, lead 1084, and break contacts 1113.

When the hold relay 1260 in the repeater 1655–1 disconnects the trunk unbalancing ground from the negative trunk conductor, and completes the outward pulsing loop, as previously explained, control relay 1160 restores, but line relay 1130 remains held over the loop which may be traced as follows: ground and battery through relay 1130, back contacts 1112, 1113, conductors 1082, 1084, repeating coil right upper winding and lead 1080; repeating coil right lower winding, lead 972, contacts 956, conductor 973 and contacts 1115 and 1166; contacts 1151, 1152, windings of relay 1160, trunk conductors 1190, 1191; make contacts 1211 and 1263, lead 1277, pulsing contacts 1331 and lead 1275; both windings of control relay 1220, contacts 1226, 1227, leads 1268, 1271, left windings of repeating coil Z, leads 1269, 1270, make contacts 1261, 1262, and through the control winding of supervisory relay 1245.

Meanwhile, in the Exchange B, the seizure of the incoming selector 1560 shown in Figures 3 and 4, is accomplished from repeater 1590–1 over cable 1561 in the following manner. When the extra control relay 960 is operated from control relay 1160, it passes ground over the EC conductor 303 to the selector EC relay 360 which operates, and in turn grounds lead 403 leading to the trunk access relays. And when, immediately thereafter, the inward hold relay 950 is operated from release relay 1040 to close the selector pulsing loop, the line relay 325 in the selector is operated, over the following circuit: ground from contacts 341 through the upper winding of line relay 325, contacts 311, conductor 300, make contacts 952, conductor 968, left upper winding of repeating coil Y, conductor 969, make contacts 953, conductor 966, control winding of supervisory relay 1035, compensating resistor R9, conductor 967, make contacts 954, conductor 970, left lower winding of repeating coil Y, conductor 971, make contacts 955, lead 977, pulsing contacts 1131, lead 978, conductor 301, break contacts 312, and the lower winding of relay 325 to battery.

Line relay 325 upon operating, passes ground from back contacts 316 to release relay 330 which also operates. Release relay 330 in turn, at contacts 332 prepares the register pulsing circuit, and at contacts 331 grounds the test conductor 302, thereby locking relay 360 through contacts 342, 313, 361, as well as holding the repeater hold relay 950, over its upper winding. The selector is now ready to receive impulses, approximately $\frac{1}{10}$ of a second or less after the operator in Exchange C has plugged into the jack 1385.

Assuming that the operator wishes to extend a call to subscriber Q in Exchange B, she will, after plugging in, proceed to dial the call number "662311." In response to the first digit "6," line relay 1330 in repeater 1655 releases and re-operates six times. At each release of relay 1330, make contacts 1331 thereof open the trunk loop, make contacts 1332 open the circuit to the release relay 1235, and back contacts 1332 close a circuit to transfer relay 1310, over leads 1282 and 1283 and contacts 1264. And at each re-operation of relay 1330 make contacts 1331 re-close the trunk loop, make contacts 1332 re-close the circuit of release relay 1235, and break contacts 1332 open the circuit of transfer relay 1310. Transfer relay 1310 operates on the first pulse, holds during the remaining pulses, and releases after the last pulse, for each digit. While it is operated, its contacts 1311 shunt the control winding of supervisory relay 1245 to improve the outward pulsing circuit. Release relay 1235 holds its armature during all of the dialling.

In the repeater 1590, the inward line relay 1130, in response to the interruptions of the trunk loop at contacts 1331, also restores and re-operates six times. At each release of relay 1130, its pulsing contacts 1131 open the previously traced loop circuit to the selector line relay 325, make contacts 1132 open the circuit of release relay 1040, and back contacts 1132 close a circuit to transfer relay 1020, over leads 990 and 989, and contacts 958. And at each re-operation of relay 1130, pulsing contacts 1131 re-close the selector loop, make contacts 1132 re-close the circuit of release relay 1040, and break contacts 1132 open the circuit of transfer relay 1020. Transfer relay 1020 operates on the first pulse, holds until shortly after the last pulse, and then releases. While it is operated, its contacts 1021 shunt the control winding of supervisory relay 1035 in the selector pulsing loop. Release relay 1040 is not affected by the momentary interruptions of its circuit, and remains operated.

In the selector 1560, line relay 325 in response to the pulsations of contacts 1131, also restores and re-operates six times, and passes six pulses to the register by way of contacts 326, 332 and 344. Transfer relay 335 operates on the first pulse, in parallel with the register pulsing circuit, and restores shortly after the last pulse, while release relay 330 remains operated during the momentary interruptions in its circuit at make contacts 326. The register relays in response to the pulses, step off six steps, leaving the relays C60 and R60 operated and locked to the test conductor 302.

When transfer relay 335 restores, after the sixth pulse, it passes ground from its break contacts 338 through make contacts C61, R61, and the shunted break contacts 356 to digit absorption relay 350, which operates. Relay 350 thereupon at contacts 351 extends this operate ground through hundreds select relay 355 to the grounded test conductor 302, and the shunting effect of this resistance ground in the register locking circuit causes the release of the operated relays C60 and R60. Relay 355 having ground on both sides of its winding does not operate, but when the register relays restore, the ground from contacts 338 is removed, and relay 355 operates from hold conductor ground in series with relay 350, and locks the latter operated. Relay 355 operates its contacts 356 without effect, and at contacts 357 prepares the local switching circuits.

The second digit "6" is passed through the repeaters 1655 and 1590 in similar manner, and line relay 325 responds as before to step the register six steps, leaving the register relays C60 and R60 again locked operated. Transfer relay 335 again operates on the first pulse, and when it restores shortly after the last pulse, ground from contacts 338 passes through contacts C61, R61 and the jumper V to the operated absorption relay 350. This ground holds relay 350, but shunts down relays 355, C60 and R60. The register relays upon releasing, again open the operate circuit of relay 350, whereupon relay 355 re-operates in series with 350 from ground on test conductor 302.

Upon receipt of the third digit "2" line relay 325 passes two pulses to the register, leaving relays C50 and R20 therein locked operated to ground from contacts 331 on the hold conductor. When transfer relay 335 restores, after the second pulse, ground from contacts 338 passes through contacts C51 and R21 to conductor 408 and trunk access relay 521 in Figure 5. Access relay 521 accordingly operates and extends the selector units and control conductors to springs of the trunk group relays 510 and 572. Access relay 521 also, at its contacts 523 operates tens relay 470 and group select relay 512 over conductor 407 and contacts 357 and 337, the circuit for relay 470 proceeding through contacts R24 and conductor 413, and the circuit for relay 512 passing through contacts R25, conductor L2 and the cables 414 and 426.

Tens relay 470 upon operating at contacts 471 prepares its locking circuit, and at its other contacts prepares circuits to the "200" group of connectors. Group select relay 512 upon operating further extends the selector units and other control leads over cable 516 to the springs of the local trunk select relays 518, which are similar to those shown in the center of Figure 5, except that the EC leads are not connected. Thereupon, assuming again that all connectors of the group are idle, ground from contacts of the first select relay corresponding to relay 540 is passed back over the 1–6 units conductor through the cables 516, 554, 553 and 426 to the selector 1–6 units lead 415 and relay 430, which operates.

The 1–6 units relay 430 upon operating, at its contacts 431, 432 and 433 extends the selector talking and test conductors through to the cable 1569 leading to the first connector, and at contacts 437 extends its own operate ground to lead 404 and the switch-through relay 310. Relay 310 operates from this ground, at contacts 315 locks itself and units relay 430 to test conductor 302, at contacts 316 locks up tens relay 470 and disconnects release relay 330, at contacts 314 unlocks relays 350 and 355, at contacts 313 unlocks relays C50 and R20, at break contacts 311 and 312 disconnects line relay 325, and at make contacts 311 and 312 extends conductors 300 and 301 and the repeater pulsing loop through to the selected connector, such as connector 1570, by way of contacts 421, 422, contacts 431, 432, 472, 473 and cable 1569. The relays 325, 350, 355, C50 and R20 release at once upon the operation of switch-through relay 310, and register relays C50 and R20 in turn release the access and group select relays 521 and 512. Release relay 330 holds its armature for an instant however before releasing, to give the connector time to return holding ground to the test lead 302.

The connector 1570 upon being seized over the extended pulsing loop from the repeater, returns holding ground over test lead 302, and prepares to receive the final digits. The connector at the same time releases a corresponding trunk busy relay corresponding to relay 530 in the select relays 518, which thereupon preselect the next connector. The last three digits "311" now cause the connector to select and ring the called line, or to return busy tone if such line is busy.

When the called line answers, the connector switches through in known manner to complete the connection, and at the same time reverses battery over the talking conductors 300 and 301. This reverses the current flowing in the control winding of supervisory relay 1035 in the repeater 1590. Relay 1035 accordingly operates and at contacts 1036 operates battery reversing relay 1150 over lead 1086 and back contacts 1114. Relay 1150 upon operating, at contacts 1151 and 1152 reverses battery from line relay 1130 over trunk 1595 to repeater 1655. This reverses the current flow in the control winding of supervisory relay 1245 in the latter repeater, and causes relay 1245 to likewise operate. Relay 1245 thereupon, at contacts 1246 closes a circuit to the lower winding of inward line relay 1250 through make contacts 1236, and the latter relay operates. Relay 1250 closes its contacts 1252 without effect, and at make contacts 1251 operates relays 1240 and 1340 in parallel. The operation of relay 1340 is without effect since the cable 1659 is open at the other end in the repeaters 1685 at this time, but relay 1240, at break contacts 1242 extinguishes the call lamp to give the operator answer supervision. Contacts 1241 of relay 1240 close without effect, due to the open break contacts 1238. If the called party hangs up first, battery is again reversed over the trunk, releasing relays 1245, 1250, and 1240, and the latter again lights the call lamp CALL, to give the operator disconnect supervision.

*Trunk call—Exchange C to Exchange A*

A call from the toll board in Exchange C to Exchange A is similar to a call to Exchange B in its initial stage, up to the seizure of an incoming selector in Exchange B. To summarize the action briefly, the insertion of a plug in the jack 1385 operates relays 1210 and 1330 in the repeater 1655. Relay 1210 operates relays 1160 and 1130 in repeater 1590, while relay 1330 operates relays 1235 and 1260 in repeater 1655. In the repeater 1590, relay 1160 operates relay 960, while relay 1130 operates relays 1040 and 950. Relay 950 in turn seizes the incoming selector 1560 by operating the relays 325 and 330 therein, while relay 960 operates extra control relay 360. The following pulsing loops are now completed: for the selector line relay 325 over conductors 300 and 301 to pulsing contacts 1131; for the repeater line relay 1130 over conductors 1190 and 1191 to pulsing contacts 1331; for repeater line relay 1330 over cable 1656 to the operator's dial.

Assuming that the call number of the wanted party in Exchange A is "885731," the operator after plugging in, proceeds to dial the first digit "8," which is repeated by the line relays 1330, 1130 and 325. Line relay 325 accordingly passes eight pulses to the selector register, which steps off eight steps, leaving relays R80 and C50 locked operated, with relay 335 operating as usual on the first pulse and releasing after the last pulse. Upon the release of relay 335, contacts 338 thereof operate access relay 521 over contacts C51 and R81, lead 408, and cable 426. Access relay 521 thereupon extends the selector units and other control leads over cable 553 to springs of trunk group relays 510 and 572, and at its contacts 523 operates tens relay 480 and group select relay 573 over lead 407 and break contacts 357 and 336. From contacts 336 the circuit for relay 480 is over contacts R83 and lead 410 to relay 480, while the circuit for relay 573 is over contacts R82, lead G8, and cables 409 and 426 to relay 573.

Tens relay 480 upon operating, at contacts 481 prepares a locking circuit for itself, and at its other contacts prepares circuits to the "800" group of repeaters. Group select relay 573 upon operating further extends the selector units and other control conductors over cable 555 to the "800" group of trunk select relays. Thereupon, assuming all repeaters of this group idle, and the trunk busy and trunk select relays 530 and 540 operated as shown, ground from make contacts 541 is passed back over the 1–6 units lead, through cable 555, contacts such as 574, cable 553, contacts such as 522, cable 426, and conductor 415 to the selector 1–6 units relay 430, which operates to prepare seizure of the selected first repeater such as repeater 1585–1 shown in Figures 6, 7 and 8. At the same time, ground from contacts 362 of the operated relay 360 is passed forward to the extra-control relay 870 in this repeater over lead 403, through cable 426, contacts similar to 522, cable 553, contacts similar to 574, cable 555, lead 534, make contacts 544, and lead 875 to relay 870.

Extra-control relay 870 upon operating, at contacts 872 closes a locking circuit for itself to test conductor 605, at back contacts 871 disconnects the lower windings of the repeater control and line relays 860 and 780, and at make contacts 871 grounds the negative trunk conductor 891, from ground at back contacts 725, to seize the repeater 1515 in Exchange A. Units relay 430 upon operating, extends the selector talking and test conductors 400, 401 and 302 to the same repeater 1585–1, over the cable 1566, comprising conductors 603, 604 and 605. Units relay 430 also, at its contacts 437 operates the selector switch-through relay 310, by extending its own operating ground to conductor 404.

Switch-through relay 310 upon operating, at contacts 315 locks itself and units relay 430 to the test lead 302, at contacts 316 locks up tens relay 480 and disconnects release relay 330, at contacts 314 disconnects the digit-absorption and hundreds-select relays 350 and 355, at contacts 313 unlocks the register relays C50 and R80, and at break contacts 311 and 312 disconnects line relay 325. Relay 310 further, at make contacts 311 and 312 extends the pulsing loop from repeater 1590–1 to repeater 1585–1 over conductors 400, 401, contacts 421, 422, 431, 432, 482, 483, conductors 603, 604, contacts 666, 667, leads 684, 687, contacts 721, 724, leads 685, 688, contacts 671, 672, leads 686, 689, left windings repeating coil X, and back contacts 722 and 723 to ground and battery through outward line relay 710, which operates. Selector relays 325, C50 and R80 release quickly upon the opening of their circuits at the switch-through relay, followed by 521 and 573, but release relay 330 holds long enough to allow the seized repeater 1585 to return holding ground.

In the seized repeater 1585–1, line relay 710 upon operating at contacts 712 passes ground from contacts 779B to pulsing relay 680, which operates. Relay 680 at contacts 681 operates release relay 835, and the latter at contacts 837 operates hold relays 840 and 770 in multiple, over their lower windings.

Hold relay 840 thereupon, at contacts 842 energizes the polarizing winding of supervisory relay 820, and at contacts 841 disconnects ground from trunk conductor 891 and closes a point in the outward pulsing loop. Hold relay 770, at break contacts 771, 772 disconnects both windings of the inward line relay 780, at make contacts 771, 772 completes the outward loop through pulsing contacts 751 to the distant repeater 1515, at contacts 773, 774, 775 prepares the repeater pulse repeating circuits, at make contacts 779 further locks up relay 870 and returns holding ground to the selector over test lead 605, and at break contacts 779 and 779A disconnects both windings of guard relay 730. Guard relay 730 thereupon restores, and at contacts 731 releases the normally operated trunk busy relay 530 in Figure 5. This causes the operation of the next select relay such as 560, which in turn at its contacts 563 unlocks and releases select relay 540 and at its contacts 561, 565 and 566 prepares the selection of the next repeater, as explained in more detail under calls from Exchange B to Exchange A.

Meanwhile, in the distant repeater 1515, which as previously stated, is similar to the repeater 1590–1 of Figures 9, 10 and 11, and operates in identical manner for inward calls, the trunk unbalancing ground on the negative trunk conductor 891, due to relay 870 having operated in the repeater 1585 before hold relay 840, causes the operation of relays corresponding to the control and line relays 1160 and 1130 in the said repeater 1515. These relays in turn operate relays 1040, 960 and 950, and the latter seize an associated incoming selector such as 1505 by completing a pulsing loop thereto, over the cable 1506, and also extend EC ground to the extra-control conductor thereof for use as required, as in case it is desired to extend the call beyond Exchange A, for example. The subsequent operation of the hold relays 770 and 840 in the repeater 1585–1 removes the unbalancing ground from the negative trunk conductor and closes a balanced pulsing loop to the repeater 1515 which extends from ground and battery through windings of the inward line and control relays of repeater 1515, over the trunk 1516, make contacts 871 and 841, lead 805, pulsing contacts 751, lead 803, contacts 836, both windings of control relay 860, leads 800 and 801, both windings of repeating coil X, make contacts 771 and 772, and the control winding of supervisory relay 820. The incoming line relay of the distant repeater 1515 remains operated over the loop, but the distant control relay restores, in response to completion of the loop circuit.

When the operator dials the second digit "8" of the call number, the repeater line relay 1330 responds as before, and passes eight pulses over trunk 1595 to line relay 1130 in repeater 1590. Relay 1130 in turn repeats the pulses through the switched-through incoming selector 1560 to line relay 710 in the repeater 1585, which releases and re-operates eight times in response. At each release of relay 710 pulsing relay 680 restores and operates pulse control relay 760, and energizes transfer relay 740, with the latter relay operating on the first pulse and releasing after the last to shunt relay 820 at contacts 741. At each re-operation of line relay 710, make contacts 711 thereof operate pulse repeating relay 750, while make contacts 712 re-operate pulsing relay 680. Pulse repeating relay 750 upon operating, at contacts 751 opens the outward trunk loop, and at contacts 752 opens the circuit to relay 760. Relay 760 thereupon restores and releases relay 750.

The pulsing contacts 751 of the repeater 1585 accordingly are caused to repeat eight impulses to the distant repeater 1515 over the trunk 1516. The incoming line relay corresponding to relay 1130 in the distant repeater in turn repeats these impulses to the incoming selector 1505 over the cable 1506. The selector 1505 being arranged to absorb all first digits "8," responds to the impulses, releases its register in a manner similar to that already described for a trunk call from Exchange C to Exchange B, and prepares the local switching circuits.

The third digit "5" of the call number is similarly repeated to the distant incoming selector 1505, by the repeater line relays 1330 in repeater 1655, 1130 in repeater 1590, 710 in repeater 1585, and 1130 in repeater 1515. The selector 1505 is thereby caused to select and switch-through to an idle connector of the "500" group, such as the connector 1514. The connector 1514 accordingly responds to the final digits "731" of the call number to extend the call to the wanted line "73" in the "500" group and to signal the wanted subscriber.

When the called station answers, the connector 1514 cuts off the ring and reverses battery in known manner to the repeater 1515, which in turn reverses battery over the trunk to repeater 1585. This reverses the current flow in the control winding of supervisory relay 820 in this repeater and relay 820 accordingly operates, and operates the inward line relay 780, by way of make contacts 843 and lead 802. Line relay 780 thereupon, at its contacts 782 operates relay 825 over lead 813 and relay 665 over contacts 777 and lead 694. The operation of relay 825 is without effect, but relay 665 at its contacts 666 and 667 reverses battery to the repeater 1590 by way of the cables 1566 and 1561 through the incoming selector 1560. This causes reversal of the current flow in the control winding of supervisory relay 1035 in the repeater 1590, and the latter relay operates, and closes a circuit to battery reversing relay 1150, over lead 1086 and back contacts 1114. Relay 1150 in turn at its contacts 1151 and 1152 reverses battery over trunk 1595 to repeater 1655, and causes the operation of supervisory relay 1245 in the latter repeater. Relay 1245 thereupon operates inward line relay 1250 over make contacts 1236. Relay 1250 thereupon at its contacts 1251 operates relays 1240 and 1340 in multiple. The operation of relay 1340 is without effect, but relay 1240 at back contacts 1242 extinguishes the call lamp CALL, as a signal to the operator that the call has been answered.

*Trunk call—Exchange D to Exchange C*

To make a toll call, as to Exchange A for example, a subscriber in Exchange D must do so through the toll board in Exchange C, which he reaches through two repeaters, by dialling the single digit "0." Thereupon, the local selector involved, such as selector 1610, seizes an idle repeater 1615 over the cable 1611.

The repeater 1615, which is identical with repeater 1590 of Figures 9, 10 and 11, is accordingly seized over conductors corresponding to leads 904, 905 and 906. The repeater line relay 940 is thereby operated over leads 904 and 905 and causes operation of release and hold relays 1140 and 1110, while ground from conductor 906 restores guard relay 1170. Guard relay 1165 is thus not released until after hold relay 1110 has disconnected the trunk unbalancing ground, at its contacts 1115. Make contacts 1116 on the hold relay at the same time cause operation of paystation tone relay 920 over test conductor 906, which in turn operates relays 915 and 925 to provide ring-back tone, to disconnect battery reversal relay 930, and to prepare paystation tone circuits, in the manner previously described for a call from Exchange B to Exchange C.

The operation of relays 1140 and 1110, and the later release of guard relay 1165 in the repeater 1615 cause the outward trunk loop to be extended to the associated repeater such as repeater 1685–1 in Exchange C, in a balanced condition. Accordingly the control relay 1220 in the latter repeater, which is like repeater 1655–1 shown in Figures 12 and 13, is not operated. Switch-through relay 1335 in repeater 1685–1 accordingly also remains unoperated. The call thus terminates at the toll board, over cable 1686, lighting the appropriate signal lamps, in the same manner as a toll call from Exchange B, through the operation of the repeater relays corresponding to the inward line, release, and hold relays 1250, 1240, and 1320.

*Trunk call—Exchange D to Exchange B*

To call Exchange B, a subscriber in Exchange D will simply dial the call number of the wanted party in Exchange B, such as the subscriber Q for example, whose number was assumed as "662311." Upon the dialling of the first digit "6" the local selector assigned to the call, such as selector 1610, seizes a repeater such as 1615 over the cable 1612. The repeater 1615 is thereby seized over conductors corresponding to leads 907, 908 and 909 in Figure 9. Ground forwarded over the test normal conductor 909 thereupon causes the immediate release of guard relay 1165 in this repeater, which momentarily unbalances the trunk 1616 leading to the distant repeater 1685. The line relay 940 then operates in repeater 1615, and causes removal of the unbalance and completion of the trunk pulsing loop to the distant repeater, such as repeater 1685–1.

The unbalance placed on the trunk 1616 operates relays corresponding to relays 1220 and 1250 in repeater 1685 over their lower windings. Relay 1220 operates a switch-through relay such as 1335, and relay 1250 operates release and hold relays similar to relays 1240 and 1320. Relay 1335 thereupon operates a select relay corresponding to relay 1350 in repeater 1685–1, assuming all repeaters idle, to prepare a pulsing loop to repeater 1655–1. The inward hold relay 1320 in repeater 1685–1, at contacts corresponding to contacts 1328 lights the trunk busy lamp associated with trunk 1686 in the switchboard, and at contacts such as make contacts 1321 and 1322 completes a pulsing loop to repeater 1655–1. This pulsing loop may be considered to extend through the control winding of a supervisory relay such as 1245 in the repeater 1685, through contacts corresponding to make contacts 1321 and 1322, a repeating coil therein corresponding to coil Z, make contacts such as 1336, 1337 and 1252, contacts corresponding to make contacts 1351 and 1352, the cable 1659 leading to repeater 1655–1, conductors 1390 and 1391 in said last repeater, back contacts 1341, 1342, 1336, 1337 therein, repeating coil Z, break contacts 1321, 1322, and the windings of outward line relay 1330 to ground and battery. The repeater busy relay 1370 in Figure 13 is caused to release upon the seizure of repeater 1685–1, by the removal of ground from lead 1482 at contacts 1329″ on the inward hold relay therein, to make the repeater 1685–1 busy to switch-through calls in the reverse direction.

In the repeater 1655–1, the outward line relay 1330 operates from the repeater 1685–1 over the foregoing loop, and at its make contacts 1332 operates the outward release relay 1235 as before, over lead 1281. Since the trunk answer relay 1210 is not operated at this time, the ground from make contacts 1332 now passes through break contacts 1213 thereof to the upper winding of the call lamp disconnect relay 1247, which thereupon operates, in multiple with relay 1235. Relay 1247 thereupon at its contacts 1248 prepares a locking circuit for itself, and at its contacts 1249 disconnects the CALL lamp.

The outward release relay 1235 upon operating, at its contacts 1236 and 1237 prepares the operation of the supervisory and inward line relays 1245 and 1250, and at make contacts 1238 operates the outward hold relay 1260. Hold relay 1260 thereupon, at its back contacts 1261 and 1262 disconnects inward line relay 1250 from the trunk, at make contacts 1261, 1262 and 1263 prepares the outward pulsing loop, at break contacts 1263 disconnects the trunk unbalancing ground, at contacts 1264 prepares the transfer relay circuit, and at contacts 1265 prepares a circuit for battery reversing relay 1340. Relay 1260 also, at its contacts 1266 operates the trunk-answer or trunk-seizure relay 1210, over leads 1286 and 1288, at contacts 1267 lights the trunk busy lamp BY corresponding to trunk 1656, and at contacts 1268 opens the circuit of the repeater busy relay 1470, to make the repeater 1655–1 busy in turn, to other switch-through calls from Exchange D.

Trunk seizure relay 1210 upon operating, closes make contacts 1214 without effect due to the open contacts 1249, at contacts 1213 disconnects the operating winding of relay 1247 now locked to contacts 1238, closes contacts 1212 without effect, and at make contacts 1211 completes the outward pulsing loop to the distant repeater 1590, over the trunk 1595. This circuit extends through the control winding of supervisory relay 1245 in repeater 1655–1, make contacts 1261, 1262, repeating coil Z, conductors 1268, 1271, back contacts 1226, 1227, windings of control relay 1220, lead 1275, pulsing contacts 1331, lead 1277, make contacts 1263 and 1211, trunk conductors 1190, 1191, windings of control relay 1160, contacts 1151, 1152, 1166, leads 1080, 1087, repeating coil Y, leads 1082, 1084, contacts 1112, 1113, and relay 1130 to ground and battery.

Control relay 1160 in repeater 1590–1 does not operate in this circuit since the trunk has not been unbalanced, but the inward line relay 1130 does operate, and causes operation of the inward release and hold relays 1040 and 950. Release relay 1040 releases both guard relays 1165 and 1170 at the same time, while hold relay 950 at contacts 958 prepares a circuit to transfer relay 1020, at contacts 957 further opens the guard relay circuit, at contacts 956 disconnects the unbalancing ground before relay 1165 has restored and prepares a circuit for bridging make contacts 1166, at contacts 951 prepares the operation of supervisory relay 1035, at break contacts 953 and 954 disconnects the outward line relay 940, and at make contacts 952, 953, 954, 955 completes a pulsing loop to the associated incoming selector 1560, over the cable 1561. This circuit may be traced through the control winding of supervisory relay 1035, leads 966, 967, make contacts 953, 954, leads 969, 970, repeating coil Y, leads 968, 971, make contacts 952, 955, lead 977, pulsing contacts 1131 and lead 978, talking conductors 300 and 301, back contacts 311 and 312 and the windings of the selector line relay 325 to ground and battery. Line relay 325 operates over this circuit, and operates release relay 330. Since the trunk has not been unbalanced, extra control relay 360 remains unoperated.

The second digit "6" dialled by the calling subscriber now causes the outward line relay 940 in repeater 1615 to repeat six pulses over the trunk loop 1616. The inward line relay 1250 in repeater 1685–1 in response passes six pulses over the cable 1659. The outward line relay 1330 in repeater 1655–1 responds to these pulses, and repeats them over the trunk 1595 to the repeater 1590–1 in Exchange B, where the repeater inward line relay 1130 repeats them in turn over the cable 1561 to the incoming selector 1560, and the line relay 325 therein. Line relay 325 accordingly passes six pulses to the register which operates the digit absorption relay 350 in the manner already explained for a trunk call from Exchange A to Exchange B, from contacts R61. Relay 350 thereupon shunts down the operated register relays. This in turn opens the operate circuit of relay 350, thereby causing the local-switching relay 355 to operate in series with relay 350, to prepare the local switching circuits.

The third digit "2" of the call number is repeated to line relay 325 in similar manner, and the latter now passes two pulses to the register, leaving relays C50 and R20 locked operated therein. Transfer relay 335, which operates as usual on the first pulse, restores after the last pulse and operates access relay 521, which in turn operates tens relay 470 and group select relay 512, just as described for a call from Exchange A. Group select relay 512 thereupon seizes the trunk select relays 518, which may operate any one of the selector units relays such as the 1–6 relay 430, the 5–0 relay 440, or the 2–7, 3–8, or 4–9 relays not shown, either with or without the units switching relay 420, to select any one of the ten connectors in the "200" group, depending on the position of the select relays 518. The operation of the units relay in turn, causes the operation of switch-through relay 310, which releases the register and the access and group select relays, as well as relays 325, 330, 350 and 355, and switches the repeater 1590 through to the selected connector through contacts of the operated tens relay 470. Release relay 330 being slow to release, keeps the test conductor 302 grounded for an instant after the switch-through to give the connector time to ground this lead to hold the connection.

The connector line relay not shown, operates immediately upon the extension of the repeater loop thereto, and causes the connector to pass ground back to the test conductor 302. Seizure of the connector also causes the trunk select relays 518 to preselect the next free connector and to mark this connector busy. The last three digits "311" are now passed to the seized connector by pulsing contacts 1131 of the inward line relay in repeater 1590, and the connector is thereby caused to select and signal the called station.

When the called station answers, the connector cuts off the ring and completes the connection in known manner. The connector at the same time reverses battery from its line relay back to the repeater 1590. This reverses the direction of the current flow in the control winding of supervisory relay 1035 in this repeater. Relay 1035 accordingly operates, and operates battery reversing relay 1150. Relay 1150 in turn at contacts 1151, 1152 reverses battery from relay 1130 back to the repeater 1655–1. This reverses the direction of current flow in the control winding of supervisory relay 1245 therein, causing its operation. Relay 1245 thereupon operates inward line relay 1250, and the latter relay at its contacts 1251 operates relay 1240 without effect, and at the same time operates battery reversing relay 1340 through make contacts 1265 on the operated outward hold relay 1260. Relay 1340 thereupon reverses battery from outward line relay 1330 back over cable 1659 to repeater 1685–1, and through make contacts corresponding to 1351, 1352 and 1336, 1337 therein to the inward pulsing loop comprising pulsing contacts such as 1252 and a supervisory relay corresponding to 1245 as previously described for setting up the call. This causes operation of the supervisory relay 1245 in repeater 1685–1, and the latter relay, since the outward release relay 1235 is unoperated in this repeater, operates a battery reversing relay corresponding to relay 1225. Relay 1225 accordingly reverses battery from the inward line relay 1250 of this repeater back over trunk 1616 to repeater 1615. The repeater 1615 being as stated, similar to repeater 1590–1, a supervisory relay 1035 is caused to operate therein, and in turn operates the inward line relay 1130 through make contacts 1114 of the outward hold relay 1110 which is operated. Relay 1130 thereupon, at make contacts 1132 operates battery reversing relay 930 by way of contacts 1124, lead 992 and contacts 917. Relay 930 accordingly, at its contacts 931, 932 reverses battery from the outward line relay 940 to the calling line, to record the call.

If the calling subscriber in Exchange D attempts to extend the call through Exchange B to Exchange A by dialling "68" as the first two digits instead of "66," in order to avoid the toll charge, the attempt will fail for the reason that the trunk unbalance is not extended forward by the repeater 1655 in Exchange C. Accordingly, the extra control relay 960 in the repeater 1590, and the EC relay 360 in the incoming selector are not operated, as they are in the case of a call from Exchange C. When therefore, the second digit "8" is dialled, the selector will seize a repeater 1585 over the cable 1566, and will operate the outward line, pulse, release, and hold relays 710, 680, 835, 770 and 840 therein, in the usual way. However, because of the non-operation of the EC relay 360 in the selector, no EC marking is forwarded over lead 403 to the trunk select relays of Figure 5. The EC lead 875 leading to repeater relay 870 therefore remains ungrounded and relay 870 accordingly does not operate.

The closing of make contacts 771 and 772 on the operated hold relay 770 now connects the control winding of supervisory relay 820 direct to the trunk 1516, thereby seizing the distant repeater 1515. Due, however, to the non-operation of relay 875, the outward pulsing contacts 751 of the repeater 1585 are not included in this circuit. Thus, while the repeater 1585 responds to the remaining digits, the pulses are not repeated to repeater 1515 and the call cannot be completed. If the calling party does not release the call within a reasonable time, the absence of reverse battery on the call, will cause timing circuits, not shown, in the repeaters, to cause their release.

*Single digit absorption*

With the arrangement illustrated, wherein all first digits of a certain value are absorbed, by the selectors, it is apparent that universal numbering prevails. That is, each subscriber's call number is always the same, with the same number of digits, regardless of whether the call is from a subscriber in the same exchange, or from a subscriber or an operator in another exchange. It will also be apparent that the local and outgoing tens relays corresponding to such digit cannot be operated. Thus while these selectors are called 200 point selectors, they actually can only provide access to a maximum of 180 terminals, comprising 90 outgoing trunks and 90 connector trunks, the latter leading to nine groups of connectors having access to a maximum of 900 local lines. If more capacity is needed, it would normally be necessary to add another rank of selectors.

Under certain conditions however, the full utilization of the local theoretical capacity of the system may be considered more important than a strict adherance to universal numbering. In such case, the selectors in some or all of the exchanges may be arranged to absorb only a single digit, as by removing the strap W from springs 151 in Figure 1, or strap V from contacts 356 in Figure 3, and by connecting a jumper from the terminals TA2 in these selectors to the terminal TA of the same selector. In the local selector 1565 in Exchange B shown in Figures 1, 2 and 2A, for example, this change would require only the omission of the strap W, and the connection of the dotted jumper T.

Under these conditions any local subscriber can call any other local subscriber by dialling only five digits, including only one office digit. Assuming for example that subscriber P in Figure 15 wishes to call another subscriber whose number will be taken as "66311," the calling subscriber upon removal of the receiver is connected to an idle selector 1565 as previously explained, and receives dial tone. Upon the dialling of the first digit "6" the selector line relay 120 passes six pulses to the register as before by way of contacts 122, 128 and 139. On the last pulse, relays 60 and C30 operate and lock. Transfer relay 130 which operated on the first pulse, releases after the last pulse, and at contacts 133 operates relay 145 as before, by way of make contacts C31 and 61 and break contacts 151. Contacts 146 thereupon close and shunt down the register relays 60 and C30. This removes the operating ground from relay 145, and permits relay 150 to operate in series therewith, from ground on the test conductor through contacts 114. The local-select relay 150 thereupon, at its contacts 151 disconnects relay 145, and prepares the local switching circuits.

Upon receipt of the second digit "6" line relay 120 again passes six pulses to the register, leaving relays 60 and C30 locked operated as before. Upon the release of transfer relay 130, following the last pulse, ground from contacts 133 now passes by way of make contacts C31, 61 and 151 to the TA2 terminal, and thence over jumper T and the TA terminal and conductor 207 and cable 226 to the trunk access relay 501, which operates.

Access relay 501 upon operating prepares circuits to the trunk group relays 510 and 572 in the usual way and at contacts 503 passes ground back to the selector over conductor 206 and causes the operation of the local tens relay having access to the "600" group of connectors, and of the corresponding local-group-select relay. The tens relay circuit is through make contacts 152, back contacts 132, contacts 64, and lead LO–6 to the stated tens relay not shown, while the circuit for relay 512 is through the same contacts 152 and 132, and thence through make contacts 65, conductor L6 and cable 213, to the sixth local-group-select relay, not shown, in the rectangle 510.

The sixth local-group-select relay upon operating, extends the selector units and control conductors to the "600" local-trunk-select relays, not shown, which thereupon operate the proper units relay in the selector, to cause the call to be extended to an idle connector of the "600" group of connectors, in the manner already described. This connector then responds to the last three digits to select and signal the wanted subscriber.

If all of the selectors in the system are arranged to operate in this manner, it will be apparent that a single office digit will be sufficient for all local calls and for calls from a toll operator to an adjacent exchange. For subscriber inter-office calls and for calls from a toll operator to Exchange A, this digit must be preceded by another like digit. The final digits are the hundreds, units and ringing digits, in that order, in all cases. The office digits to be dialled with this arrangement, may be summarized as follows:

| Type of call: | Office digits required |
|---|---|
| Local A | "8" |
| C to A | "88" |
| B to A | "88" |
| Local B | "6" |
| C to B | "6" |
| A to B | "66" |
| D to B | "66" |
| Local D | "7" |
| C to D | "7" |
| B to D | "77" |
| A, B, D to C | "0" |

If the selectors of only one exchange were modified in this manner, universal numbering would still be in effect in the rest of the system, and the initial digit would be dropped only for local calls in the exchange affected, and for operator calls to such exchange. And in the case of office A, only local calls in this exchange would be affected, with two office digits still required on calls from a toll operator.

While the foregoing represents a typical embodiment of the invention, it will be understood that various modifications and re-arrangements may be made without departing from the spirit or scope of the invention.

What is claimed is:

1. In a telephone system, a plurality of relay selectors for extending connections, local and outgoing groups of corresponding tens relays in said selectors, a group of local trunks common to said selectors and accessible to the local tens relays thereof, a group of outgoing trunks common to said selectors and accessible to the outgoing tens relays thereof, said trunks divided into sub-groups each accessible to a different tens relay of a selector, units relays in said selectors, contacts on said tens and units relays, a register in each selector operable responsive to received impulses corresponding to dialled digits, a first and a second digit absorbing relay in each selector, a trunk access relay for each said selector, a circuit closed by said register in any one of said selectors responsive only to a particular first digit received by such selector for operating said first digit absorbing relay, a circuit closed by said operated first relay for releasing said register and preparing the circuit of said second relay, said second relay operated in said last circuit responsive to said release of said register, said same circuits effective in response to any subsequent digit of the same value received by said selector in the same call for again releasing said register and said second relay, and for re-operating said second relay responsive to such register release, a circuit closed by said register responsive to receipt of a second digit of different value for operating the trunk access relay corresponding to said one selector, a local-sub-group-select relay and a group of local-trunk-select relays for each said local sub-group of trunks, an outoging-sub-group-select relay and a group of outgoing-trunk-select-relays for each said outgoing sub-group of trunks, circuits completed by said operated access relay and register for operating one of said local tens relays and the corresponding local-sub-group-select relay, in accordance with the value of said second digit, operate circuits for said selector units relays, means responsive to the operation of said access and sub-group-select relays for extending said operate circuits to the local-trunk-select relays corresponding to the operated local tens relay, means in said trunk select relays responsive to such extension for operating any one of the units relays of said selector over said extended operate circuits to extend the connection through the contacts of said operated tens and units relays to an idle one of the local trunks of the sub-group accessible to said operated local tens relay, a circuit closed by said register responsive to the receipt of any first digit other than said particular digit by said selector for immediately operating the corresponding access relay, circuits completed by said operated access relay and register for operating one of said outgoing tens relays and one of said outgoing-sub-group-select relays in accordance with the value of said different first digit, means responsive to the operation of said access and sub-group-select relays for extending said operate circuits to the outgoing-trunk select relays corresponding to the operated outgoing tens relay, means in said trunk select relays responsive to such extension for operating any one of the units relays of said selector over said extended operate circuits to extend the connection through the contacts of said last operated tens and units relays to an idle one of the outgoing trunks accessible to said operated outgoing tens relay.

2. In a telephone system as in claim 1, a set of break-make contacts on said second digit absorption relay with the break contacts connected in the operate circuit between said register and said first digit absorption relay, a jumper connected across said break contacts and said make contact disconnected, and said selectors convertible from plural-digit-absorption selectors absorbing all digits of said particular value received by said register into single-digit-absorption selectors absorbing only the first digit of said particular value received by said register, said conversion requiring only the removal of said jumper and the connection of said make contact to said circuit for operatng the associated access relay.

3. In a telephone system, a first and a second group of trunks, a relay selector having access to said trunks, a first group and a second group of tens relays in said selector having access respectively to said trunk groups, a local-switching relay in said selector, units relays in said selector, a register in said selector operable responsive to impulses received by said selector, means in said selector responsive to a received series of impulses of a particular value for operating said register, means in said selector controlled by said operation of said register for operating said relay, means in said selector responsive to the cessation of said received series of impulses for restoring said operated register, said first mentioned means responsive to a received second series of impulses for re-operating said restored register, means controlled by said operated relay and said re-operated register for operating one of said units relays and one of the tens relays in said first group of tens relays, said operated tens and unit relays extending a connection to an idle trunk in said first trunk group, means controlled by said first operation of said register when said received first series of impulses is of a value other than said particular value for operating one of said units relays and one of the tens relays in said second group of tens relays, said last operated tens and units relays extending a connection to an idle trunk in said second trunk group.

4. In a telephone system, a relay selector, two groups of tens relays and a group of units relays in said selector, a group of local trunks accessible to the tens relays of one of said relay groups, a group of outgoing trunks accessible to the tens relays of said other relay group, a register in said selector, means in said selector for operating said register responsive to received series of impulses, relay means in said selector operated from said register responsive to a received first series of impulses of a particular value for absorbing said received first series of impulses, means controlled by said operated absorbing means and said register for operating one of said units relays and one of said tens relays in said one relay group responsive to a received second series of impulses, said operated tens and units relays completing a connection to an idle local trunk, means controlled by said register when said received first series of impulses is of a different value from said particular value for operating one of said units relays and one of said tens relays in said other relay group, said last operated tens and units relays completing a connection to an idle outgoing trunk.

5. In a telephone system as claimed in claim 4, wherein said absorbing means comprises a first impulse absorption relay operated from said register in response to said received first series of impulses of said particular value, a second impulse absorption relay, contacts closed by said operated first relay for completing a shunting circuit to said second relay and said register, said register released in response to said completion of said shunting circuit, said second relay operated over said shunting circuit in series with said first relay, and contacts operated by said operated second relay for disabling the tens relays in said other relay group and for enabling said tens relays in said one relay group.

6. In a telephone system, the combination with a relay selector for extending connections, of tens relays, units relays, operate circuits for said units relays, contacts on said tens and units relays, trunks accessible to said tens relays, said trunks divided into sub-groups, a sub-group-select relay and a group of trunk-select relays for each said sub-group of trunks, a trunk access relay, first and second digit absorbing relays, a register operable responsive to received series of impulses, a circuit completed by said register responsive to a received series of impulses of particular value for operating said first digit absorbing relay, a circuit completed by said operated first digit absorbing relay for restoring said operated register and for preparing a circuit for said second digit absorbing relay, said second digit absorbing relay operated in said last mentioned circuit responsive to said restoration of said register, said circuit effective in response to a received second series of impulses of said particular value for again restoring said register, for restoring said operated second digit absorbing relay, and for re-operating said restored second digit absorbing relay responsive to said second restoration of said register, a circuit completed by said register responsive to a received third series of impulses of different value for operating said trunk access relay, circuits completed by said operated access relay for operating one of said tens relays and the corresponding sub-group select relay in accordance with the value of said third series of impulses, means responsive to said operations of said access relay and said one sub-group select relay for extending said operate circuits of said units relays to the group of trunk-select relays corresponding to said one operated tens relay, means in said last mentioned group of trunk-select relays responsive to said extension of said units relays operate circuits for operating one of said units relays over one of said extended operate circuits, to extend the connection through the contacts of said one operated tens relay and said one operated units relay to an idle one of the trunks of the sub-group accessible to said one operated tens relay.

References Cited in the file of this patent

UNITED STATES PATENTS

| Number | Name | Date |
|---|---|---|
| 2,029,018 | Cruickshank | Jan. 28, 1936 |
| 2,355,908 | Dehn | Aug. 15, 1944 |
| 2,367,634 | Wicks et al. | Jan. 16, 1945 |
| 2,421,034 | McKim | May 27, 1947 |
| 2,428,549 | Burgener | Oct. 7, 1947 |
| 2,431,850 | Voss | Dec. 2, 1947 |
| 2,495,191 | Wallace | Jan. 17, 1950 |
| 2,500,392 | Wicks | Mar. 14, 1950 |
| 2,516,645 | Powell | July 25, 1950 |
| 2,522,720 | Jones | Sept. 19, 1950 |
| 2,530,104 | Voss | Nov. 14, 1950 |
| 2,535,764 | Voss et al. | Dec. 26, 1950 |